United States Patent [19]

Cahlander et al.

[11] Patent Number: 5,132,914
[45] Date of Patent: * Jul. 21, 1992

[54] FOOD PREPARATION SYSTEM AND METHOD

[75] Inventors: Robert L. Cahlander, Red Wing; David W. Carroll, Cannon Falls; Robert A. Hanson, Inver Grove Heights, all of Minn.; Al Hollingsworth, Naperville; John O. Reinertsen, Glen Ellyn, both of Ill.

[73] Assignee: Restaurant Technology, Inc., Oak Brook, Ill.

[*] Notice: The portion of the term of this patent subsequent to May 1, 2007 has been disclaimed.

[21] Appl. No.: 516,888

[22] Filed: Apr. 30, 1990

Related U.S. Application Data

[63] Continuation of Ser. No. 176,568, Apr. 1, 1988, Pat. No. 4,922,435.

[51] Int. Cl.$^5$ .............................................. G05B 19/40
[52] U.S. Cl. .................................. 364/478; 364/400; 364/477; 99/407; 99/325; 395/82
[58] Field of Search .............. 364/513, 400, 477, 557, 364/478, 479; 99/403, 407, 325

[56] References Cited

U.S. PATENT DOCUMENTS

| | | | |
|---|---|---|---|
| 2,253,027 | 8/1941 | Hall | 214/8.5 |
| 2,616,359 | 11/1952 | Pierson | 99/407 |
| 2,841,074 | 7/1958 | Schechter | 99/355 |
| 2,949,200 | 8/1960 | Haag | 214/310 |
| 3,033,059 | 5/1962 | Melton et al. | 74/801 |
| 3,080,999 | 3/1963 | Clarke et al. | 221/266 |
| 3,183,856 | 5/1965 | Jolly | 107/1 |
| 3,218,960 | 11/1965 | Leiby et al. | 99/354 |
| 3,227,313 | 1/1966 | Morena | 222/57 |
| 3,228,320 | 1/1966 | Tumonis | 99/409 |
| 3,262,593 | 7/1966 | Hainer | 214/651 |
| 3,273,488 | 9/1966 | Anetsberger | 99/107 |
| 3,283,695 | 11/1966 | Belshaw et al. | 99/354 |
| 3,340,790 | 9/1967 | Simjian | 99/352 |
| 3,340,792 | 9/1967 | Matzke | 99/405 |
| 3,347,152 | 10/1967 | Congelli et al. | 99/334 |
| 3,391,633 | 7/1968 | Boosalis | 99/357 |
| 3,410,198 | 11/1968 | Lohr et al. | 99/423 |
| 3,442,200 | 5/1969 | Babel | 99/357 |
| 3,442,423 | 5/1969 | Cozad | 222/70 |
| 3,641,263 | 2/1972 | Rhoads et al. | 178/6 |
| 3,653,541 | 4/1972 | Crum | 221/150 HC |
| 3,665,842 | 5/1972 | Visitacion | 99/332 |
| 3,690,247 | 9/1972 | Van Cleven et al. | 99/355 |
| 3,866,795 | 2/1975 | Urano | 221/150 HC |
| 3,908,531 | 9/1975 | Morley | 99/336 |
| 3,910,535 | 10/1975 | Ohnaka | 248/16 |

(List continued on next page.)

FOREIGN PATENT DOCUMENTS

| | | |
|---|---|---|
| 1574245 | 7/1971 | Fed. Rep. of Germany . |
| 226185 | 8/1985 | Fed. Rep. of Germany . |
| 2483206 | 12/1981 | France . |
| 2597239 | 10/1987 | France . |
| 2161294 | 6/1986 | United Kingdom . |
| 2200039 | 7/1988 | United Kingdom . |

*Primary Examiner*—Allen R. Macdonald
*Attorney, Agent, or Firm*—Jenner & Block

[57] ABSTRACT

A fully automated robotized system and method is provided for cooking food products. The system and method is especially useful for use in a quick service or fast food restaurant and, in one embodiment, is capable of cooking, on a fully automated basis, french fries, chicken nuggets, fish filets and chicken patties. In one embodiment, the system includes a robot, a bulk uncooked food dispensing station, a cooking station and a cooked food storage station. The system can be controlled by a computer operating and control station that controls and directs the robot to obtain bulk food from the dispensing station, place it in cooking position at the cooking station and when cooked, remove the food and deliver it to the storage station, at a rate required to fill anticipated customer orders.

26 Claims, 29 Drawing Sheets

U.S. PATENT DOCUMENTS

| | | | |
|---|---|---|---|
| 3,984,009 | 10/1976 | Holroyd | 214/1 BB |
| 4,036,569 | 7/1977 | Oshikiri | 425/140 |
| 4,044,660 | 8/1977 | Montague et al. | 99/326 |
| 4,074,793 | 2/1978 | Yuter | 40/130 L |
| 4,171,144 | 10/1979 | Rodriguez | 294/30 |
| 4,176,590 | 12/1979 | Kochan | 99/405 |
| 4,226,176 | 10/1980 | Macchi | 99/335 |
| 4,228,730 | 10/1980 | Schindler et al. | 99/329 R |
| 4,289,064 | 9/1981 | Rosenblatt | 99/334 |
| 4,438,683 | 3/1984 | Bartfield | 99/330 |
| 4,503,507 | 3/1985 | Takeda et al. | 364/513 |
| 4,543,702 | 10/1985 | Wada | 29/434 |
| 4,553,222 | 11/1985 | Kurland et al. | 364/900 |
| 4,595,333 | 6/1986 | Ono et al. | 414/729 |
| 4,611,749 | 9/1986 | Kawano | 228/176 |
| 4,616,971 | 10/1986 | Matrone | 414/730 |
| 4,627,785 | 12/1986 | Monforte | 414/730 |
| 4,628,974 | 12/1986 | Meyer | 141/129 |
| 4,664,590 | 5/1987 | Maekawa | 414/744 |
| 4,685,386 | 8/1987 | Bezon | 99/404 |
| 4,688,549 | 8/1987 | Blankemeyer et al. | 126/373 |
| 4,700,617 | 10/1987 | Lee et al. | 91/327 |
| 4,742,455 | 5/1988 | Schreyer | 364/400 |
| 4,748,902 | 6/1988 | Maurantonio | 99/326 |

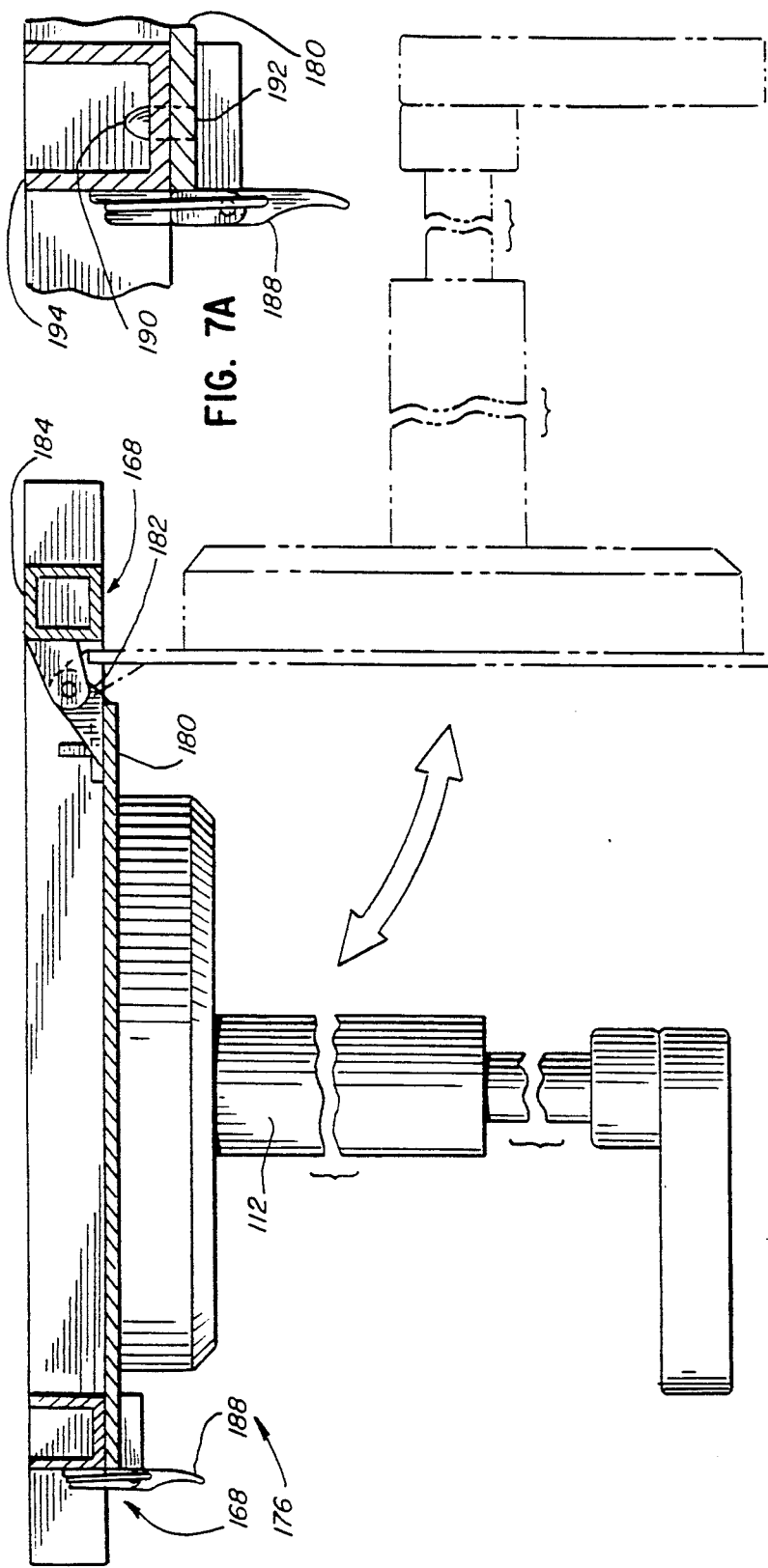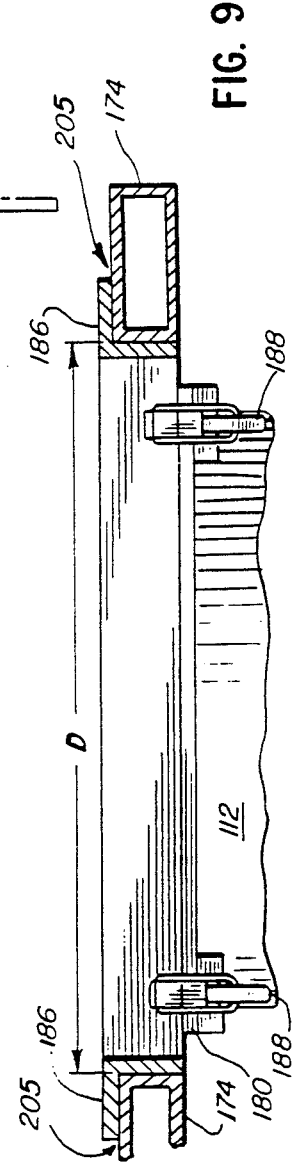

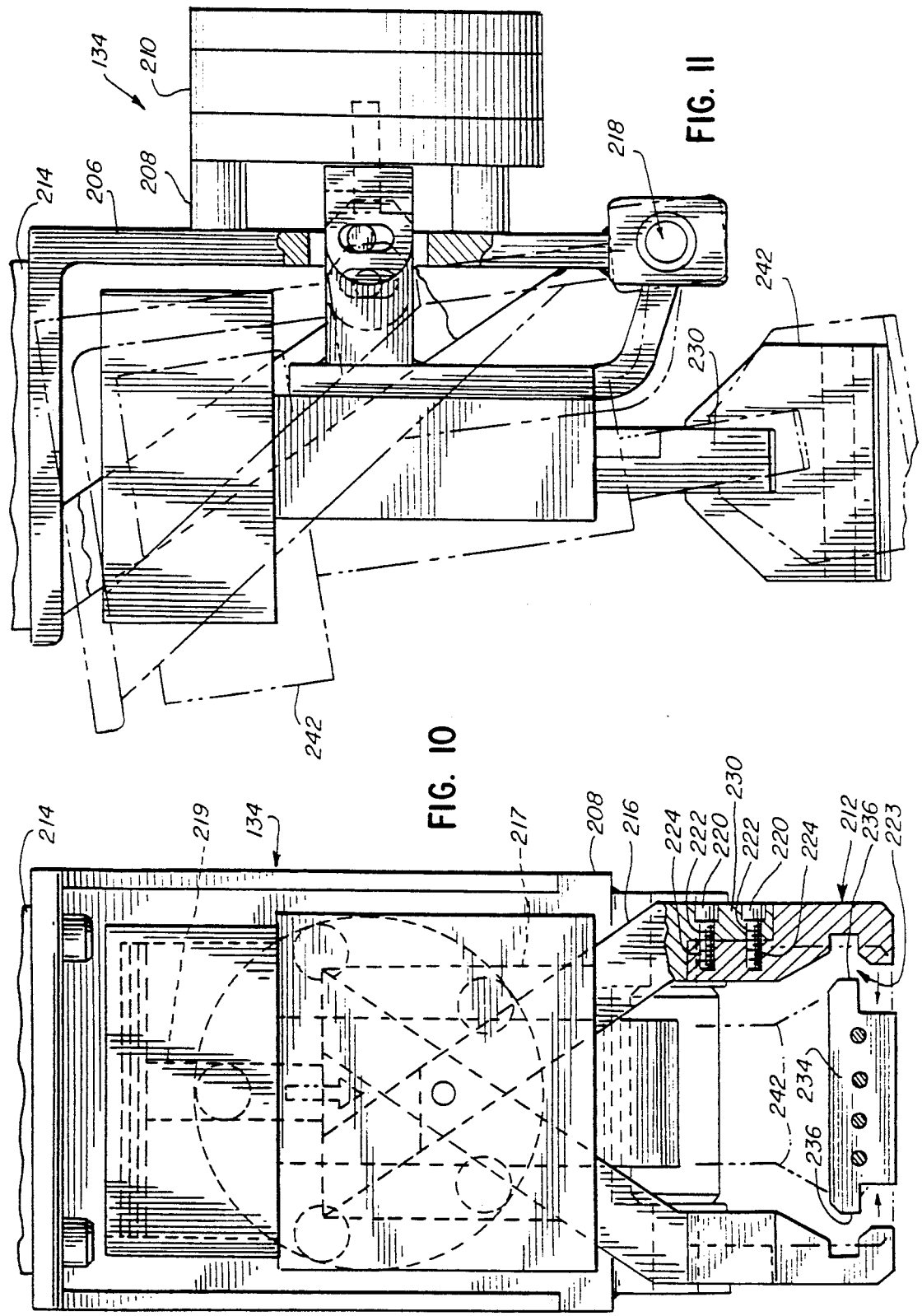

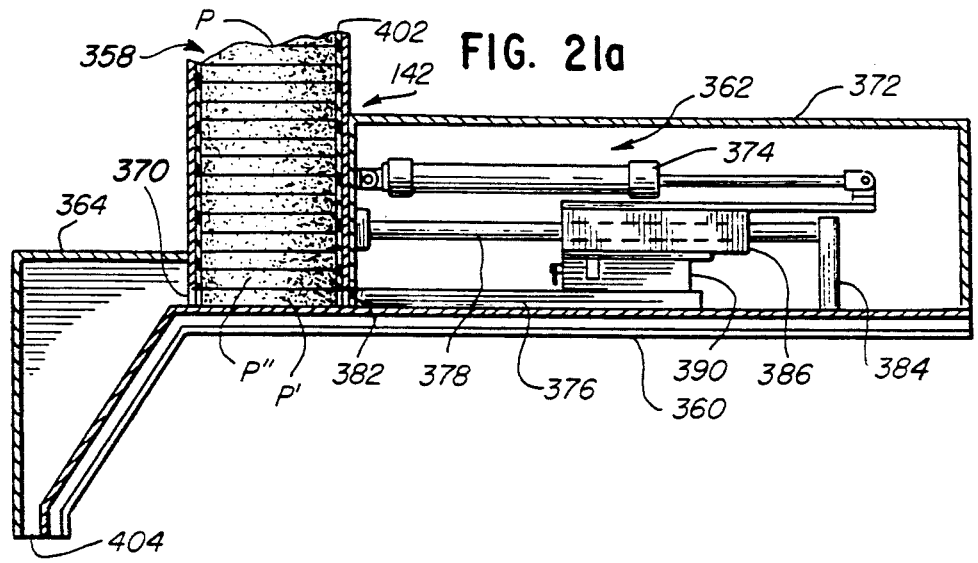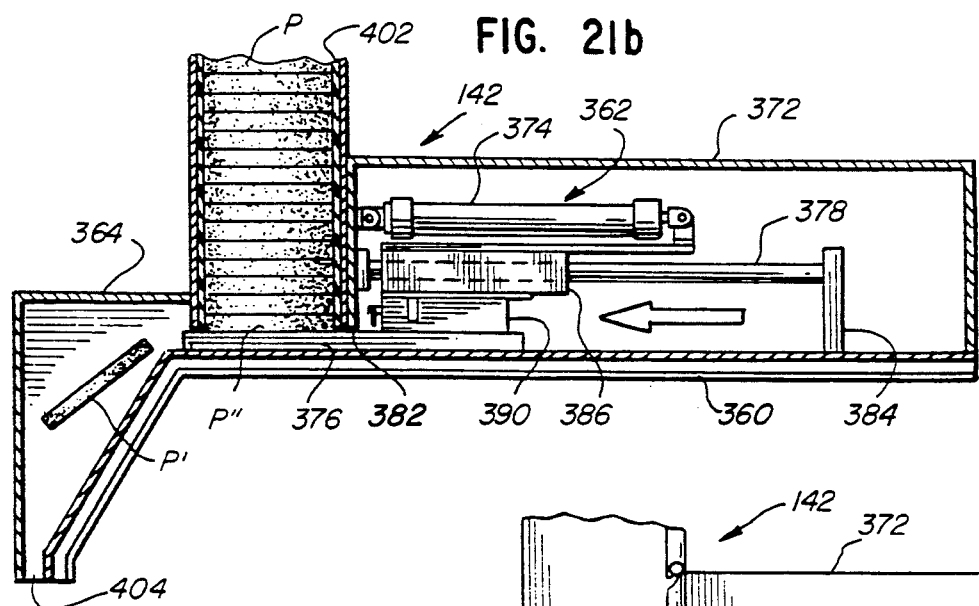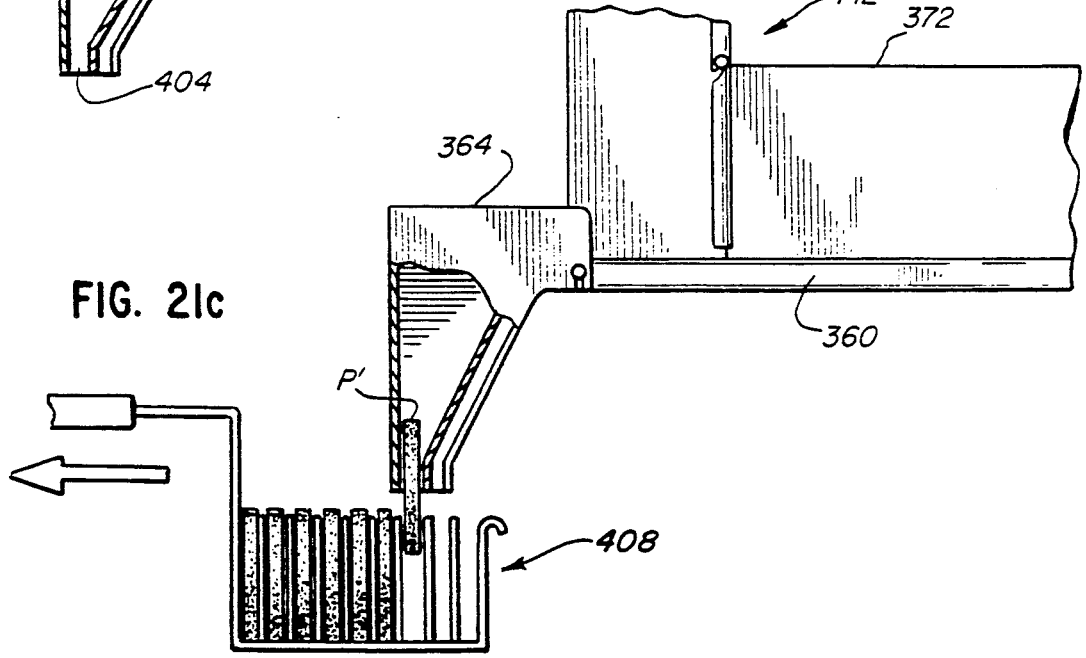

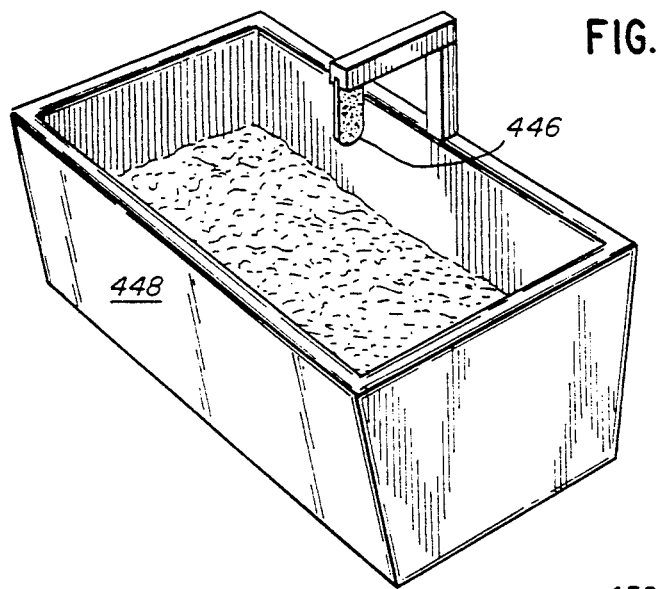
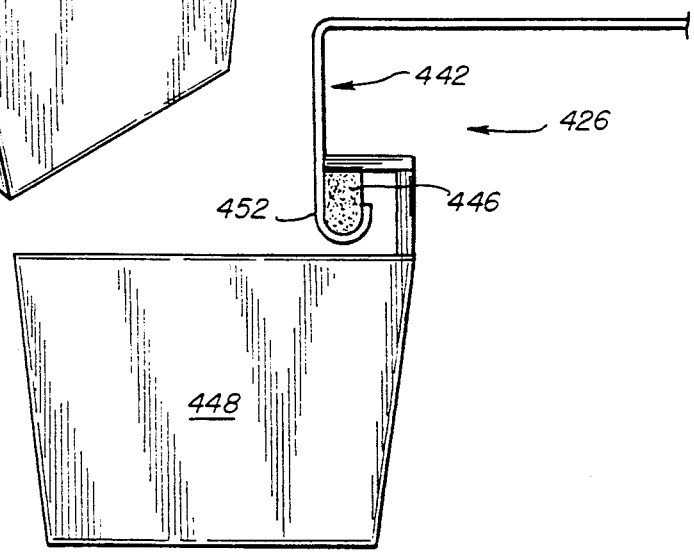
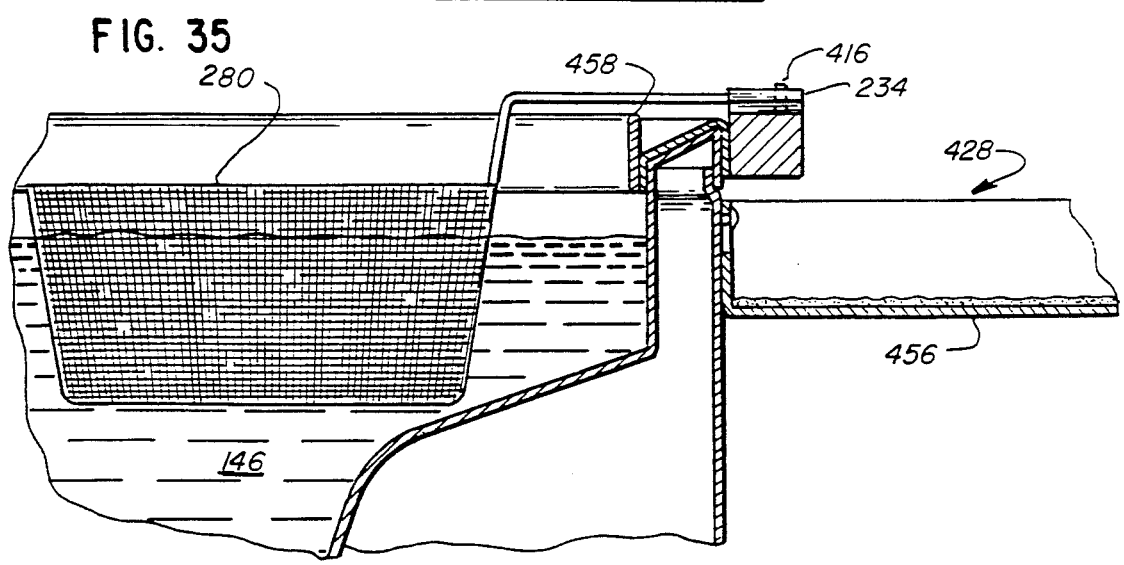

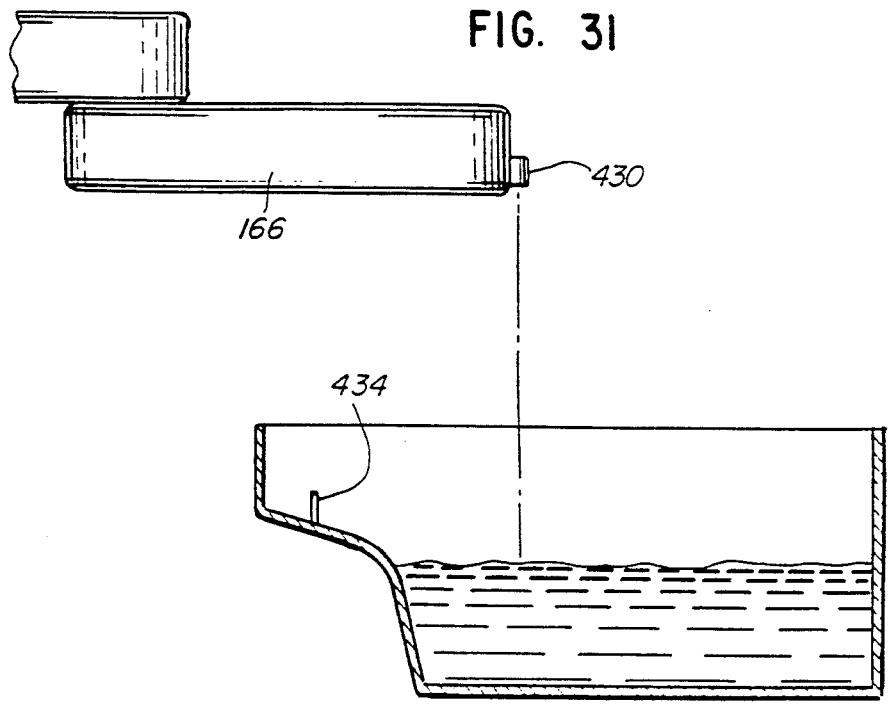
FIG. 31
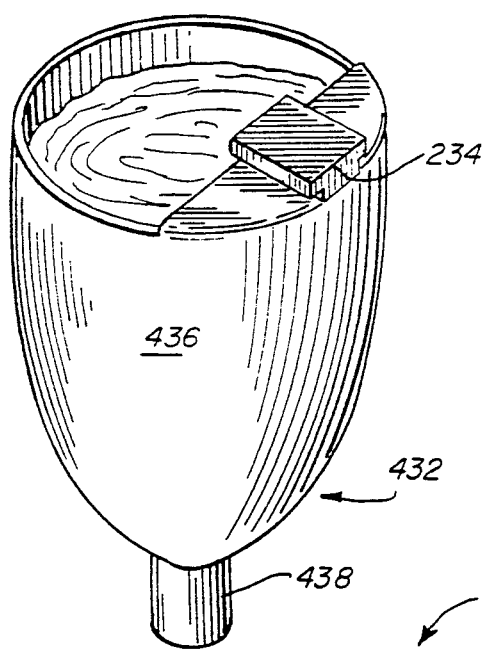
FIG. 32
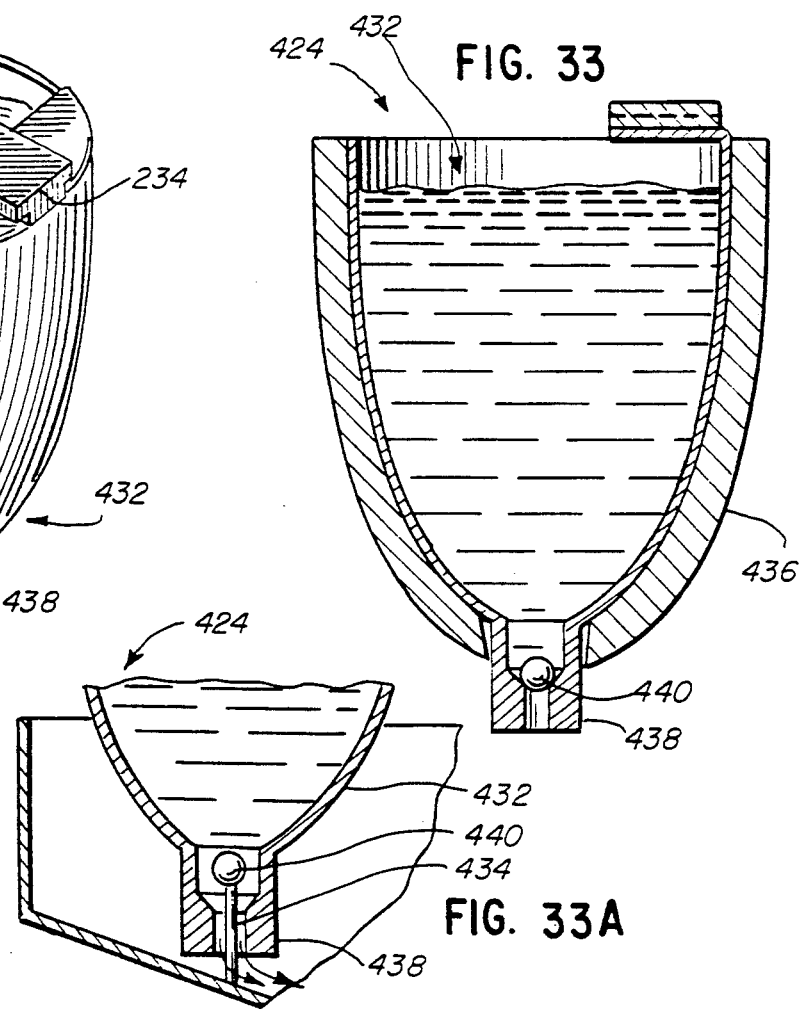
FIG. 33
FIG. 33A

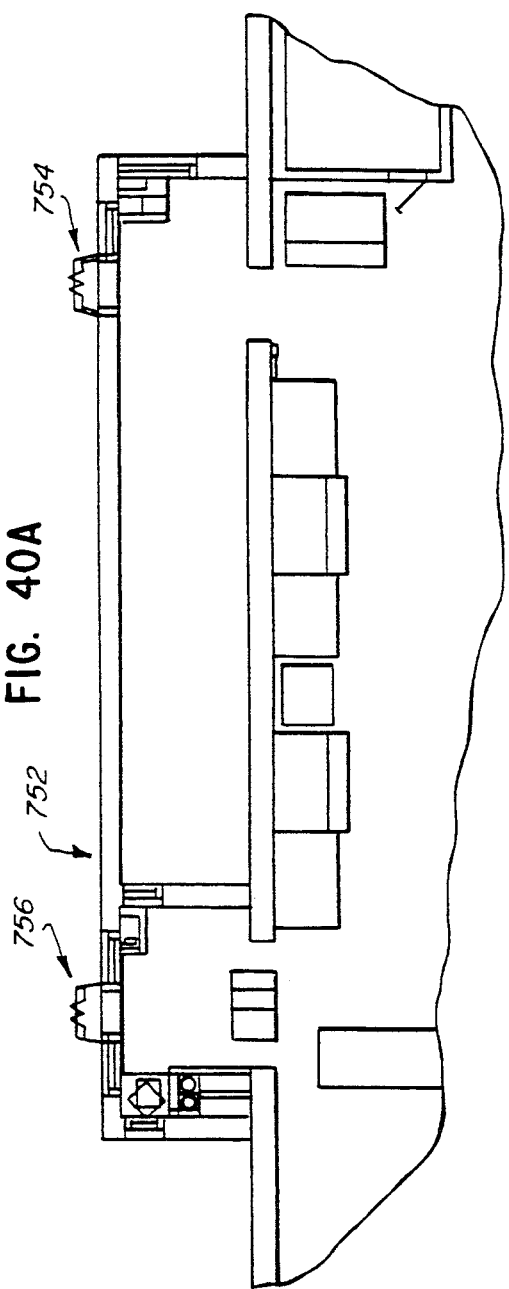
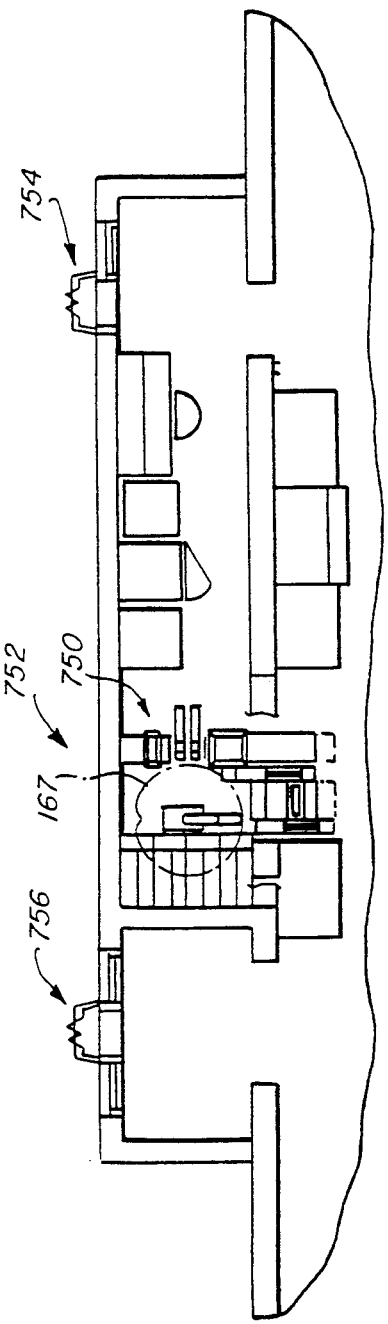

FOOD PREPARATION SYSTEM AND METHOD

RELATED APPLICATION

This is a continuation of U.S. patent application Ser. No. 07/176,568, filed Apr. 1, 1988, now U.S. Pat. No. 4,922,435.

FIELD OF THE INVENTION

This invention relates to systems and methods for the preparation of food, especially for quick service restaurants. More particularly, the invention relates to fully automated devices, systems and methods for food preparation that can incorporate computer controlled robotics. The devices, systems and methods are especially suited for on-site use at quick service restaurants.

BACKGROUND OF THE INVENTION

In restaurants, especially quick service (fast food) restaurants, fast, consistent, efficient and safe food preparation is essential for a successful operation. The quality of the prepared food depends in large part on the consistency of food preparation. The food must be cooked under correct conditions for the proper time.

Consistency in food preparation can vary as a result of many factors. For example, people engaged in food preparation often must perform multiple tasks at frequencies that vary with time because of constantly varying customer demand throughout the day. For example, lunch and dinner time may be extremely busy while other periods may be relatively slow. The product mix can vary from hour to hour and day to day. As a result, the consistency and quality of food may vary. Difficulties in proper scheduling of food production during peak and non-peak periods can cause customer delays and/or stale, wasted or unusable food.

Food preparation is labor intensive, and the labor cost is a large portion of the total cost of the prepared food. An additional problem is that in sparsely populated and other areas where quick service restaurants are located, such as along interstate highways, for example, recruiting sufficient numbers of suitable employees is difficult.

Quick service restaurants must be able to effectively meet a variable customer demand that is time dependent and not subject to precise prediction. As a result, stores r(R)lying totally on human operators will at times be overstaffed and at other times be under-staffed Also, problems and potential problems can exist in restaurants where people directly prepare food. Health and safety concerns can also be present where food is prepared directly by people. By reducing or minimizing human contact with food and food cooking equipment, health and safety concerns can also be reduced or minimized. For example, in the frying of foods, some type of hot fluid, such as cooking oil, must be utilized. The cooking temperatures required can present a concern for health and safety.

Although quick service restaurants have existed for many years and now number in the tens of thousands, such establishments utilize people to prepare and process food. While there have been various improvements in commercial equipment used for cooking food in quick service restaurants, all are manually operated and are relatively labor intensive.

Accordingly, a need exists for a commercially suitable food preparation device, system and method that can be operated by a robot and that provides improvements in food preparation, especially in any or all of the previously mentioned areas. It would also be beneficial if such a system could make use of existing commercial equipment.

SUMMARY OF THE INVENTION

In accordance with the present invention a food processing system and method is provided that is especially adapted for a quick service restaurant and may be computer controlled and/or fully automated and robotized. The system is a fry cell that is capable of processing various types of food items that are ready to be cooked. As used herein, the terms "fry cell" and "fry basket" refer to a cell for frying a food product or products, not necessarily french fries, and to a basket for frying such products, respectively. The raw food products to be fried can be frozen or fresh, cooked or uncooked. The term "uncooked" means uncooked and/or unheated and "cooked" means cooked and/or heated.

The fry cell can operate by automatically dispensing uncooked bulk food to the robot which transports in a container a quantity of the food to be prepared, cooks the food and then delivers the cooked food to a storing, dispensing and display station.

More specifically, in one embodiment, the fry cell can process, on a fully automated basis, french fries, chicken nuggets, fish filets and chicken patties. The fry cell is composed of a robot, and various stations including an uncooked bulk food dispensing station, a cooking station, a cooked food storage, dispensing and display station, a computer operating and control station and optionally other various stations and components. All of the elements of the fry cell can be computer controlled and operated. Human operator interfacing with the fry cell during normal operation can occur at three areas: (1) filling the uncooked bulk food dispensing station; (2) obtaining cooked product from the cooked food storage, dispensing and display station for delivery to individual customers; and (3) control of the fry cell through its computer operating and control system.

The operation and control of the fry cell including its robot and other operating systems can be accomplished by the fry cell computer operating and control system. This system monitors and controls the operation and cooking parameters of the fry cell. This system also can provide a schedule of activities for the entire day of operation as well as a more detailed plan for the short-term period, such as an hour or less, for example. The computer system coordinates the operation of the fry cell, which may have at least several operations occurring simultaneously. Real time point of sale information can be monitored and compared to the planned activities by the system. If the real time information varies significantly from the plan, the daily and/or short-t(R)rm plans can be modified on the fly, automatically or by a human operator. For example, if a change is initiated by a human operator, the fry cell computer can still develop the new daily or short-term plans automatically based on the operator's input regarding batch size, priority and/or demand change. Thus, the fry cell can compensate for variations in product volume and mix that usually occur throughout the day. The fry cell food processing system, which can be a fry cell, can produce a rate and mix of food products that is related to data contained by or transmitted to the computer system. The data can be historical sales data and/or real time data based on point of sale data as to sales rate and mix of the food products produced by the fry cell or system. As a result, customer delays can be minimized, the food served to the customer is of optimum freshness and food waste is minimized.

The computer operating and control system is capable of determining whether a given instruction to cook additional food will conflict with any fry cell operations in progress, taking into account all future processing steps that will be required for the operations in progress to be completed. Scheduling of new operations is performed in a manner by the computer operating and control system so that the robot is not required to perform multiple functions at the same time and so that food is removed from the cooking station at the desired time. As a result, the quality of the cooked food is consistently uniform.

In accordance with one aspect of the present invention, a robotized system for cooking food products is provided. The robotized system includes a robot capable of working in an area that determines a work area. A bulk, uncooked food dispensing station that includes at least one food dispenser is provided for dispensing uncooked food pieces into a moveable container, for example, a fry basket, located in the work area. The system further includes at least one cooking station for cooking the food products. An end-of-arm robot tool is provided for the robot and the robot is capable of in conjunction with the end-of-arm tool, selectively engaging, disengaging and moving the container to desired locations in the work area and for placing a plurality of food pieces in cooking position with respect to the cooking station while the food pieces are contained in the container. The desired locations include an uncooked food dispensing position for receiving food into the container from the food dispensing station, a cooking position for cooking the food pieces and an unloading location where cooked food is unloaded from the container. Storage is provided adjacent the work area for receiving and storing the cooked food. A dump apparatus is provided for dumping the cooked food delivered to the dump apparatus by the robot via the container.

In accordance with another embodiment of the invention, an automatic robotized system for cooking food products is provided that includes a robot capable of engaging, transporting and releasing a food container in a work area. The system further includes an uncooked food dispensing station that comprises at least one food dispenser for dispensing uncooked food to the food container in the work area and at least one cooking apparatus in the work area. A control system is provided that controls and directs the robot to engage and transport the food container in sequence to and from the food dispenser and to and from the cooking station in a frequency determined by the controlling apparatus based on the actual and/or anticipated frequency and quantity of food products ordered by customers.

In accordance with still another embodiment of the invention, a fully automatic robotized fry cell for processing bulk uncooked french fries, chicken nuggets, fish filets and chicken patties is provided. The fry cell includes a dispensing station that comprises a plurality of food dispensers including a french fry dispenser, a chicken nugget dispenser, a fish filet dispenser and a chicken patty dispenser. A cooking station is provided that includes at least one fry vat for frying the various types of food products. A computer controlled robot forms part of the fry cell that is capable of working in an area that determines the robot work area. Usually, the robot will have at least one moveable arm that performs the work. The robot is capable of, in conjunction with the robot end-of-arm tool, selectively engaging, disengaging and moving in the work area to the stations a container for holding a quantity of food from the dispensing station. The fry cell further includes locator structure for allowing the robot to position the container and for retaining the container in a desired cooking position in the fry vat. Additional or substitute food items can be cooked merely by adding or substituting suitable food dispensers and containers. Also, additional types of food can be manually loaded into a container or fry basket for processing by the fry cell.

In accordance with still another aspect of the present invention, an automated system for cooking food products is provided. The system includes a work area that contains dispensing, cooking and storage stations and defines an area in which an operator can interface with the stations. The dispensing station is suitable for dispensing bulk, uncooked food and comprises at least one food dispenser for dispensing uncooked food pieces into a moveable container located in the work area. The cooking station includes at least one frying vat and the storage station is provided for receiving and storing the cooked food products. An automated dump mechanism for automatically pumping into the storage station food cooked by the cooking station in response to food being delivered and placed on the dump mechanism by the operator. In accordance with this embodiment, the system may further include a computer operating and control system for controlling and directing the operator to engage and transport the food container in sequence to and from the food dispensing station and to and from the cooking station at a frequency based on historical data contained by the computer and/or on real time point of sale data transmitted to the computer on the anticipated and/or actual volume of customer orders. The historical data may be for the particular store in which the system operates.

In accordance with still another embodiment of the present invention, an automatic robotized system for cooking food products is provided that includes a computer controlled robot capable of engaging, transporting and releasing a food container in a work area and various computer controlled stations. A computer controlled food dispensing station is provided that includes at least one food dispenser for dispensing uncooked food to the food container in the work area and at least one computer controlled cooking device in the work area. A computer controlled system is provided for controlling and directing the robot to engage and transport the food container in sequence to and from the food dispenser and to and from the cooking device at a frequency determined by the computer system based on the anticipated or actual frequency of customer orders. The computer controlled system also monitors, controls and operates the food dispensing station and the cooking station.

BRIEF DESCRIPTION OF THE DRAWINGS

FIG. 7A illustrates a portion of the overhead mounting assembly;

FIG. 8 illustrates a portion of the overhead mounting assembly and robot along lines 8—8 of FIG. 7 with the robot positioned in the operating vertical position and showing the robot maintenance position;

FIG. 9 is a sectional view along lines 9—9 of FIG. 7;

FIG. 10 is a front elevation view of the end of arm robot tool of FIG. 9;

FIG. 11 is a side elevation view of the end of arm robot tool of FIG. 9;

FIGS. 21(a-c) illustrate the sequential loading of fish filets into

FIGS. 22a and 22b illustrate a bail mechanism the various views of a

FIG. 29 is a perspective view of a waste container for skimmings utilized with the particle skimmer of FIG. 28;

FIG. 30 is a side elevation view of the waste container of FIG. 29 illustrating the skimmer in operative position;

FIG. 31 illustrates a semi-diagrammatic view of a shortening sensing apparatus in accordance with the invention;

FIG. 32 is a perspective view of a shortening refill reservoir in accordance with the invention;

FIG. 33 is a sectional view of the shortening refill reservoir of FIG. 32;

FIG. 33A is a partial sectional view of the shortening refill reservoir in the open position;

FIG. 35 is a side sectional view of a drip pan in accordance with the invention shown in position with respect to the fry vat of FIG. 4;

FIG. 38A is a perspective view of a transfer slide mechanism in accordance with the invention.

FIG. 40(a) is a plan view of a portion of a typical drive-thru restaurant;

FIG. 40(B) is a plan view of a robotized fry cell in accordance with the invention.

DETAILED DESCRIPTION OF THE INVENTION

General Fry Cell Description

Figure 1:
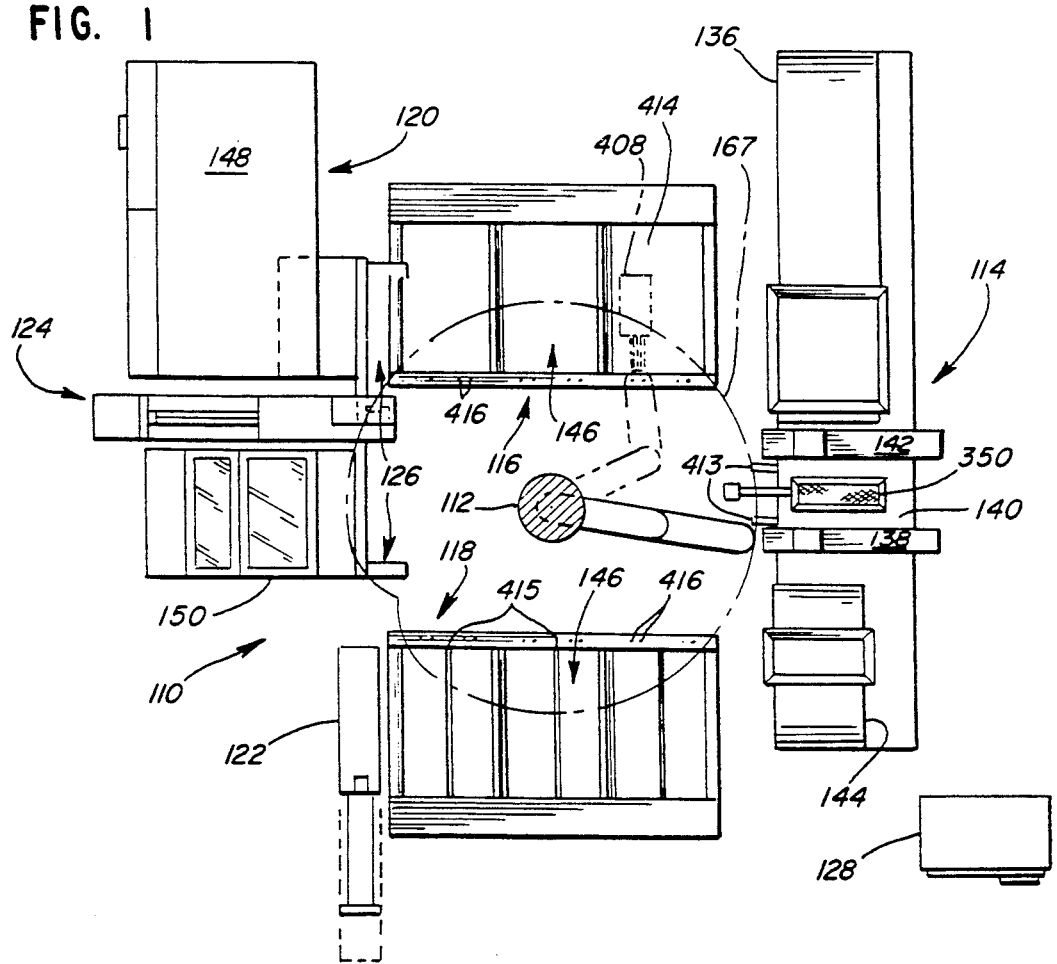
FIG. 1 is a plan view of a robotized fry cell in accordance with the invention.

Referring to the FIGURES generally, where like reference numerals refer to like parts, and in particular to FIG. 1, there is illustrated a plan view of a robotized fry cell 110 in accordance with the present invention. Fry cell 110 is composed of a robot 112 and various stations and components. The stations of fry cell 110 include an uncooked bulk food dispensing station 114, cooking stations 116 and 118, a cooked food storage display and dispensing station 120, transfer station 122, transfer slide 124, dump station 126 and computer operating and control station 128.

Fry cell 110 is especially useful in quick service restaurants and kitchens where a large volume of food must be cooked in relatively small batches to insure freshness and quality and where the food product mix and volume demand varies as a function of customer demand, which is usually time dependent and can vary rapidly from hour to hour and even more frequently. For example, at quick service restaurants, product demand and mix varies substantially and rapidly from pre-lunch through post-dinner times, as well as varying from day to day, week to week and seasonally, and as a result of specific events, such as the arrival of a tour bus or other large groups of people at a restaurant. Fry cell 110 is capable of adjusting to such events and varying product mix and rate accordingly.

Fry cell 110 is capable of dispensing, cooking and depositing the cooked food in its own cooked food storage, display and dispensing station 120 where a human operator obtains the cooked food to fill customer orders.

As configured in FIG. 1, a single fry cell 110 can handle and process french fries, chicken nuggets, fish filets, chicken patties, and individual portion sized pies, in sufficient quantities to handle the demands of most quick service restaurants, even during their highest peak hours. For example, the typical maximum combined capacity for the various types of foods (weight is on an uncooked basis) for fry cell 110 is shown in Table I.

TABLE I

| Food Item | FRY CELL CAPACITY | |
|---|---|---|
| | Quantity/Hr. | Baskets/Hr. |
| french fries | 100 lbs. | 50 |
| chicken nuggets | 24 lbs. | 12 |
| fish filets | 144 filets | 12 |
| chicken patties | 96 patties | 12 |
| individually sized pies | 128 pies or | 8 (pies) or |
| or hash browns | 96 hash browns | 12 (hash browns) |

The amounts of particular types of food can be increased by decreasing the amounts of other types of food.

Figure 2:
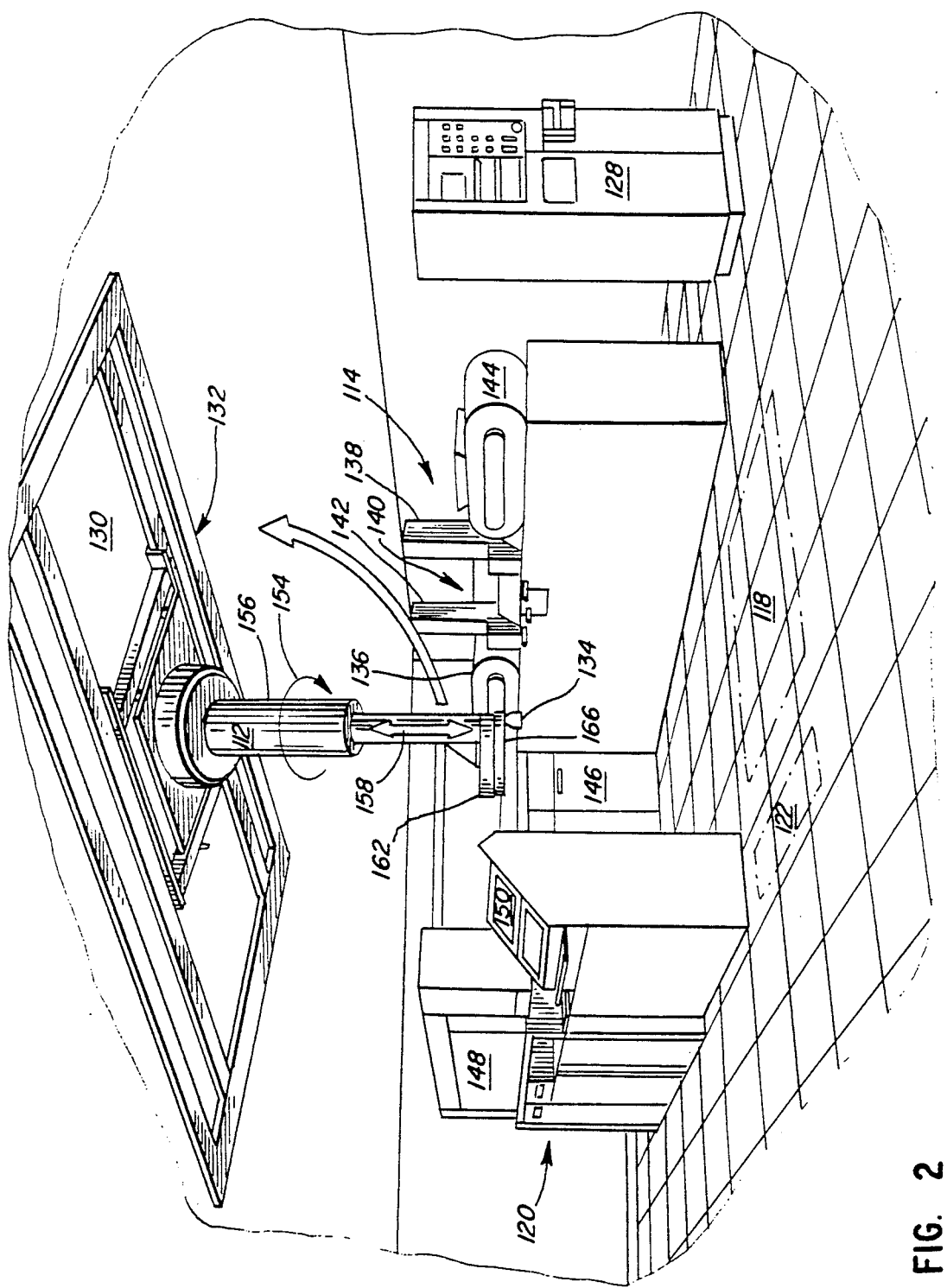
FIG. 2 is a perspective view of the fry cell of FIG. 1.

Fry cell 110 is illustrated in FIG. 2 with cooking station 118 and transfer station 122 removed. As illustrated in FIG. 2, robot 112 is suspended from ceiling 130 by means of overhead mounting assembly 132. Compared to floor mounting, this permits improved paths of operation for the robot arm and facilitates cleaning of fry cell 110. In accordance with one embodiment, robot 112 can be tilted upwardly to facilitate manual operation of fry cell 110 during maintenance or repair of robot 112 or the other components of fry cell 110. If desired, robot 112 could be floor mounted.

The robot includes a novel end of arm tool 134, illustrated in FIGS. 10-11, that allows efficient and reliable engagement to fry baskets that are used to contain and transport the various food products during the various fry cell operations.

Uncooked bulk food dispensing station 114 consists of one or more of the following: a french fry dispenser 136, a chicken patty dispenser 138, an optional pie basket pick-up platform 140, a fish filet dispenser 142 and a chicken nugget dispenser 144. Uncooked bulk food dispensing station 114 operates to dispense each type of food into a separate fry basket that is held by robot 112. After a fry basket is filled with a desired amount of food, robot 112 transfers the fry basket to cooking station 116 or 118.

Cooking stations 116 and 118 consist of one or more fry vats 146 and associated equipment as hereinafter discussed. Preferably, a separate fry vat is provided for each type of food that is cooked by fry cell 110 to avoid any taste contamination of the cooking oil utilized in fry Vats 146. Fry vats 146 include structure for locating and holding the fry baskets in proper position within one of the fry vats 146 for cooking food contained therein.

After robot 112 places a fry basket in position with respect to the locating structure, robot 112 disengages from the fry basket and the basket is held in place by the locating structure, leaving robot 112 free to perform other tasks during cooking of food contained in that particular fry basket.

After the food has been cooked within fry Vat 146, robot 112 is directed by computer operating and control station 128 to remove the fry basket from fry vat 146 and transport it to cooked food storage, display and dispensing station 120 via dump station 126, or to transfer slide 124 or transfer station 122, depending on the type of food.

Cooked food storage, display and dispensing station 120 preferably consists of a french fry bagging station 148 facility for storing french fries and a chicken nugget cabinet 150 for storing chicken nuggets delivered by robot 112. In operation, robot 112 delivers a basket of cooked french fries or chicken nuggets to a predetermined side of dump station 126, depending on the type of food. Robot 112 positions the fry basket in a position using structure similar to that used in connection With fry vats 146. Robot 112 then disengages from the fry basket and is free to perform other tasks. Dump station 126 is thereafter activated by computer operating and control station 128 to secure the fry basket and dump the food from the fry basket into the appropriate storage area. Cooked fish filets and chicken patties are placed on transfer station 122 while in the fry basket for delivery to another location for assembly in a sandwich. Pies and hash browns are delivered to transfer slide 124 while in the fry basket for cooling and delivery to station 120 for packaging. The cooked food products stored at station 120 are ready for packaging and delivery to customers.

Computer operating and control station 128 plans and controls the timing and operation of fry cell 110 and can obtain data from electronic point of sale devices to modify food production based on customer demand. Initial planning is based upon files maintained by the computer. Computer operating and control station communicates with the robot controller and other devices of fry cell 110 and can receive data from point of sale devices on a real time basis.

Starting with the files in memory, the computer generates a schedule of planned activities for the overall day in general terms and a more detailed plan for the short-term period such as an hour, for example, which period can be divided into shorter periods, such as fifteen minutes, for example. The daily plan is projected for the day from opening to closing, while the short-term plan is more detailed, covering specific activities. As the day progresses, the computer compares the planned activities to what is actually happening as orders are processed from the point of sale devices. If the real time information differs significantly from planned activities, either one or both of the daily and short-term plans can be modified, either automatically or by an operator, on the fly. If there is a demand for an item greater than what is available, it is possible for the point of sale signal data or store manager, for example, to interrupt the short-term plan and the computer will modify its plan to handle the unusual demand or change, while maintaining the activities already in process.

The computer is responsible for the following activities:

(1) daily plan for varying production rates and mix of products;

(2) short-term plan of fry cell functions including robot and other equipment and giving commands to the robot and other equipment at specified times;

(3) monitoring and maintaining, in conjunction with the robot, the shortening levels in all fry vats;

(4) monitoring the temperatures of all cooking apparatuses;

(5) tracking point of sale data on a real time basis and comparing to a projected trend;

(6) responding to interruptions by a point of sale signal or management for changes in product mix and/or immediate customer requirement;

(7) maintaining the prices, product mix, and sales rate for different periods of the day; and (8) adjusting the product mix and product rate on a daily basis with the capability to take into account changes in product mix and volume due to promotions, advertising and seasonal impacts upon business.

The short-term schedule generated by the computer is important for coordinating the robot activities and for timely producing the different food items. This is important for producing quality items in a timely manner. The computer automatically generates and keeps track of all sequences of events to be performed by the fry cell. For example, a typical sequence to be performed at designated times may be: (1) load french fries in a fry basket; (2) deliver to fry vat A; (3) start fries in fry vat A; (4) load chicken nuggets in a fry basket; (5) deliver and start chicken nuggets in fry vat B; (6) remove fries from fry vat A; (7) deliver fries to dump station 126; (8) dump fries into french fry bagging station; (9) load fish filets into a fry basket and deliver and start fish filets in fry vat C; (10) remove chicken nuggets from fry vat B; (11) deliver to dump station 126; and (12) complete the cooking of fish filets in fry vat C. The computer accomplished this by signaling the robot or other device with the appropriate command and appropriately operate the equipment of the fry cell.

On a real time basis, the information from the point of sale units or by command from the store manager or operator can interrupt the schedule in order to change the product priority and/or production rate of the robotic production fry cell. The interrupt is done in such a manner that all activities in process in the fry cell are still scheduled, and the schedule of the priority item is worked into the short-term plan as soon as possible. Any product that has already been dispensed will be processed in accordance with the scheduled plan. The plan can be automatically modified so that production is maintained satisfying the daily plan.

Robot, End of Arm Tooling and Mounting

Figure 6:
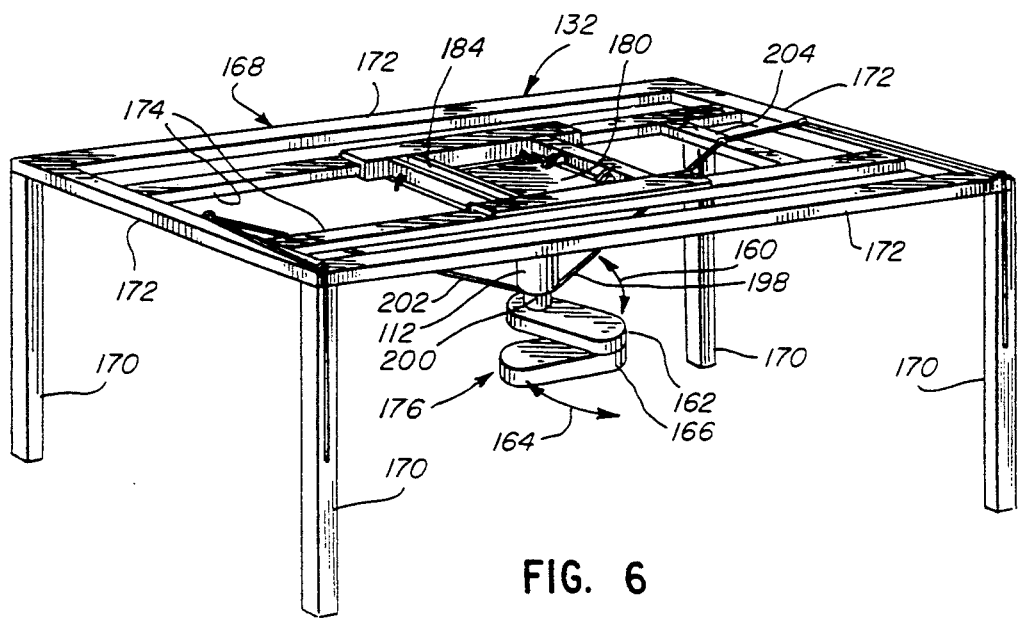
FIG. 6 is a perspective view of the mounting assembly and robot in operating vertical position.
Figure 7:
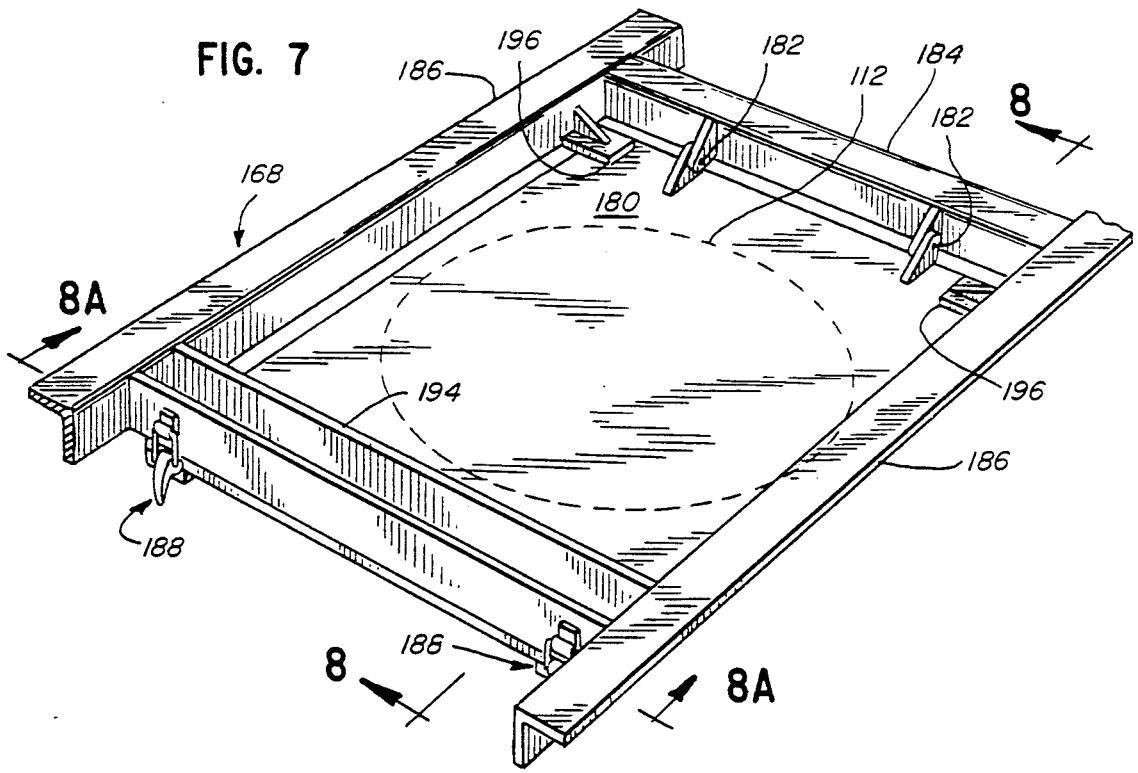
FIG. 7 illustrates in perspective view the tilt mechanism and the hinge assembly of FIG. 6.
Figure 12:
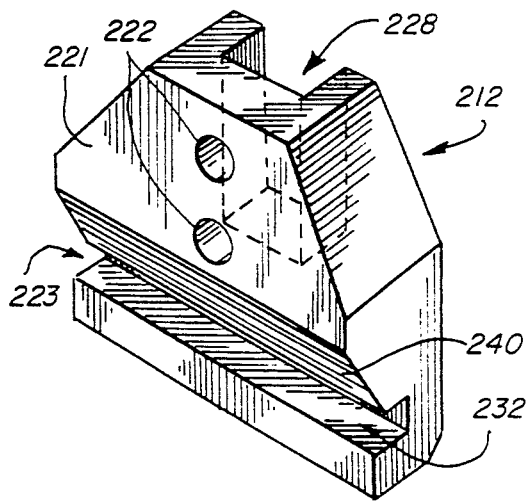
FIG. 12 is a perspective view of the robot gripper fingers in accordance with the invention.
Figure 13:
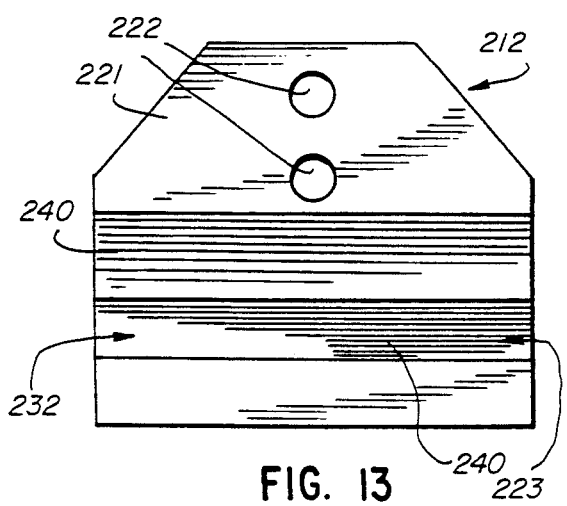
FIG. 13 is a front elevation view of the gripper fingers of FIG. 12.

FIG. 6-8 illustrate robot 112 and overhead mounting assembly 132 from which robot 112 is suspended. While robot 112 could be floor mounted, for example, instead of being suspended from ceiling 130, the suspending robot 112 from ceiling 130 provides several benefits. For example, robot 112 can be pivoted out of its working position to provide ready access to the other components of fry cell 110 if manual operating is desired or if a need for service of any components arises. Such access also facilitates cleaning which is an important part of any efficient fast food operation.

Figure 27:
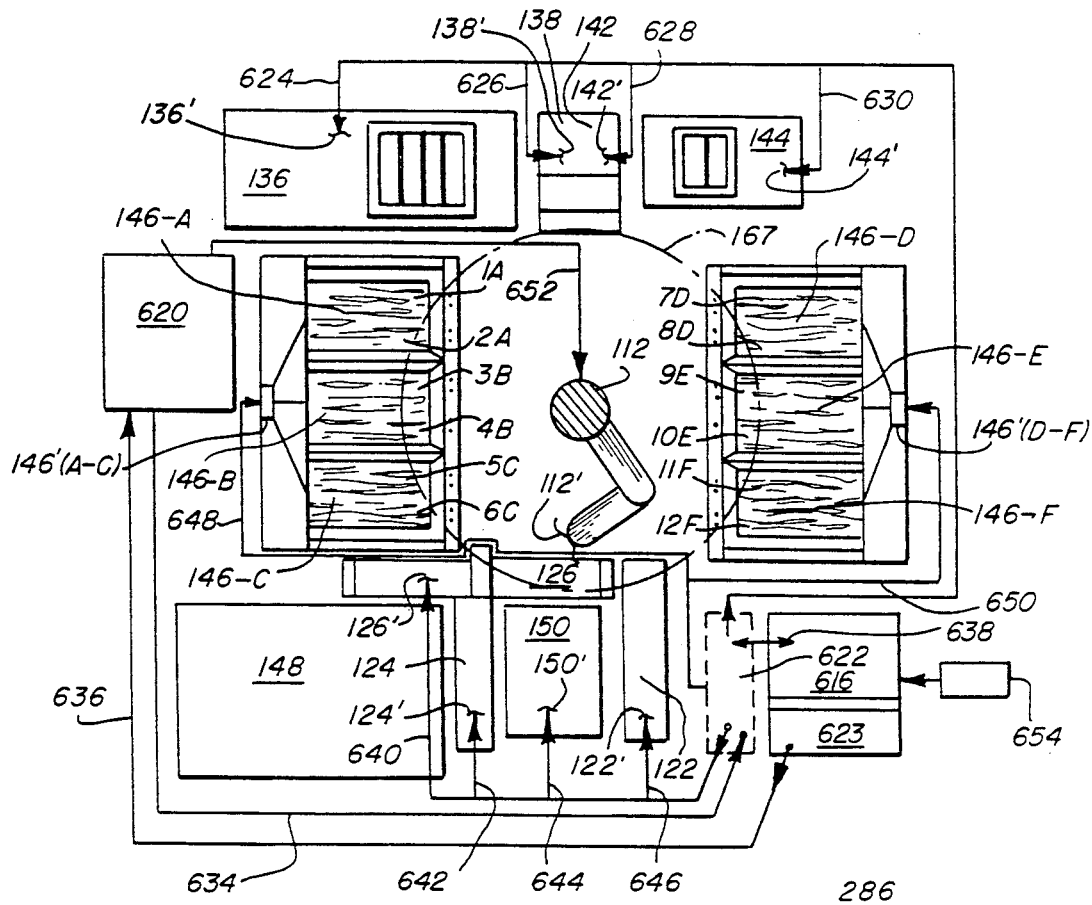
FIG. 27 is a schematic diagram of the process control circuits for the fry cell of FIG. 1.

A preferred type of robot for fry cell 110 is available from GMF Robotics of Bloomfield Hills, Michigan, model no. A-510, which is capable of movement in horizontal and vertical directions. The A-510 robot operates in four axes as illustrated in FIGS. 2 and 6. Axis 1, referred to by reference numeral 154, provides rotation of robot base 156. Axis 2 referred to by reference numeral 158, provides travel in the Z direction (normal to the floor and ceiling 130). Axis 3 referred to by reference numeral 160, provides rotation of robot arm 162. Axis 4, referred to by reference numeral 164, provides rotation of wrist 166 of robot 112. Thus, robot 112 is a four axis horizontally articulated robot. The horizontal work envelope or work area of robot 112 is determined by the maximum arc at the end of fully extended wrist 1 where end of arm tool 134 is mounted and is referred to by reference numeral 167, as illustrated in FIGS. 1 and 27, for example. The actual work area includes those locations to which robot 112 can deliver a fry basket, which is larger than the maximum arc of the fully extended wrist. As will be appreciated by those in the art, other robots and types of robots that are capable of performing the various robot functions of fry cell 110 can be utilized in accordance with the invention.

Robot 112 is controlled by an A-510 Karel® controller available from GMF Robotics of Bloomfield Hills, Mich.

The Karele® controller is a self-diagnostic control system with full program capabilities. It incorporates multiple Motorola 68,000 micro-processors, I/O rack operator panel, teach pendant and keyboard CRT. The Karel® controller provides high speed, accurate, simultaneous axis control as well as extensive communication ability. To accomplish a specific task, a Karel® application program directs robot motion control via the servo control system, which controls the drive motors that position the individual robot axis. Position control is done through position encoders, which monitor the position of the drive motor shaft.

FIG. 6 illustrates in perspective view a preferred overhead robot mounting assembly for robot 112. Any mounting structure that provides the desired monitoring and mounting of robot 112 can be used in accordance with the invention. Overhead mounting assembly 132 includes a frame 168 which may be supported by four legs 170 or mounted to the ceiling as shown in FIG. 2. Legs 170 are of a desired height so that when robot 112 is suspended from frame 168, it is at a desired height and location with respect to the other components of fry cell 110.

Frame 168 may be of a ladder type construction as illustrated. It includes a plurality of beams including perimeter beams 172 and interior beam 174. Mounted to interior beam 174 by any suitable method is a platform and tilt mechanism 176 that allows robot 112 to be secured thereto in an inverted vertical position during operation and in a horizontal position or substantially horizontal position during servicing or manual operation of fry cell 110, for example.

Platform and tilt mechanism 176 is more clearly illustrated in FIG. 7 and includes a ladder frame 168 and a mounting platform 180 that is hinged to ladder frame 168 by means of a loose pinned hinge 182 which is located on cross member 184 of ladder frame 168. Ladder frame 168 also includes side pieces 186 which are L-shaped and may be constructed of angle iron, for example.

Mounting platform 180 is secured to ladder frame 168 in the robot operating position by means of toggle clamps 188 in conjunction with hinge 182. As illustrated in FIG. 7A, a tapered pin 190 is mounted to mounting platform 180 which is partially disposed in a corresponding hole 192 in U-shaped cross member 194. This helps to insure that mounting platform 180 will be correctly positioned with respect to ladder frame 168 and the remainder of fry cell 110. A pair of such tapered pins and corresponding holes may be utilized on mounting platform 180 and U-shaped cross member 194. A pair of positioning tabs 196 is located at the hinged end of mounting platform 180 and a pair of toggle clamps (not shown) similar to toggle clamps 188 are used to secure mounting platform 180 to the pair of positioning tabs 196.

FIG. 8 illustrates platform and tilt mechanism 176 along lines 8—8 of FIG. 7. Robot 112 is illustrated in the normal working position with mounting platform 180 secured to ladder frame 168. Robot 112 is also shown in phantom lines in the maintenance or manual operating position in which robot 112 has been tilted from vertical to horizontal.

As illustrated in FIG. 6, a lifting cable 198 can be attached to a sling or strap 200 which is wrapped around robot 112 to facilitate hoisting robot 112 from the vertical operating position to the horizontal maintenance position. A lowering cable 202 may also be provided to facilitate lowering robot 112 to the operating position and for repositioning robot 112 into the correct operating position.

Preferably, as shown in FIG. 6, a cross member 204 is provided across frame 168 to provide a suitable location to secure robot 112 when in the horizontal position.

FIG. 9 illustrates a portion of platform and tilt mechanism 176 along lines 8A—8A of FIG. 7 illustrating mounting platform 180 secured by toggle clamps 188 in the operating position. L-shaped side pieces 186 rest on interior beams 174 of ladder frame 168. The width of ladder frame 168 as indicated by distance D is slightly less than the spacing between interior beams 174 thereby allowing ladder frame 168 to be shifted sideways as desired to allow for precise final positioning of robot 112. Also, shims may be inserted above interior beams 174 and below L-shaped side pieces 186 where indicated by reference numeral 205 to make leveling and minor height adjustments for robot 112.

Referring to FIGS. 10-11, there is illustrated front and side elevation views of end of arm robot tool 134. Tool 134 is composed of a commercially available end of arm robot tool Model Para Grip 100 from Arobotech System of Warren, Michigan that has been modified to pivot as hereinafter described. Tool 134 is mounted on the end of robot wrist 166, and includes a pivoting frame 206 pivotally mounted to a tool body 208, an operating cylinder 210, which forms part of the tilt mechanism of tool 134, a pair or gripper fingers 212, a robot mounting platform 214, and jaws 216 which are mounted to pivoting frame 206 allowing jaws 216 to pivot about pivot point 218. Extension of cylinder 210 causes body 208 to tilt down as shown in FIG. 11. The pivoting motion is useful when lifting a fry basket out of one of fry vats 146. Cylinder 210 is extended causing the fry basket to tilt down and facilitate the draining of cooking fluid therefrom. Jaws: 216 operate gripper fingers 212. Jaws 216 are spring biased (not shown) and are closed by downward movement of a collar 217 which is driven by a pneumatic cylinder 219. When cylinder 219 retracts, collar 217 moves upwardly and the spring biasing device opens jaws 216. Collar 217 and cylinder 219 are also mounted to pivoting frame 206.

Gripper fingers 212 comprise a body portion 221 and a gripping portion 223. Gripper fingers 212 are fastened to jaws 216 by any equitable means, such as with threaded fasteners 220 which are inserted through holes 222 located in gripper body 221 of gripper fingers 212 and corresponding holes 224 in jaws 216. Gripper body 221 includes a slot 228 which corresponds to a complementary rib 230 on jaws 216 to provide a mating relationship between jaws 216 and gripper fingers 212.

Each gripping portion 223 of gripper finger 212 includes a channel 232 along the length of gripper fingers 212. Channel 232 engages a gripper block 234 having a mating projection 236 as hereinafter described with respect to FIGS. 14 and 15.

Gripper fingers 212 should be made of a suitable material, such as, for example, case hardened 1018 steel. Preferably, the length of channel 232 is about 2.00 inches and the depth of channel 232 is about 0.25 inches.

The interior side of gripper fingers 212 preferably includes an angled portion 240 that serves to help guide mating projection 236 of gripper block 234 into channel 232.

Figure 14:
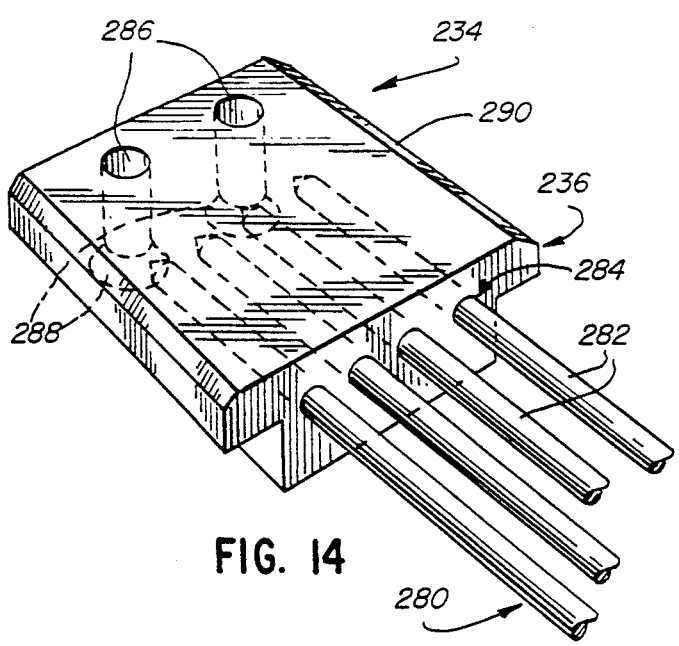
FIG. 14 is a perspective view of a gripper block in accordance with the invention shown mounted to a fry basket.
Figure 15:
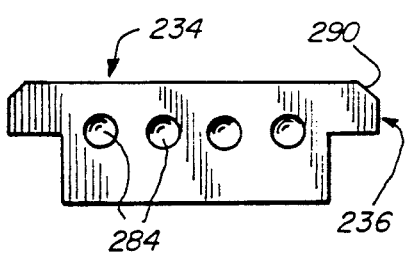
FIG. 15 is a front elevation view of the gripper block of FIG. 14.

Referring to FIGS. 14 and 15, there is illustrated gripper block 234 in accordance with the invention. Robot 112 engages a fry basket or other article that is to be moved or positioned by robot 112 in the following manner. Gripper fingers 212 of robot 112 are positioned so that channels 232 are aligned with mating projections 236 of gripper block 234, as illustrated in FIG. 10. Gripper block 234 is securely mounted to a fry basket or other article that is to be moved by robot 112. After gripper fingers 212 are in position as illustrated in FIG. 10, jaws 216 of end of arm tool 134 are closed to cause gripper fingers 212 to engage gripper block 234 as illustrated with phantom lines 242 in FIG. 10. Sufficient force is applied to gripper block 234 by gripper fingers 212 so that robot 112 can lift, move or otherwise change the position of the article that is secured to gripper block 234.

FIG. 14 illustrates how an article, in this case a fry basket 280, may be secured to gripper block 234. Only the end handle portion of fry basket 280 is illustrated which consists of four parallel rods 282 that are inserted into and mounted within four corresponding mounting holes 284 located within gripper block 234. Rods 282 or fry basket 280 may be secured within mounting holes 284 in a press-fit relationship or by any other suitable mounting technique, such as by welding, brazing or soldering.

Gripper block 234 can include a pair of vertically extending locator apertures 286 which are utilized to locate fry basket 280 with respect to other equipment in fry cell 110 such as transfer station 122, dump station 126 and fry vat 146 by means of correspondingly spaced locator pins as hereinafter described. Locator apertures 286 preferably have an enlarged entrance 288 which facilitates the insertion of the locator pins therein.

Mating projection 236 of gripper block 234 preferably includes a slanted shoulder portion 290 which can act as a guide to urge mating projection 236 into gripper finger channel 232.

Uncooked Bulk Food Dispensing Station

While uncooked bulk food dispensing station 114 is described with respect to specific dispensing devices, it is to be understood that any dispensing device capable of dispensing the type of food desired into a container held by robot 112 could be utilized in accordance with the invention.

Figure 3:
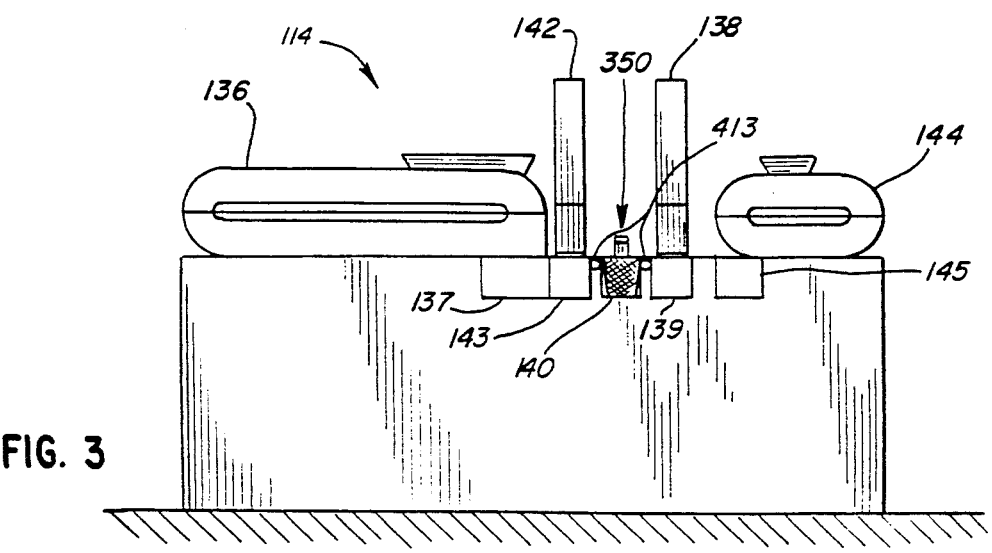
FIG. 3 is a front elevation view of the uncooked bulk food dispensing station forming part of the fry cell of FIG. 1.

Uncooked bulk food dispensing station 114 includes a french fry dispenser 136, a chicken patty dispenser 138, an optional pie basket pick-up platform 140 (having a fry basket 350 thereon), a fish filet dispenser 142 and a chicken nugget dispenser 144. FIG. 3 illustrates a front elevation view of uncooked bulk food dispensing station 114 which forms part of fry cell 110.

Figure 16:
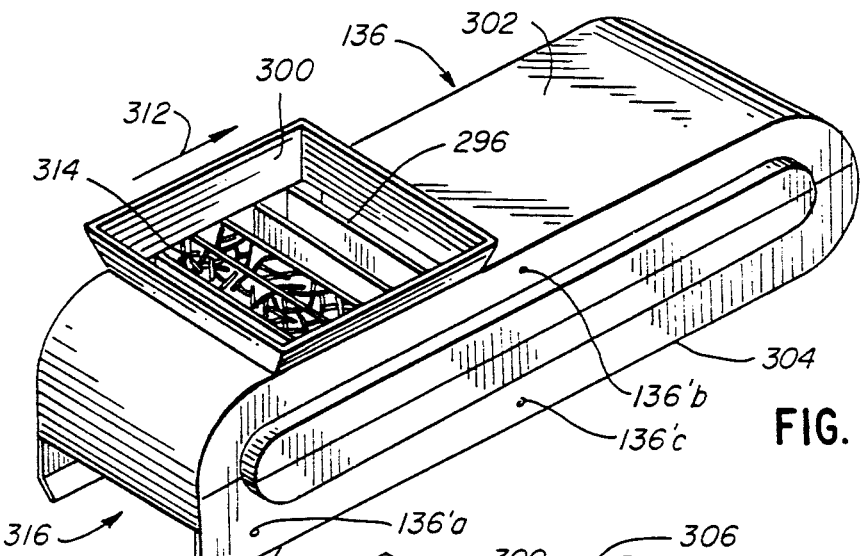
FIG. 16 is a perspective view of the french fry dispenser forming part of the fry cell of FIG. 1.
Figure 17:
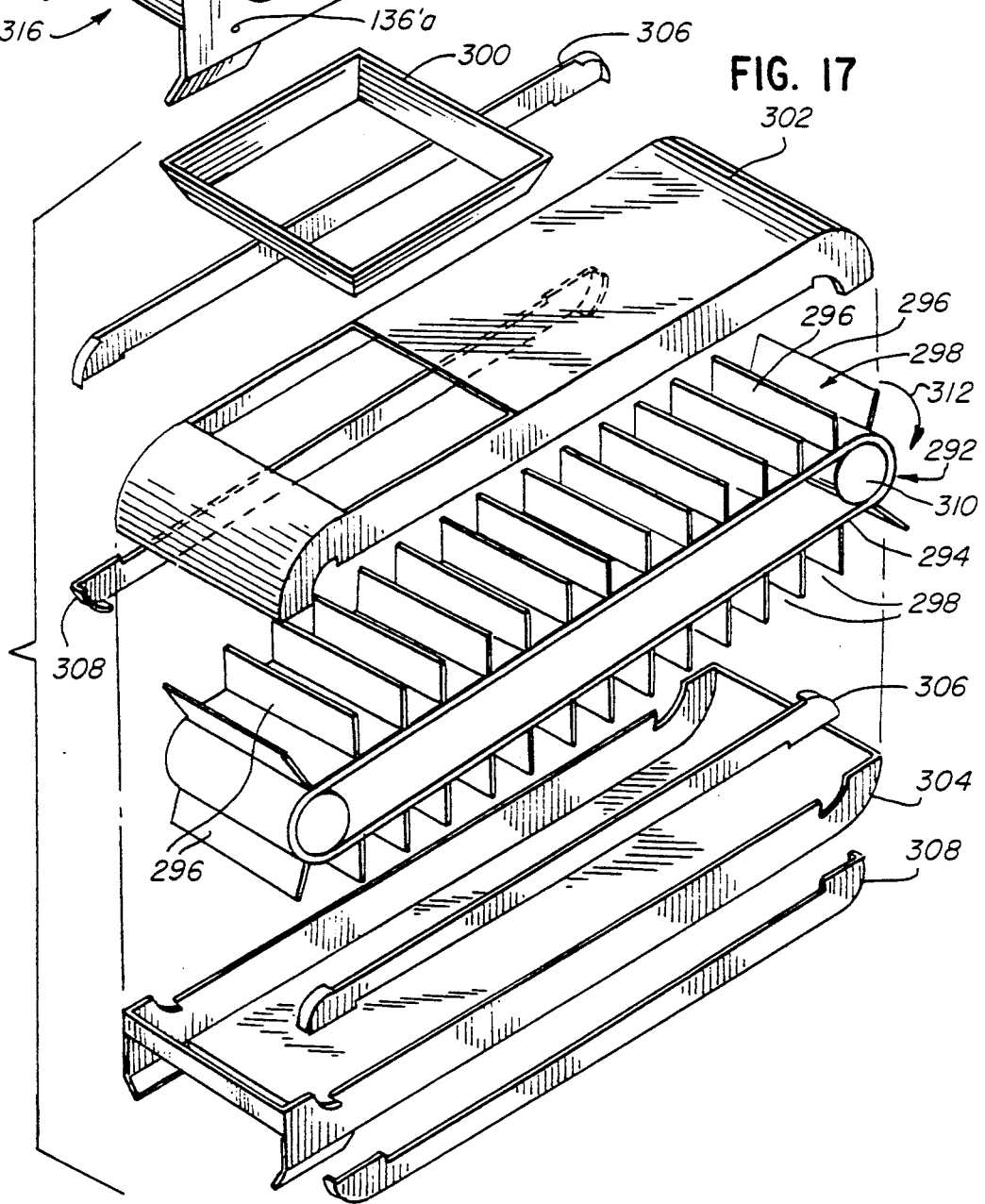
FIG. 17 is an exploded view of the french fry dispenser of FIG. 16.

Referring to FIGS. 16 and 17, there is illustrated french fry dispenser 136. French fry dispenser 136 is top-loading and bottom-dispensing. As more completely illustrated in FIG. 17, french fry dispenser 136 includes a compartmented conveyor 292 that includes a continuous web 294 and a plurality of spaced apart dividers 296 that extend normally from continuous web 294. Dividers 296 are spaced apart a predetermined distance so that the volume of each compartment 298 defined by dividers 296 is equivalent to the volume of uncooked french fries in one typical fry basket batch of french fries.

French fry dispenser 136 also includes a loading chute 300, an upper cover 302, a lower cover 304, upper side covers 306, lower side covers 308 and rollers 310. Rollers 310 are driven by a conveyor drive (not shown) in any manner known to those skilled in the art.

Since the direction of travel of continuous web 294 is clockwise as indicated by arrow 312, each of compartments 298 can be filled with french fries. Thus, french fry dispenser 136 can store and contain batches of french fries in compartments 298 located along the top and bottom of continuous web 294. Thus, for the embodiment illustrated in FIGS. 16 and 17, about 28 batches of french fries can be stored and space is utilized efficiently.

Upper and lower covers 302 and 304 and dividers 296 are configured in conjunction with rollers 310 so that there is no more than a relatively small gap between the exposed edge of dividers 296 and the adjacent portion of upper cover 302 or lower cover 304 so that the uncooked french fries which may be contained within compartments 298 are not crushed or smashed between dividers 296 and upper and lower covers 302 and 304.

Uncooked french fries 314 are dispensed at dispensing chute 316 located at the end of lower cover 304. Joint operation in fry cell 110, robot 112 engages and holds a fry basket underneath dispensing chute 316 and continuous web 294 is advanced until a compartment of french fries (or a portion thereof) is dispensed from dispensing chute 316 into the fry basket. Thereafter, continuous web 294 is stopped until it is desired to dispense another batch of uncooked french fries 314.

Uncooked french fries 314 may be loaded into french fry dispenser 136 as desired through loading chute 300. Uncooked french fries 314 may be frozen when loaded and if desired, insulation could be applied to french fry dispenser 136 (not shown) and french fry dispenser 136 could also be cooled by a suitable cooling apparatus (not shown).

Figure 18:
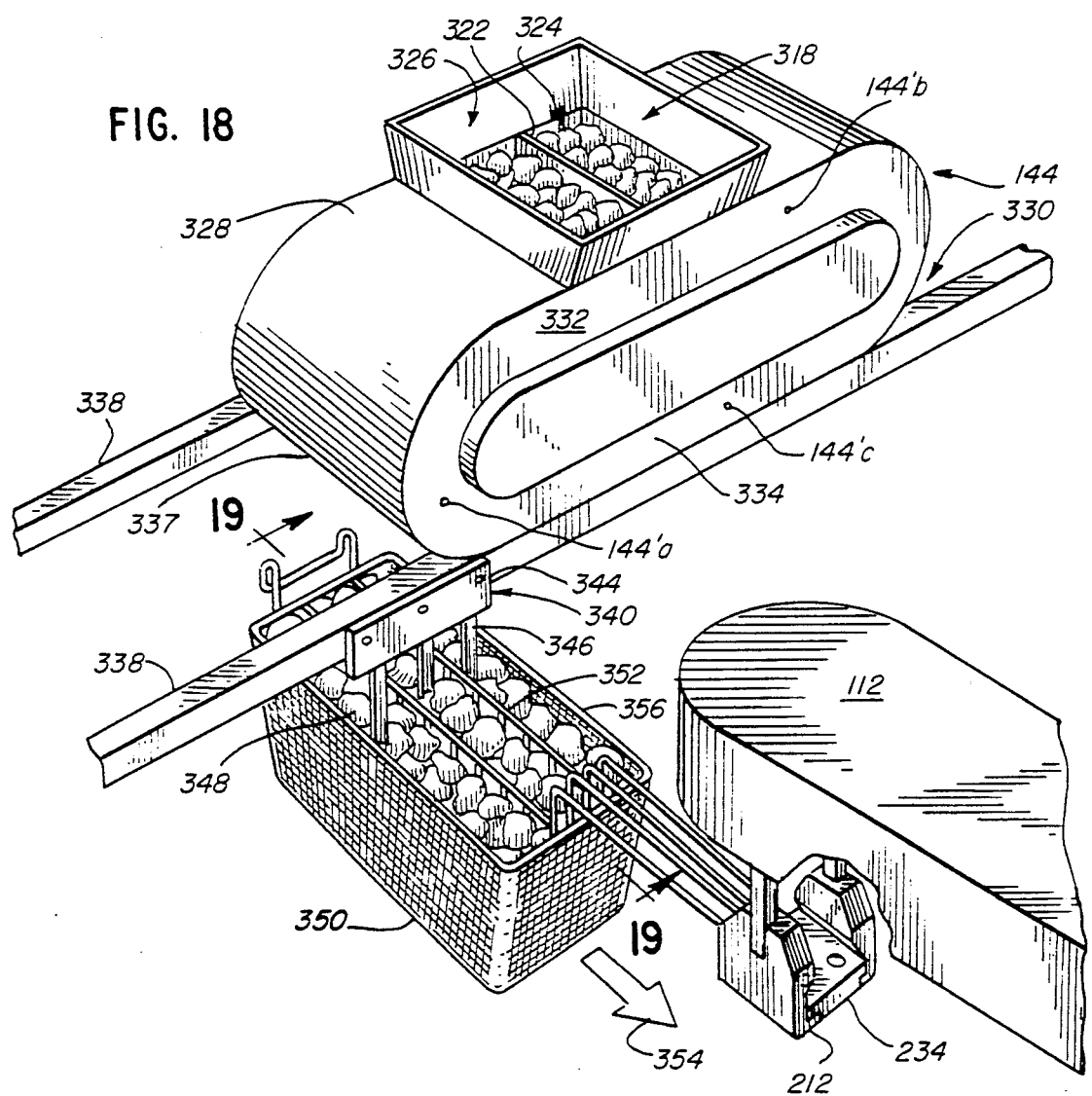
FIG. 18 is a perspective view of a chicken nugget dispenser and nugget distributor forming part of the fry cell of FIG. 1.

Referring to FIG. 18, there is illustrated in perspective view an automated chicken nugget dispenser 144. Chicken nugget dispenser 144 is of a construction similar to french fry dispenser 136 previously described except that typically chicken nugget dispenser 144 will be somewhat smaller than french fry dispenser 136. However, depending on the type of food to be dispensed, chicken nugget dispenser 144 could be large or the same size as french fry dispenser 136. Thus, chicken nugget dispenser 144 includes a compartmented conveyor 318, a continuous web (not shown), dividers 322, compartments 324, a loading chute 326, an upper cover 328, a lower cover 330, an upper side cover 332, a lower side cover 334, rollers (not shown), discharge chute 337 and a drive mechanism (not shown) for the continuous web.

Typically, chicken nuggets only include edible material and thus usually do not include material such as bones. However, it is to be understood that by reference to "chicken nuggets" is meant not only individual pieces of chicken that may be roughly bite-size and also may be in various shapes and other sizes but also types of chicken pieces which can include bones. The chicken nugget dispenser and associated equipment of the present invention could be used for other types of meat products, as well as other food material whether meat, vegetable or otherwise.

Figure 19:
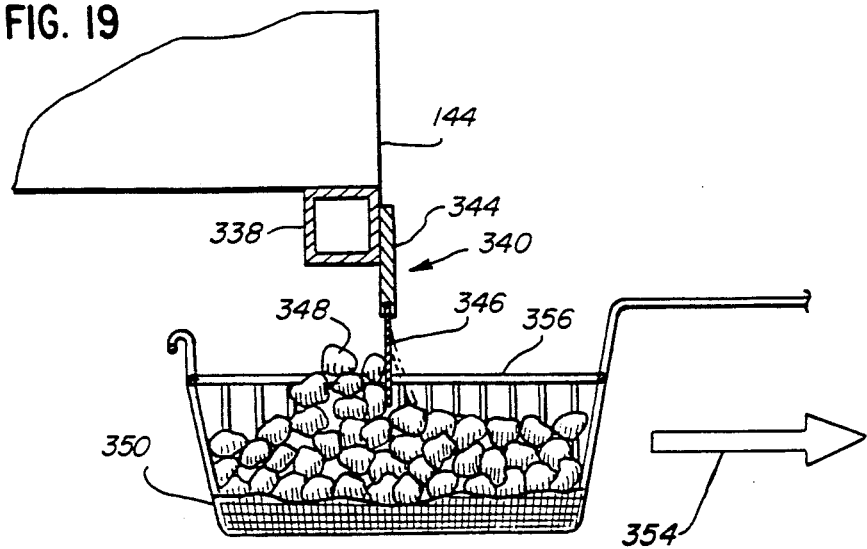
FIG. 19 is a side elevation view of the nugget distributor shown in operative position relative to a fry basket and chicken nuggets.

Referring to FIG. 19, there is illustrated a side elevation view of chicken nugget dispenser 144 mounted on a support 338 and shown with a chicken nugget distributing device 340 which is located beneath and at the side of dispensing chute 337 of chicken nugget dispenser 144.

Chicken nugget distributing device 340 consists of a frame 344 to which is mounted a plurality of downwardly extending fingers 346. The function of downwardly extending fingers 346 is to distribute chicken nuggets 348 within fry basket 350 as illustrated in FIG. 18. Fry basket 350 has several longitudinally extending dividers 352 for facilitating cooking of chicken nuggets. Fry baskets used in fry cell 110 may have desired configurations and dividers for the intended product. For a more complete description of such fry baskets and dividers, and the cooking of foods in such baskets, reference is made to U.S. patent application Ser. Nos. 07/121,988 (issued as U.S. Pat. No. 4,854,227 on Aug. 8, 1989) and 07/121,989 (abandoned in favor of file wrapper continuing application Ser. No. 07/366/283, which was abandoned in favor of file wrapper continuing application Ser. No. 07,494,793, which was allowed on Jun. 26, 1991), both filed Nov. 18, 1987, and entitled "Apparatus for Frying Food Products" and "Method of Frying Food Products", respectively, the disclosure of which is hereby incorporated by reference. Other types of fry baskets are known in the art and can be used in fry cell 110.

Downwardly extending fingers 346 act to distribute chicken nuggets 348 between dividers 352. During operation, robot 112 holds fry basket 350 directly below dispensing chute 237 and a compartment 322 of chicken nuggets is dispensed into basket 350 in a manner as described with respect to the operation of french fry dispenser 136. Robot 112 then moves fry basket 350 longitudinally in a direction as indicated by arrow 354 of FIG. 19 causing fingers 346 to contact and distribute any chicken nuggets 348 that have accumulated above the top edge 356 of fry basket 350.

Preferably, fingers 346 will be constructed of a relatively flexible material, such as spring steel, and preferably the middle finger is slightly shorter than the two outer fingers. As will be appreciated by those skilled in the art, additional or fewer fingers may also be utilized.

Figure 20:
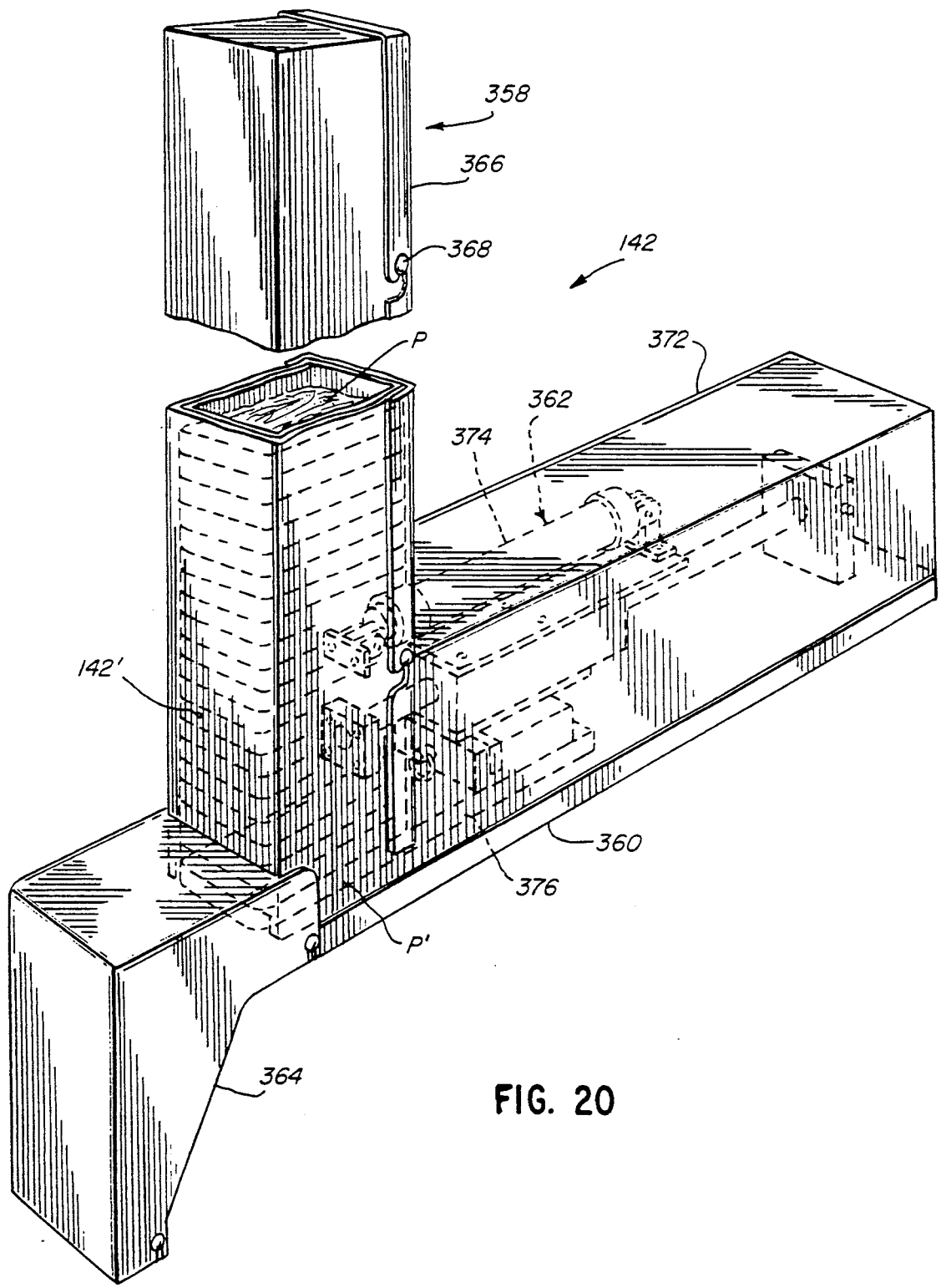
FIG. 20 is a perspective view of a first filet dispenser forming part of the fry cell of FIG. 1.
Figure 21:
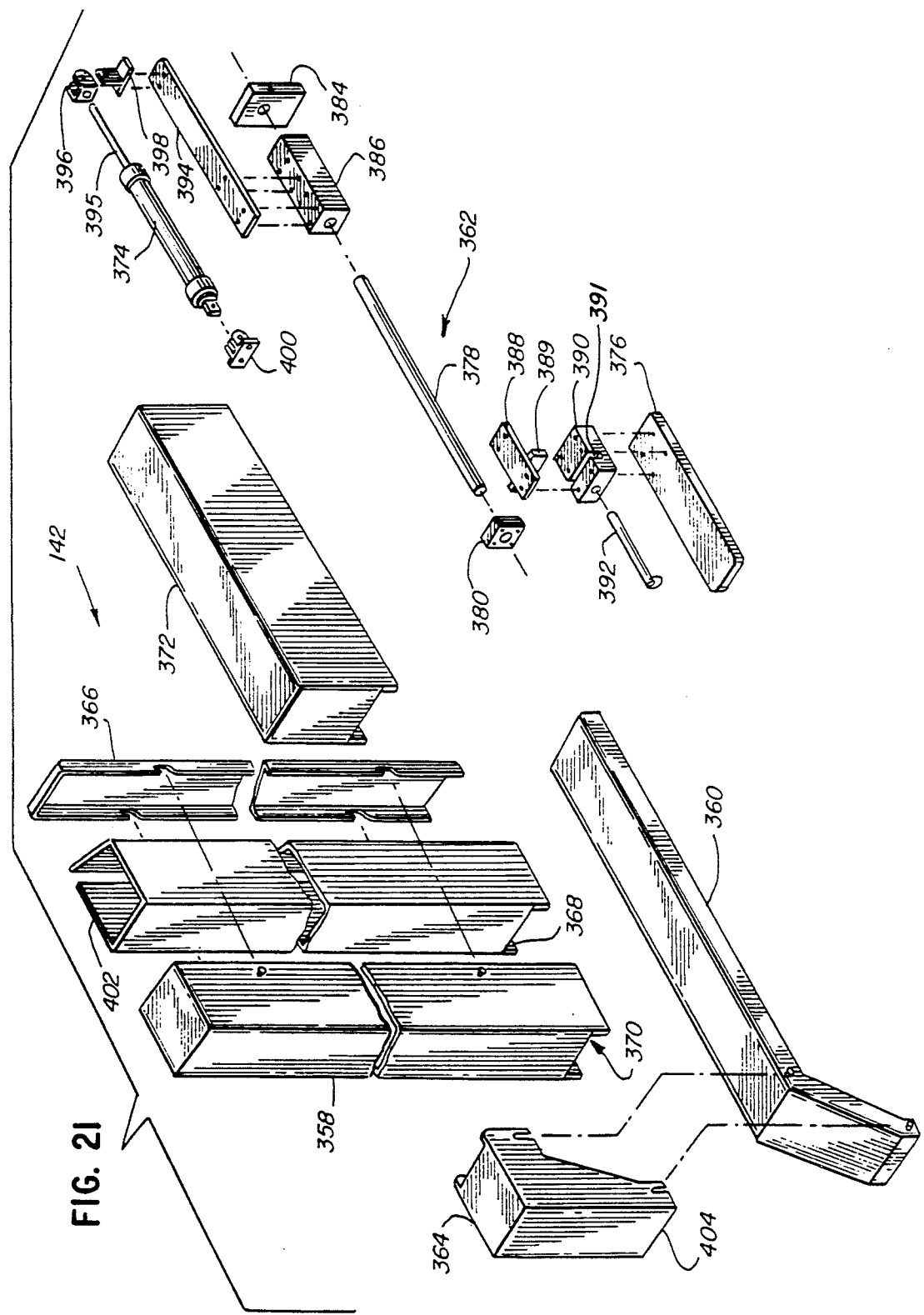
FIG. 21 is an exploded view of the fish filet dispenser of FIG. 20.

Referring to FIGS. 20-22 (a-c) there is illustrated various views of automated fish filet dispenser 142. The purpose of filet dispenser 142 is to dispense fish filets into a fry basket for cooking and/or heating. Generally, the fish filets dispensed will be frozen and uncooked.

Fish filet dispenser 142 includes a hopper 358, a base 360 on which hopper 358 is mounted, together with other components of fish filet dispenser 142, a discharge mechanism 362 and a discharge chute 364.

Hopper 358 is vertically-oriented and it is dimensioned to contain fish filets or other generally patty-shaped food product P. Patties P have been loaded into hopper 358 so that the major dimensions of patties P on a line vertically and substantially parallel to one another. In other words, patties P are placed in a vertical stack in hopper 358.

Access for loading and unloading hopper 358 may be provided through various arrangements. FIGS. 20 and 21 illustrate one such arrangement, namely, removable door 366 of hopper 358. When closed, door 366 comprises one of the walls of hopper 358. Door 366 is mounted by hanging on pins 368. Alternatively, door 366 may be mounted on hinges or in some other manner as known to those skilled in the art.

As better illustrated in FIG. 21, hopper 358 includes a discharge opening 370 which allows discharge of the bottommost patty P'. If desired, discharge opening 370 can be configured so that more than one patty or other food product is dispensed at a time from fish filet dispenser 142.

Discharge mechanism 362 is mounted to base 360 and is covered with cover 372. Discharge mechanism 362 is a pneumatically operated double acting cylinder 374, the operation of which extends and retracts a ram, which may be in the configuration of a bar 376.

Figure 22A:
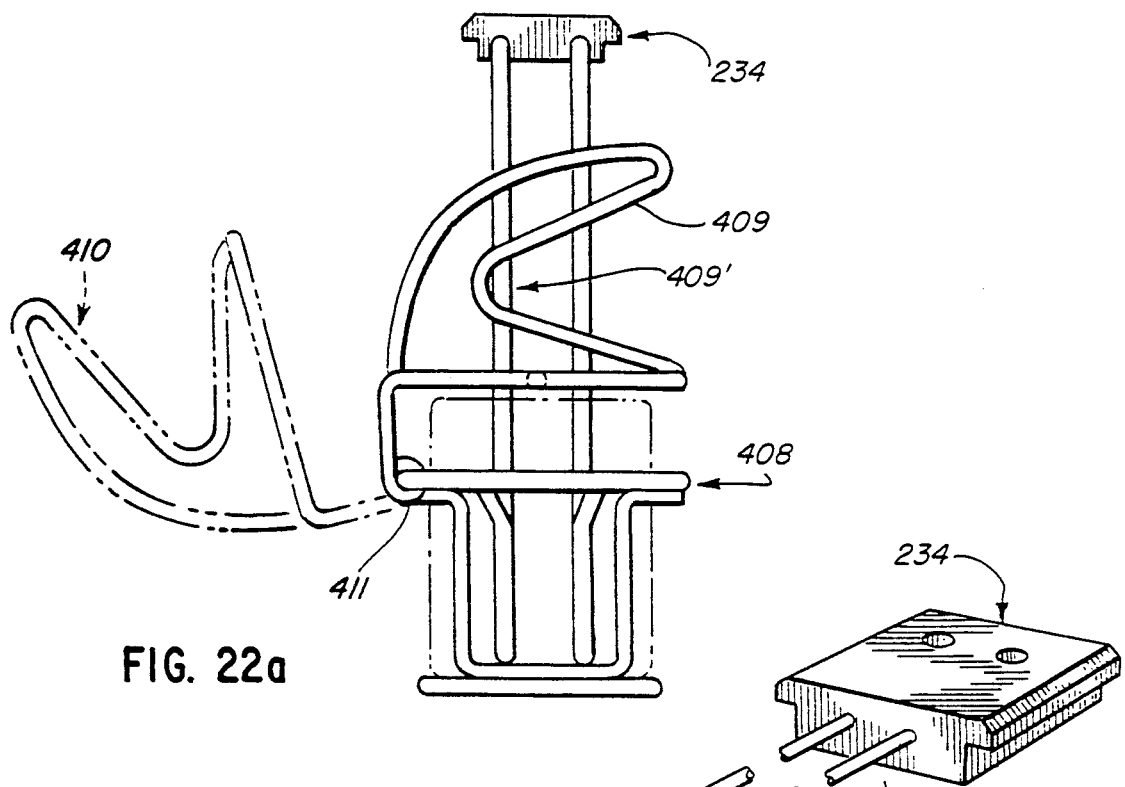
Figure 22B:
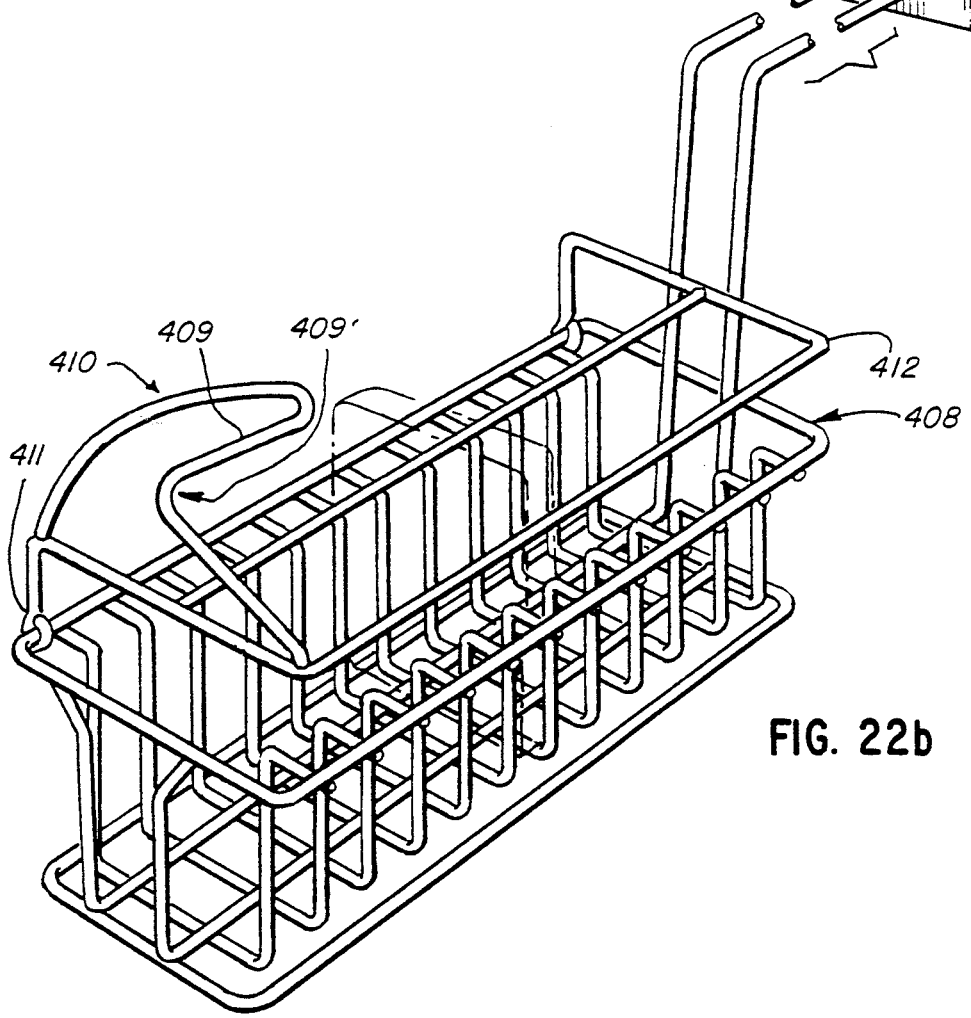

FIG. 21 illustrates discharge mechanism 362 in greater detail. As discussed above, discharge mechanism 362 is provided to dispense or push the bottommost patty P' from the stack and out of hopper 358 through discharge opening 370. Discharge mechanism 362 comprises a bar 376 which is reciprocated between an extended and retracted position. Bar 376 reciprocates between these positions on base 360. In its retracted position, bar 376 is located behind the bottommost patty P' and is in position to push the bottommost patty P' from the stack and out through discharge opening 370. In its extended position, as illustrated in FIG. 22b, bar 376 has pushed bottommost patty P' out discharge opening 370. Bar 376 can be solid or hollow and may be constructed from Delrin TM, an acetal thermoplastic resin from E. I. DuPont de Nemours & Co. Bar 376 may be any of a number of configurations or shapes as long as it accomplishes its function of dispensing a patty.

Bar 376 is mounted onto guide 378 for slidable movement via chassis 386. Guide 378, which may be in the shape of a cylindrical rod, is mounted above bar 376 and is held in place by forward mount 380 which is itself mounted to a housing 382 and a rear mount 384, which is mounted to base 360. A chassis 386 is slidably mounted onto guide 378. Attached to chassis 386 is a first bar bracket 388 and a second bar bracket 390. Second bar bracket 390 is attached directly to bar 376. First bar bracket 388 includes a tongue 389 which is inserted into groove 391 of second bar bracket 390 and maintained in position with connector pin 392 to thereby connect bracket 388 to bracket 390. Chassis 386 is mounted to double acting pneumatic cylinder 374. Double acting pneumatic cylinder 374 is selectively activatable and is used to reciprocate bar 376 between extended and retracted positions. Chassis 386 is slidably moveable along guide 378 and is attached to an overhead bracket 394, which is connected to ram 395 of pneumatic cylinder 374 by top brackets 396 and 398. Pneumatic cylinder 374 is mounted to housing 382 by cylinder mount 400. Movement of ram 395 results in movement of chassis 386 which in turn moves bar 376 through brackets 388 and 390. Other arrangements for causing the desired selective movement of bar 376 will be known in the art.

Also illustrated in FIG. 21 is a removable liner 402. Liner 402 is located between the walls of hopper 358 and patties P. Liner 402 may be fastened to the walls of hopper 358 in any one of a number of ways, such as by snaps which may be of stainless steel. There are a number of advantages to using a liner. For example, liner 402 is removable for cleaning. Periodic cleaning is desirably necessary since food products are being handled. Also, liner 402 preferably has a lower heat transfer coefficient than the material from which hopper 358 is constructed. For example, hopper 358 may be constructed from stainless steel or a similar type of material and liner 402 may be constructed of a plastic or polymeric material such as polycarbonate, which may be Lexan ®. The lower heat transfer coefficient of liner 402 provides a layer of insulation between patties P and the ambient atmosphere. Thawing of patties P is therefore delayed by the use of liner 402.

Several of the components of fish filet dispenser 142 may be removable so that cleaning is facilitated. For example, hopper 358, chute 364 and housing 382 may all be removably mounted so that all areas which contact the patties P during operation may be cleaned.

FIG. 20 illustrates one resting position of fish filet dispenser 142. Bar 376 is shown at rest in its extended position. Bar 376 is further shown to extend a small length out of discharge opening 370. Patties P are thus at rest on top of bar 376. In its resting position, air contact between the ambient atmosphere and patties P is minimized.

FIGS. 21a-c illustrate the sequence through which bottommost patty P' may be dispensed. In FIG. 21a, bar 376 is in its retracted position, in ready to push bottommost patty P' out of hopper 358 through discharge opening 370. As bar 376 pushes the bottommost patty P' through discharge opening 370, bar 376 occupies essentially the same space formerly occupied by patty P' and thus any disturbance, to breaking or movement of next patty P,, is minimized. Pneumatic cylinder 374 has pushed bar 376 from its extended position to its retracted position. As bar 376 is moved into its retracted position, the entire length of bar 376 has moved out of hopper 358. Consequently, the stack of patties: P moves vertically downward and the space which bar 376 had previously occupied in hopper 358 is now occupied by the bottommost patty P.

In FIG. 21b, bar 376 is shown to have been moved by pneumatic cylinder 374 to its extended position. The bottommost patty P' has already been pushed from hopper 358 and chute 364.

FIG. 21C illustrates how chute 364 is capable of directly patty P' to a predetermined location, such as a fry basket 408. Chute 364 is wide at its upper portion and gets increasingly narrower toward its bottom 404. As patty P' falls into chute 364, patty P' slides downward along chute 364. Chute 364 is downwardly inclined. At its bottom 404, chute 364 is only wide enough to allow a patty P out of chute 364 when it is substantially vertically aligned. Therefore, patty P' is substantially vertically aligned as it leaves chute 364 and remains vertically aligned as it is loaded into fry basket 408.

Refrigeration coils and/or insulation (not shown) may be provided around hopper 358 to prevent or retard thawing.

The structure for maintaining cooling which may be provided should be preferably capable of retarding thawing at an acceptable rate such that the time for storing the frozen products in a kitchen environment may be extended to at least two hours. This extended storing time can decrease the loading frequency.

Automated chicken patty dispenser 138 is similar in construction to fish filet dispenser 142 except that it may be dimensioned to accommodate the size of chicken patty desired to be dispensed. Also, fish filet dispenser 142 and chicken patty dispenser 138 may be positioned in side-by-side relation and utilize common insulation and/or refrigeration.

Reference is made to U.S. patent application Ser. No. 07/176,492, now abandoned, filed Apr. 1, 1988, now abandoned and entitled "Patty Dispensing Method and Apparatus"] by inventors Robert L. Cahlander, David Carroll, Al Hollingsworth and John 0. Reinertsen for a more complete description of fish filet dispenser 142, the disclosure of which is hereby incorporated by reference.

As illustrated in FIG. 3, loading areas are provided beneath each of dispensers 136, 138, 142 and 144, referred to by reference numerals 137, 139, 143 and 145, respectively. Each of loading areas 137, 139, 143 and 145 are dimensioned to allow robot 112 to insert a basket therein to receive food from corresponding dispenser 136, 138, 142 or 144, respectively.

In connection with the cooking of fish filets and chicken patties, preferably like structure is provided to prevent or restrain these food products from floating to the surface when a fry basket 408 containing such products is placed in one of fry vats 146. One suitable structure for preventing unwanted floating is illustrated in FIGS. 22a and 22b and consists of bail mechanism 410 mounted to fry basket 408. Bail mechanism 410 is attached to fry basket 408 and may be constructed from wire rods and includes a hinge 411 that allows bail mechanism 410 to be moveable between open and closed positions. In the closed position, as illustrated in FIGS. 22a and 22b, elongated body 412 of bail 410 extends along the top of basket 408 and prevents fish filets F from floating undesirably when placed in fry vat 146. Bail 410 is illustrated in the open position with phantom lines in FIG. 22a. Bail 410 closes when basket 408 is lowered into fry vat 146 because the side of vat 146 contacts bail 410 and rotates bail about hinge 411 as basket 408 is lowered into vat 146 until bail 410 falls into the closed position. The weight of bail 410 prevents the food in basket 408 from floating to an undesired degree.

Thus, when basket 408 is removed from vat 146, bail 410 will be closed. Robot 112 can open bail 410 by placement with respect to one of fingers 413 and subsequent downward movement as hereinafter described. To open bail 410, robot 112 positions closed bail 410 with respect to one of fingers 413 so that finger 413 extends through V-shaped notch 409' of bail catch 409. As robot 112 lowers basket 408 with respect to finger 413, bail 410 is opened.

Fry Vat and Related Equipment

Figure 4:
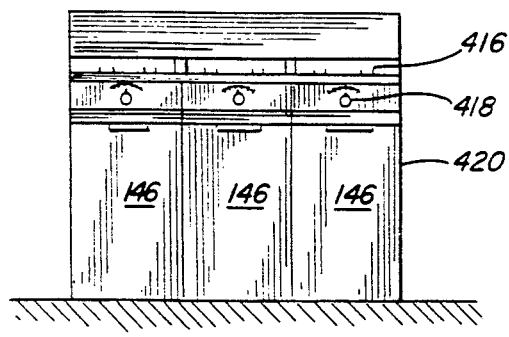
FIG. 4 is a front elevation view of a fry vat forming part of the fry cell of FIG. 1.

Referring to FIG. 4, fry vat 146 is illustrative of a preferred type of fry vat that can be used in accordance with fry cell 110. As will be evidenced to those skilled in the art, other types of fry vats could be used in place of fry vat 146. Each fry vat 146 includes a cooking vat or tank 414 for containing a sufficient quantity of a cooking fluid to effect proper cooking of food placed therein, a suitable heater for heating the fluid vat, such as an electric or gas heater (not shown) and a pair of locator pins 416 for each cooking location of fry vat 146. Fry vats 146 usually also include a temperature control device 418 which may be manual or automatic and can be monitored and/or controlled by computer operating and control station 128. Each fry vat 146 is housed in a suitable cabinet 420 which can include wheels (not shown) for facilitating movement of cabinet 420.

Cooking vat or tank 414 may be partitioned by a divider 415 as illustrated in FIG. 1. Divider 415 serves to segregate the cooking fluid when positioned in cooking vat tank 414 allowing fry vat 146 to cook two different types of food without taste contamination of the cooking fluid.

Figure 4A:
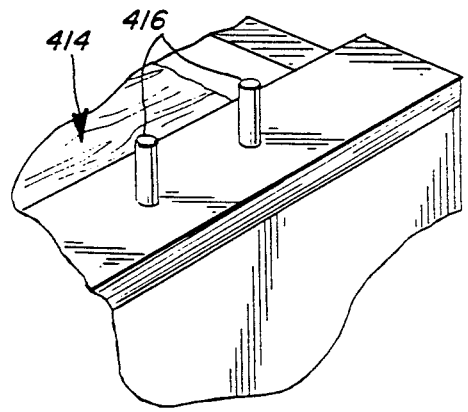
FIG. 4A is a perspective view of the locator pins of FIG. 4.

As shown in FIG. 4A, locator pins 416 are upwardly extending and are dimensioned and spaced apart to allow mating with locator apertures 286 of gripper block 234.

Figure 4B:
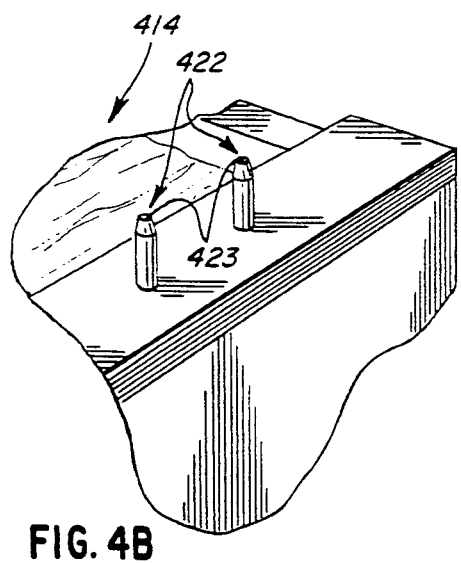
FIG. 4B is a perspective view of another embodiment of the locator pins of FIG. 4A.

Another embodiment of locator pins is illustrated in FIG. 4B where locator pins 422 are provided that include tapered ends 423 for facilitating positioning gripper block 234 thereover within locator apertures 286. Once gripper block 234 is placed over locator pins 416 or 422, because of the mating relationship of locator pins with locator aperture 286, the gripper block is prevented from substantial movement other than upward vertical movement when, for example, robot 112 removes fry basket 280 together with gripper block 234 from fry Vat 146 and the locator pins. Locator pins 416 are also provided at transfer station 122 and dump station 126 as hereinafter described.

Locator pins 416 and 422 could be of other shapes and sizes, as desired, as long as the desired positioning and position retention is provided. For example, locator pins 416 or 422 could be rectangular or oval in cross section instead of being cylindrical. Also, a single locator pins could be used although such an arrangement generally would not be as effective for positioning. Locator pins 416 could be located on gripper block 234 and locator apertures 286 could be provided in fry vat 146.

Other equipment associated with fry vats 146 includes a cooking fluid refill system 424, a skimming system 426 and a drip pan system 428.

As illustrated in FIGS. 31-33A, cooking fluid refill system 424 includes an ultrasonic sensor 430, a cooking fluid refill reservoir 432 and an activating mechanism 434 associated with each fry vat 146.

Ultrasonic sensor 430 is mounted on robot arm 166 and detects the level of oil in each of vats 146 which is monitored by computer operating and control station 128. When a low level is detected in a particular vat, station 128 directs robot 112 to fill that vat to a desired level, as detected by sensor 430, when robot 112 is not required to perform other tasks. Other types of sensors may be used in place of sensor 430, such as optical which may use infrared radiation.

To add cooking fluid to one of vats 146, robot 112 picks up cooking fluid refill reservoir 432, which is located within the work area of robot 112. Reservoir 432 includes a container 436 for containing cooking fluid, a robot gripper block 234 on the top of container 436, a dispensing spout 438 and a valve 440 for opening and closing dispensing spout 438, which in this case is a ball valve.

To add cooking fluid to one of Vats 146, robot 112 positions reservoir 432 over activating mechanism 434, which in the illustrated embodiment is an upwardly extending rod 434. Reservoir 432 is then lowered on rod 434 which dislodges and opens ball valve 440, causing the cooking fluid to be dispensed into vat 146, as shown in FIG. 33A. When the desired amount is dispensed, robot 112 lifts reservoir 432, causing rod 434 to disengage and ball valve 440 closes. Robot 112 then returns reservoir 432 to its storage position or moves it to another fry vat 146 for additional dispensing.

Figure 28:
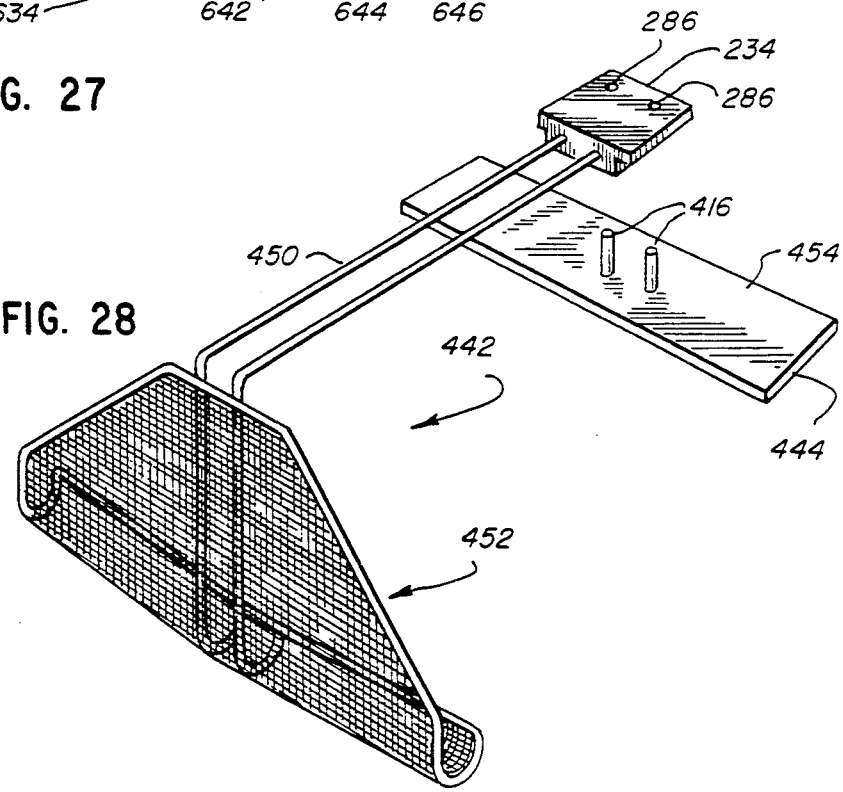
FIG. 28 is a perspective view of a particle skimmer utilized in the fry cell of FIG. 1.

Skimming system 426 is illustrated in FIGS. 28-30, and includes a skimmer 442, a skimmer holding bracket 444, a wiper 446 and a waste container 448.

Skimmer 442 includes a handle portion 450, at one end of which is mounted the gripper block 234, and at the other end is mounted a skimming head 452. End of handle portion 450 may be constructed of wire rods and skimming head 452 may be constructed to wire mesh of a small enough size so that particles collected by skimming head 452 can not pass through the wire mesh. Skimming head 452 may be in the shape of a trough.

During storage, skimmer 442 is located on holding bracket 444. Holding bracket 444 consists of a base 454 to which is mounted a pair of locator pins 416. When it is desired to skim a fry vat 146, robot 112 picks up skimmer 442 by engaging gripper block 234 of skimmer 442. Robot 112 can then position and maneuver skimmer 442 in a desired manner by placing skimming head 452 at or beneath the surface of cooking fluid in cooking vat 146 and then pulling skimmer 442 in a direction toward the front of fry vat 146. Skimming head 452 is configured in a slight "U" so that skim particles tend to flow toward the center of skimming head 452 when lifted from one of vats 146.

After skimming a particular cooking vat 146, robot 112 transports skimmer 442 to wiper 446 and waste container 448. At this location, skimming head 452 is positioned beneath and in contact with wiper 446. Robot 112 then drags skimmer 442 along the bottom of wiper 446 causing skimmed particles and other materials collected by skimming head 452 to be deposited into waste container 448.

Referring to FIG. 35, there is illustrated drip pan system 428. Drip pan system 428 consists of removable drip pans 456 that are positioned between fry vats 146, transfer station 122, transfer slide 124 and dump station 126 under the paths that the fry baskets are caused to traverse by robot 112. Locator pins 416 are also illustrated mounted to fry vat 146 in FIG. 35.

A basket wiper 458 wipes the underside of a fry basket as it is removed from fry vat 146 to reduce the amount of cooking fluid that will drip from the basket after removal. Basket wiper 458 may be constructed of a suitable flexible material, such as neoprene rubber.

The fry baskets used in fry cell 110 when not in use can be stored in fry vats 146. Preferably, each fry basket is assigned a specific fry vat location. The fry baskets when not in use could also be stored in a suitable rack or cabinet, for example.

Cooked Food Storage, Dispensing and Display Station and Related Equipment

Figure 5:
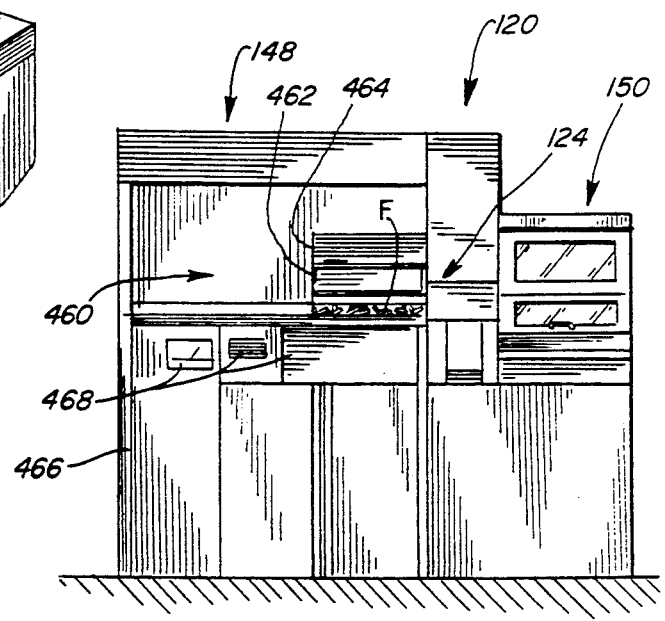
FIG. 5 is a front elevation view of the cooked food stations forming part of the fry cell of FIG. 1.

Referring to FIG. 5, there is illustrated an elevation view of cooked food storage, dispensing and display station 120 in accordance with a preferred embodiment of the invention which consists of a french fry bagging station 148, a chicken nugget cabinet 150 and a transfer slide 124. Station 120 receives cooked food delivered by robot 112 Via dump station 126.

French fry bagging station 148 includes a french fry holding bin 460 for holding cooked french fries F deposited therein, and a french fry slide 462 for directing french fries into holding bin 460 from dump station 126. French fry bagging station 148 may also include a shield 464 for deflecting any french fries that may be thrown up by dump station 126 into french fry slide 462 (as shown in FIG. 26), a cabinet 466 and various storage areas 468 for storing french fry containers, utensils and other items are desired. French fry bagging station 148 may also include a heating mechanism (not shown) for warming cooked french fries F.

Figure 38:
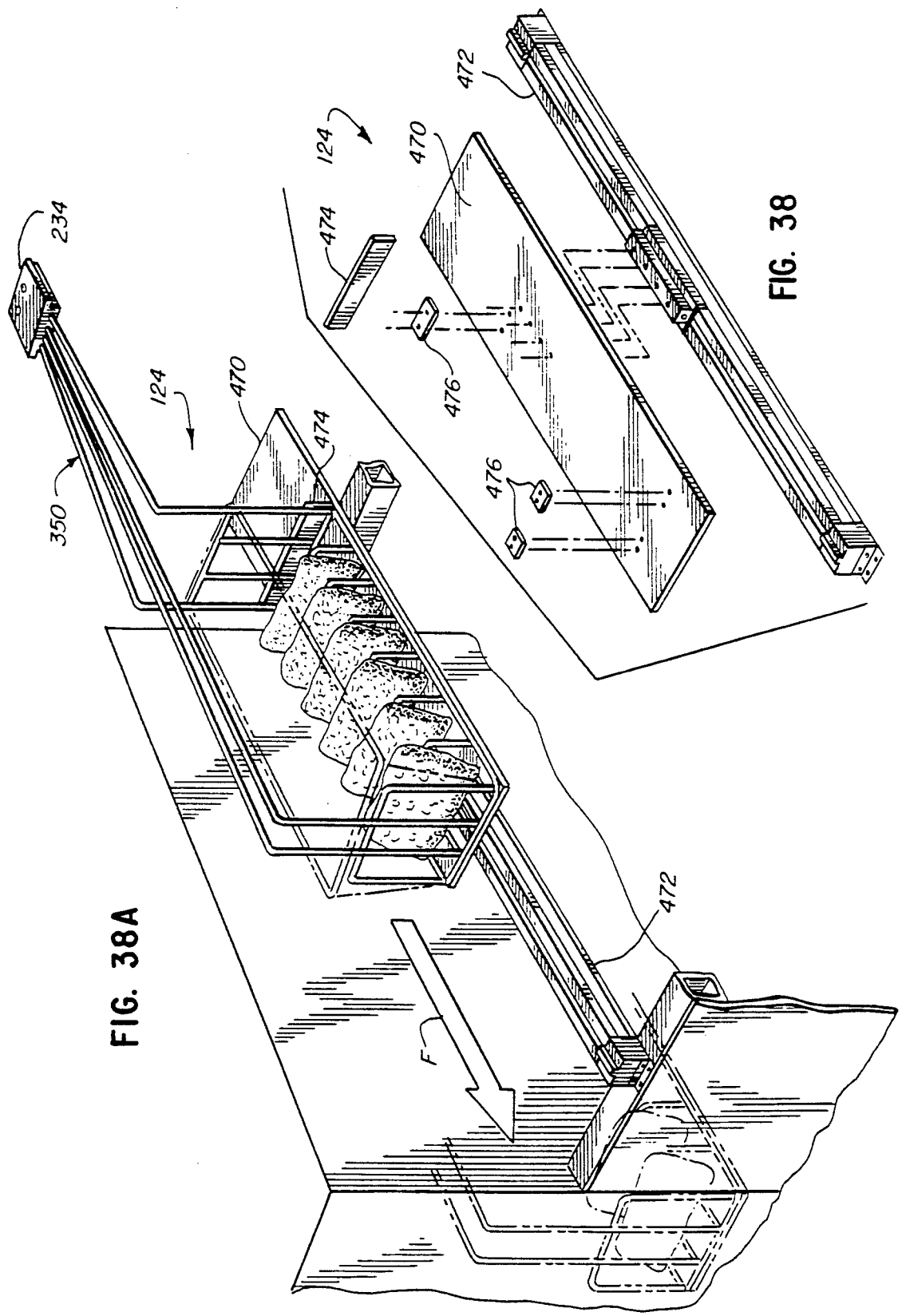
FIG. 38 is an exploded view of the transfer slide mechanism of FIG. 38A.

Transfer slide 124 of cooked food storage, dispensing and display station 120 is illustrated in FIG. 38A and shows a fry basket 350 for pies in position thereon. Transfer slide 124 allows delivery of various types of food products from the cooking and dispensing stations of fry cell 110 to allow cooling, packaging or delivery to customers, for example, for items such as individual-sized pies and/or hash brown potatoes. As more completely illustrated in FIG. 38, slide 124 includes a transfer plate 470, a slide track 472, a fry basket stop 474 and fry basket rest tabs 476.

Transfer plate 470 is slidably mounted on slide track 472 to allow linear movement along side track 472. Transfer plate 470 can be moved by any suitable mechanism, such as by a pneumatic cylinder (not shown). In operation, a quantity of freshly cooked food, such as a fry basket containing individually sized pies or hash browns is placed on transfer plate 470 by robot 112 over fry basket rest tabs 476 and abutting fry basket stop 474 preventing the fry basket from moving as the slide moves forward. The cooked food may remain in the rear position during cooling and after cooling transfer plate 470 of transfer slide 124 moves forward in a direction indicated by arrow F to the forward position illustrated partially in phantom lines in FIG. 38A and into cooked food storage, dispensing and display station 120 where the food and basket 350 are readily accessible for packaging the food contained in basket 350, for example. Also, basket 350 could be loaded with uncooked pies or hash browns for pick-up by robot 112 from transfer plate 470 for delivery into one of vats 146.

Referring to the FIGS. 23(a)-(g), there is illustrated a chicken nugget cabinet 150 for chicken nugget storage, dispensing and display (hereinafter "cabinet 150") useful as part of fry cell 110. Cabinet 150 includes a floor 478 with sidewalls 480. Sidewalls 480 extend upwardly from the sides of floor 478 which are inclined. Floor 478 is held in an inclined position through attachment to frame 482. Cabinet 150 has an opening 484 at its inclined top end, between sidewalls 480, for receiving food products (illustratively and hereinafter chicken nuggets N) into cabinet 150. Cabinet 150 has a deflector plate 486 for assisting in loading nuggets N into cabinet 150. At the end of cabinet 150 opposite opening 484 is end wall 490 extending generally upwardly. End wall 490 serves to prevent nuggets N from exiting out of cabinet 150 after nuggets N reach the bottom end of floor 478.

As seen in FIGS. 23(c)-(g), a plurality of selectively moveable dividers 492 are positioned intermediate the ends of cabinet 150. Dividers 492 each form a moveable barrier between sidewalls 480 and across floor 478 for holding nuggets N behind dividers 492 when in a closed position. Nuggets N are not restrained from sliding down inclined floor 478 when dividers 492 are in an open position. Dividers 492 may be mounted for movement between open and closed positions in any one of a number of ways. In the preferred embodiment, each divider 492 is mounted on a rotatable shaft 494 extending through sidewalls 478.

Dividers 492 may be moved between open and closed positions in any one of various ways. In the preferred embodiment, pneumatic cylinders 496 are used to move dividers 492 between open and closed positions. Each shaft 494 may be connected to a cylinder 496 by any suitable means, such as by a connecting arm 498. Each of cylinders 496 are selectively activatable, either manually or otherwise, such as by computer operating and control station 128

As seen generally in FIGS. 23(c)-(f), dividers 492, when cylinders 496 are activated, are capable of being pivoted between a closed position in which dividers 492 may be substantially perpendicular to floor 478 and an open position in which dividers 492 may be substantially parallel to floor 478. Dividers 492 do not need to be substantially perpendicular to floor 478 in their closed position or substantially parallel to floor 478 in their open position for the invention to be operative. Dividers 492 may form an angle with floor 478 in their closed and/or open positions as long as nuggets are restricted from movement in the closed position and are unrestrained in the open position.

Figure 23A:
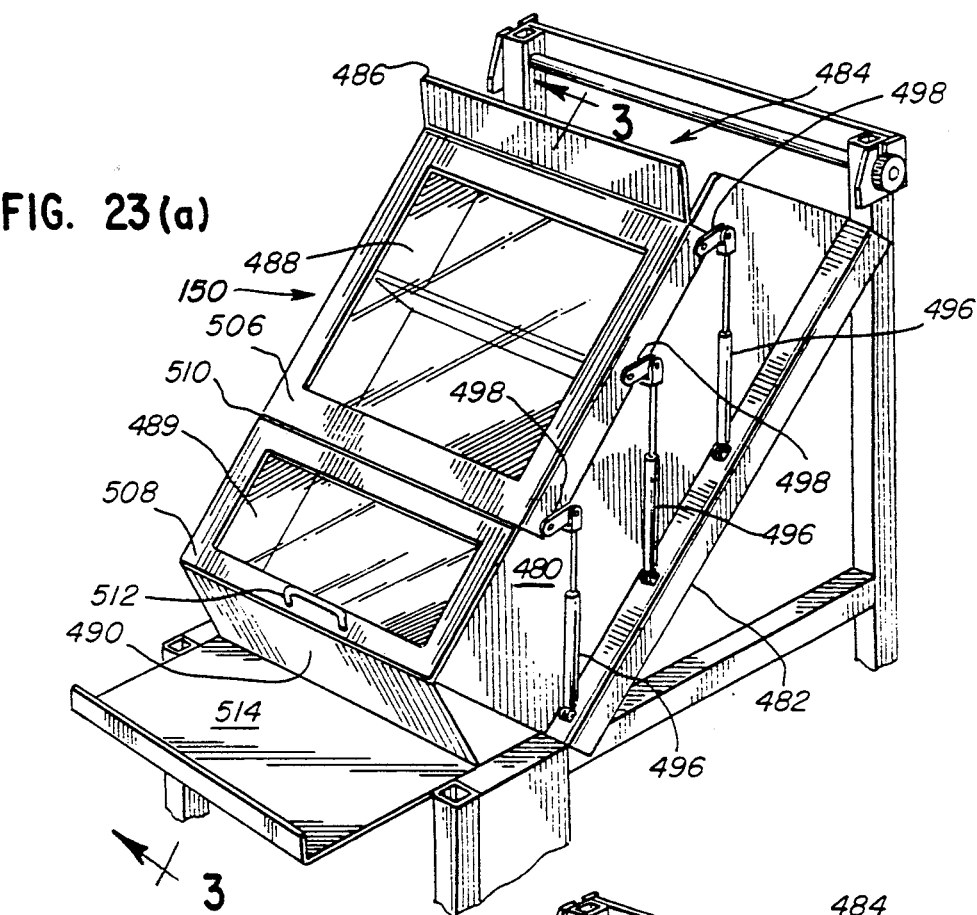
FIGS. 23(a)-(g) illustrate various views of a chicken nugget cabinet forming part of the fry cell of FIG. 1.
Figure 23B:
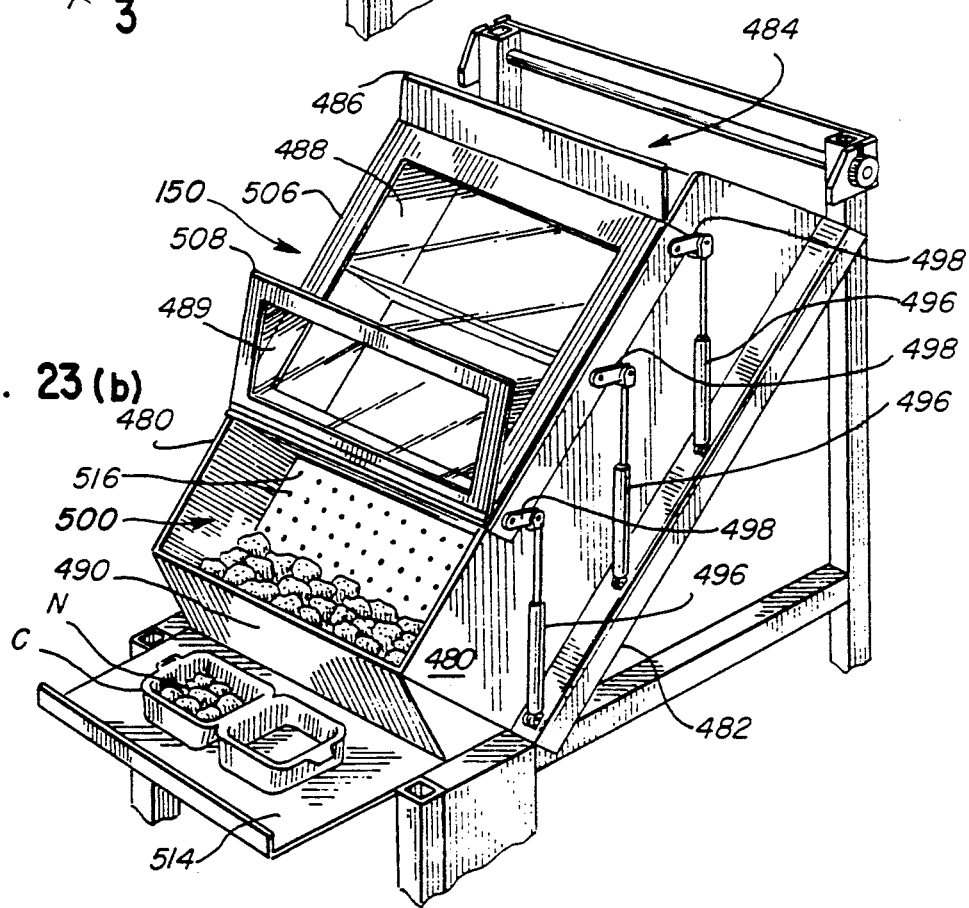
Figure 23:
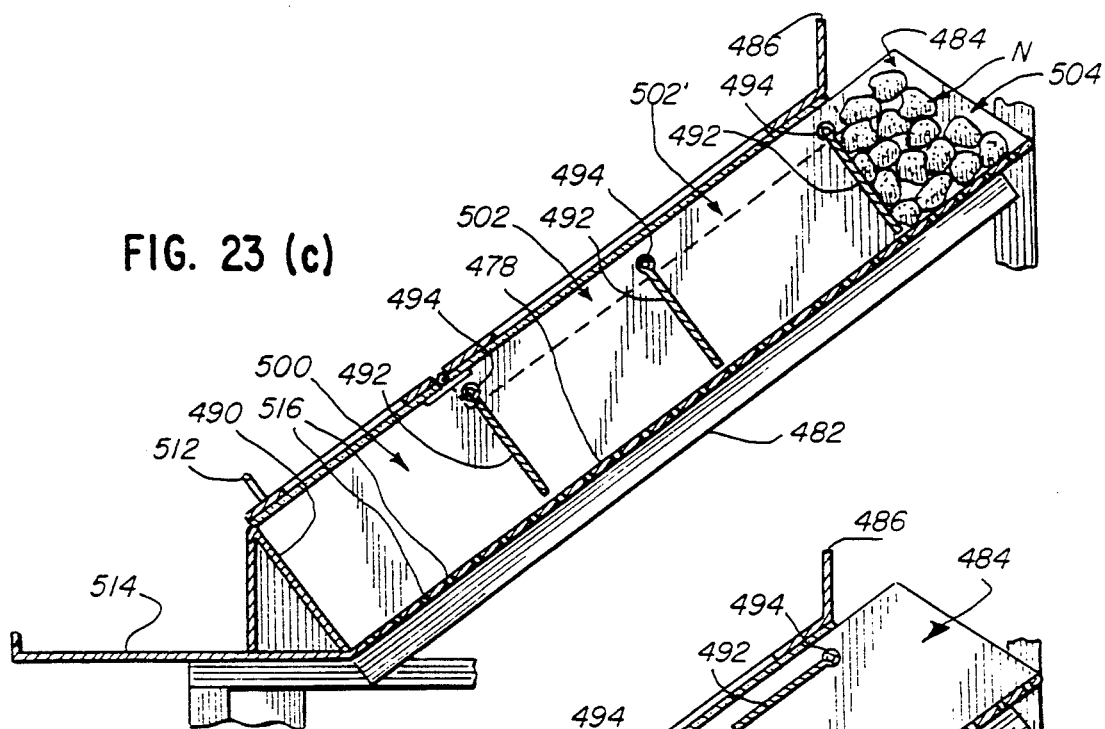

Dividers 492 extend across floor 478 between sidewalls 480 so that nuggets N may be loaded and held behind dividers 492 when dividers 492 are in their closed position. The spacing of the bottom, middle and top dividers 492 from each other together with end wall 490 and opening 484 forms bottom, middle and top compartments 500, 502, 502' and 504, respectively. Bottommost compartment, compartment 500, is formed by sidewalls 480, end wall 490 and bottom divider 492. Middle compartments, compartments 502 and 502', are formed by sidewalls 480 and middle and top dividers 492. Top compartment 504 is formed by sidewalls 480 and top divider 492. Each of these compartments are of sufficient volume to hold at least one batch of nuggets N. As illustrated in FIG. 23(f), providing for additional volume in the compartments than that sufficient to only hold one batch of food products is preferred to provide clearance for dividers 492 to swing between open and closed positions even after a batch has been loaded in the compartment immediately down the incline from a divider 492.

A cover structure may be provided over the top of cabinet 150. For example, a cover 506 may be mounted atop sidewalls 480. Cover 506 provides a dust cover for cabinet 150 so that dust and other particulate matter is better restricted from entering the interior of cabinet 150. As illustrated in FIGS. 23(a) and 23(b), access door 508 is formed in a portion of cover 506 for movement between open and closed positions. Door 508 provides access to bottom compartment 500. Door 508 may be attached to the rest of cover 506 by hinge 51 0 or by some other arrangement which provides for open and closed positions of door 508. A handle 512 has been provided on door 508 for assisting the operator from moving door 508 between open and closed positions. Nuggets N may then be removed from compartment 500 and loaded into a container C. A shelf 514 may be provided forward of end wall 490 to provide a staging area for loading nuggets N from compartment 500 into container C. Cover 506 and door 508 may each have a window 488, 489, respectively, to allow the contents of cabinet 150 to be viewed.

Floor 478 contains a plurality of apertures 516. Apertures 516 are provided for allowing excess cooking oil, loose food particles or other small particulate matter and liquids to fall through the apertures. A pan (not shown) is positioned beneath floor 478 for receiving any matter that passes through apertures 516, such as the excess oil and loose food particles.

The sequencing of dividers 492 for holding and dispensing patches of nuggets in the cabinet is illustrated generally in FIGS. 23(c)-(f). Dividers 492 are referred to as the bottom, middle and top dividers 492, with bottom divider 492 being the lowest divider on the incline, and top divider 492 being the highest divider on the incline. As shown in FIG. 23(c), top divider 492 is in its closed position. Nuggets N have been loaded int <opening 484 and are being held behind top divider 492, in compartment 504. Although bottom and middle dividers 492 are also in their closed position, in FIG. 23(c), this is not necessary for loading of nuggets N behind top divider 492.

Figure 23D:
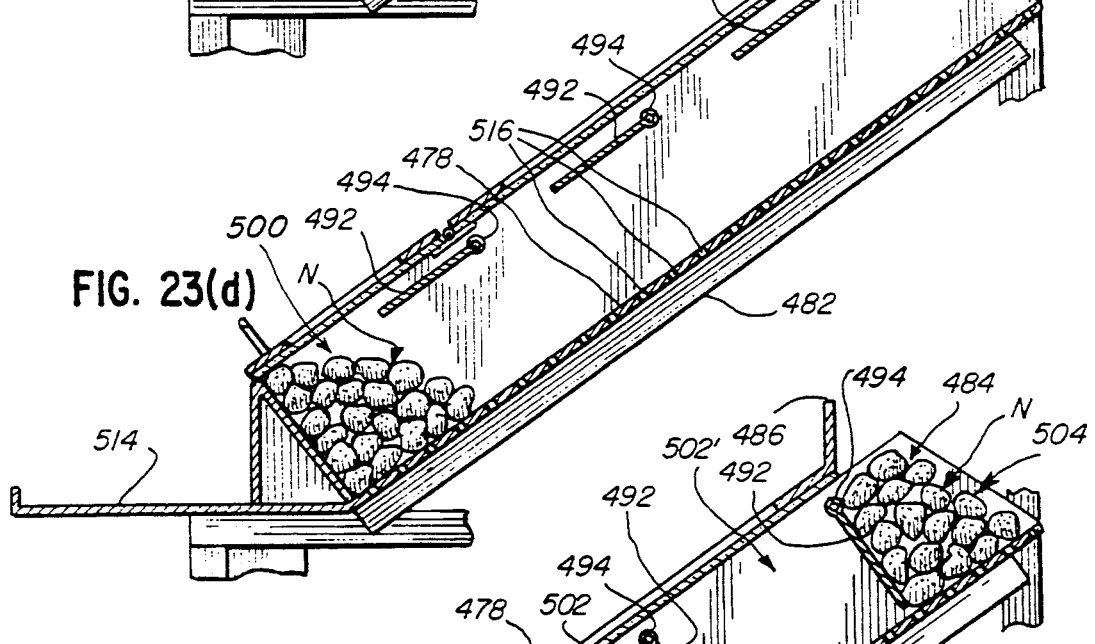
Figure 23:
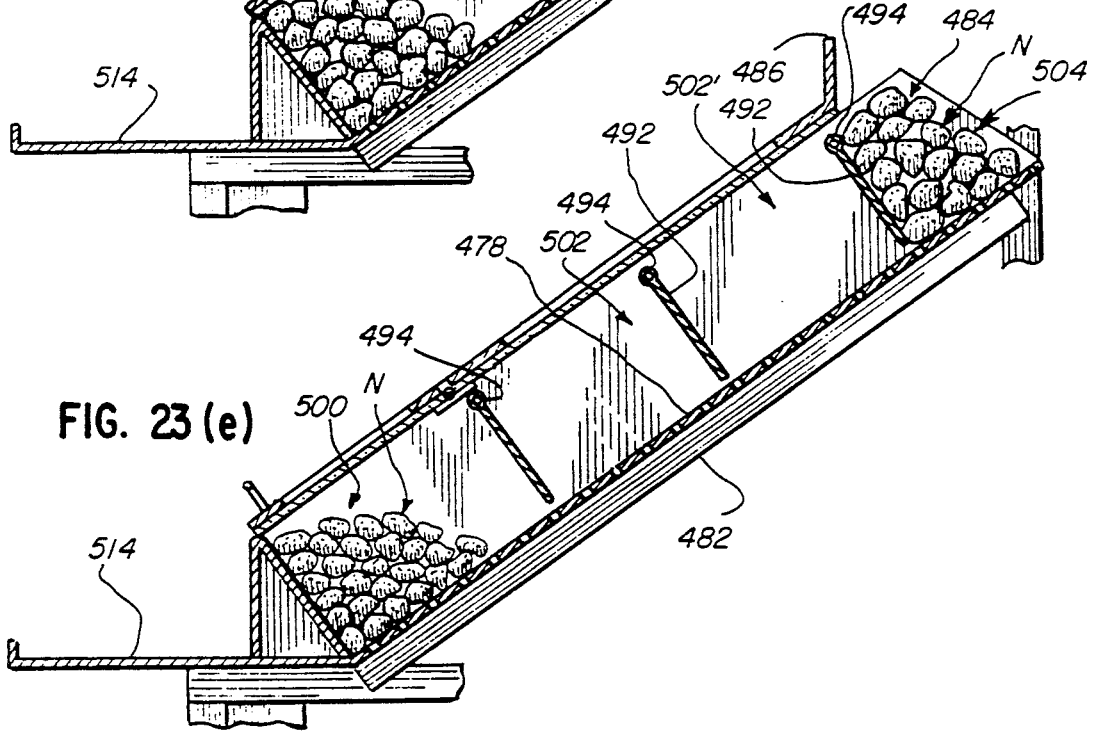
Figure 23F:
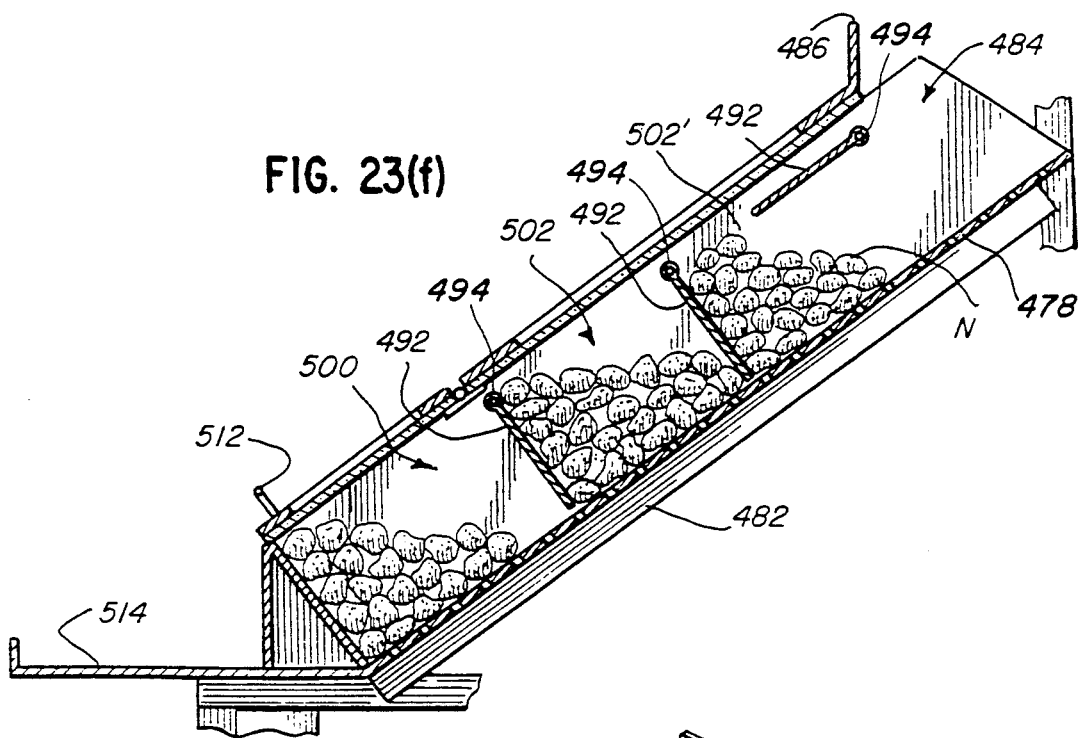
Figure 23G:
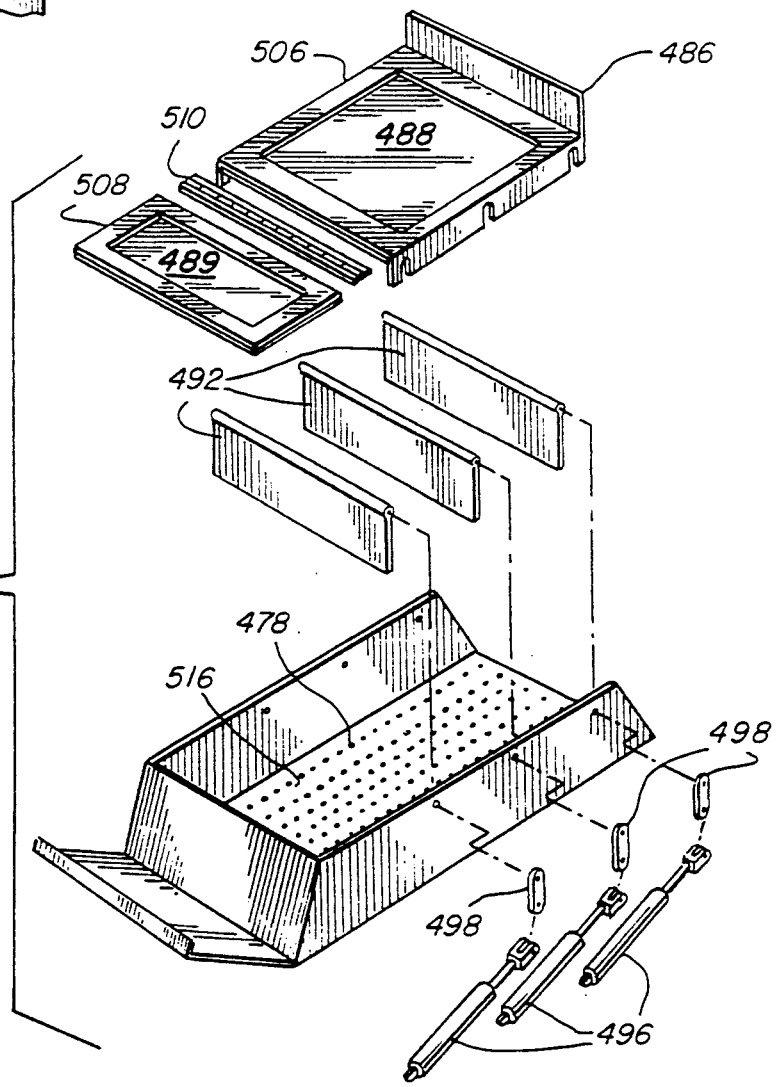

In FIG. 23(d), all of dividers 492 are shown in their open position. As a result, nuggets N, which were held behind top divider 492 in FIG. 23(c), have travelled by gravity down inclined floor 478 into compartment 500. As illustrated in FIG. 23(e), the three dividers 492 have been placed into their closed position and additional nuggets N have been placed behind top divider 492 through opening 484. Middle and top dividers 492 may then be moved into their open position. As a result, the additional nuggets N will travel down floor 478 and settle behind bottom divider 492.

This sequencing of loading nuggets N into opening 484 and moving dividers 492 between their closed and open positions may be continued with middle and top dividers 492 so that additional nuggets N are loaded behind middle divider 492, illustrated in FIG. 23(f). Top divider 492 in FIG. 23(f) may then be placed in its closed position so that additional nuggets N may be placed behind top divider 492. In this way, a maximum of four batches of nuggets N may be loaded into cabinet 150. Although three dividers 492 are shown, any number of dividers 492 may be provided.

As illustrated in FIG. 23(b), compartment 500 may be accessed and nuggets N may be removed from compartment 500. After compartment 500 has been emptied, the bottom divider 492 may be placed in its open position. Nuggets N which had been loaded and held in compartment 502 between bottom and middle dividers 492 will travel by gravity down inclined floor 478 into compartment 500. As discussed above, loads of nuggets N may similarly be allowed to travel downward from compartment to compartment towards compartment 500 by appropriately moving dividers 492 between open and closed positions.

Alternatively, as one batch of nuggets N is emptied from compartment 500 and another batch advanced into compartment 500, any remaining batches in cabinet 150 may be similarly advanced down floor 478 into compartments closer to the bottom. Additional batches of nuggets N may then be loaded through opening 484 and into the new empty compartments through the same sequencing.

This sequencing assures that the batch of nuggets N which was first cooked and loaded into cabinet 150 will be served first before batches of nuggets N cooked after the first batch are served. In other words, cabinet 150 provides that batches of nuggets N which were first in are automatically the first out.

If the batch being served or another batch being held in the cabinet has not been served by a certain time, the batch must be discarded. Discarding of old batches may be efficiently carried out since the batches nearer the bottom of cabinet 150 will be easily accessed while the batches which are still servable may be left in cabinet 150 and simply advanced to compartment 500 for serving. Further, multiple batches may be held in a relatively small area in anticipation of traditionally busy periods.

For a more complete description of a cabinet suitable for use in accordance with fry cell 110, reference is made to U.S patent application Ser. No. 07/176,489, filed Apr. 1, 1988, now abandoned entitled "Storage Cabinet and Method for Food Storage, Dispensing and Display" by inventors, Robert L. Cahlander, David W. Carroll and Al Hollingsworth, the disclosure of which is hereby incorporated by reference.

It is to be understood that the described cooked food storage display and, dispensing and display station 120 is a preferred embodiment and that other types and arrangements of storage cabinets suitable for receiving cooked food from robot 112 and storing the cooked food for delivery to customers can be utilized in accordance with the invention.

Cooked Food Dump Mechanism

Figure 24:
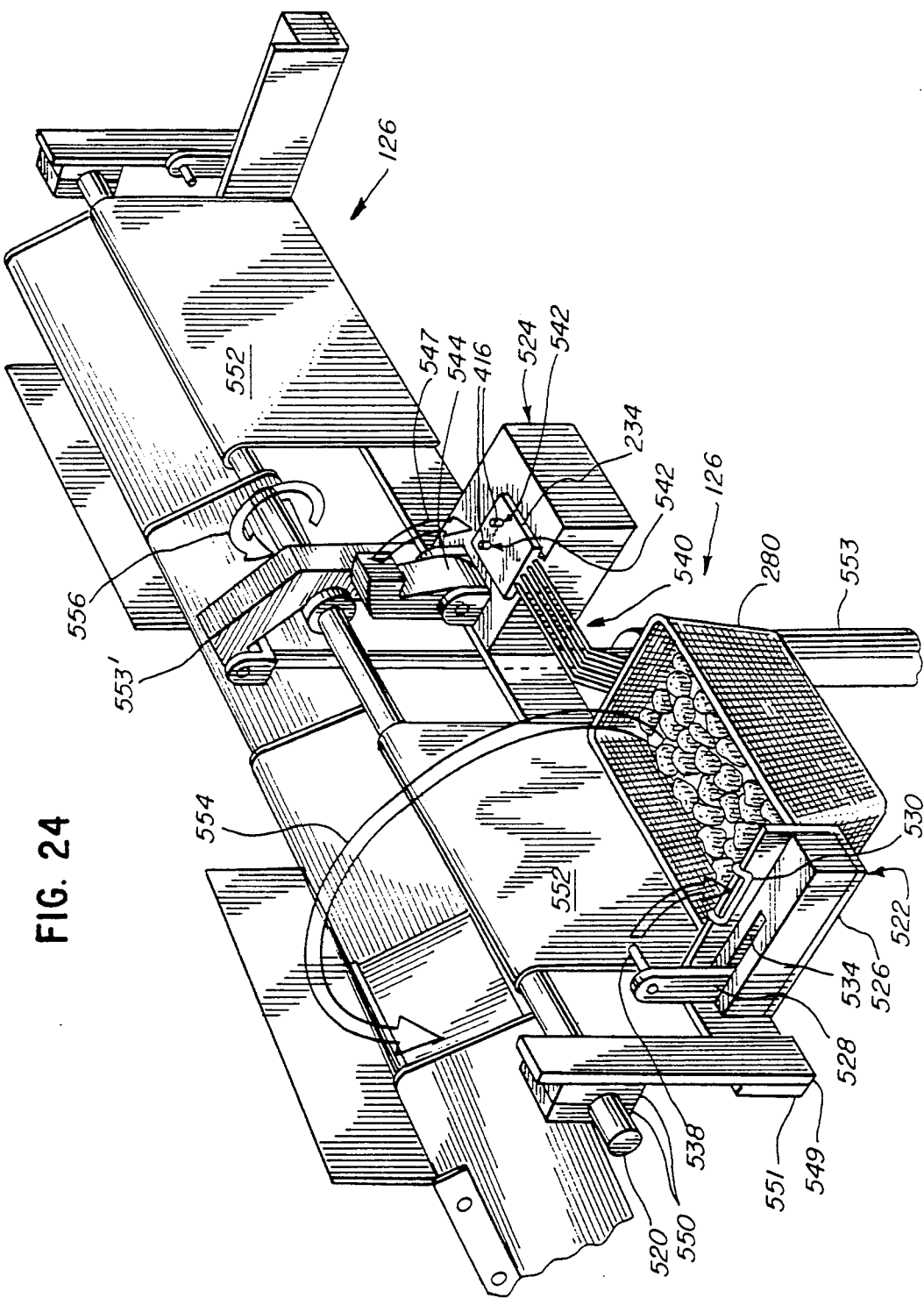
FIG. 24 is a perspective view of the dump mechanism forming part of the fry cell of FIG. 1.
Figure 25:
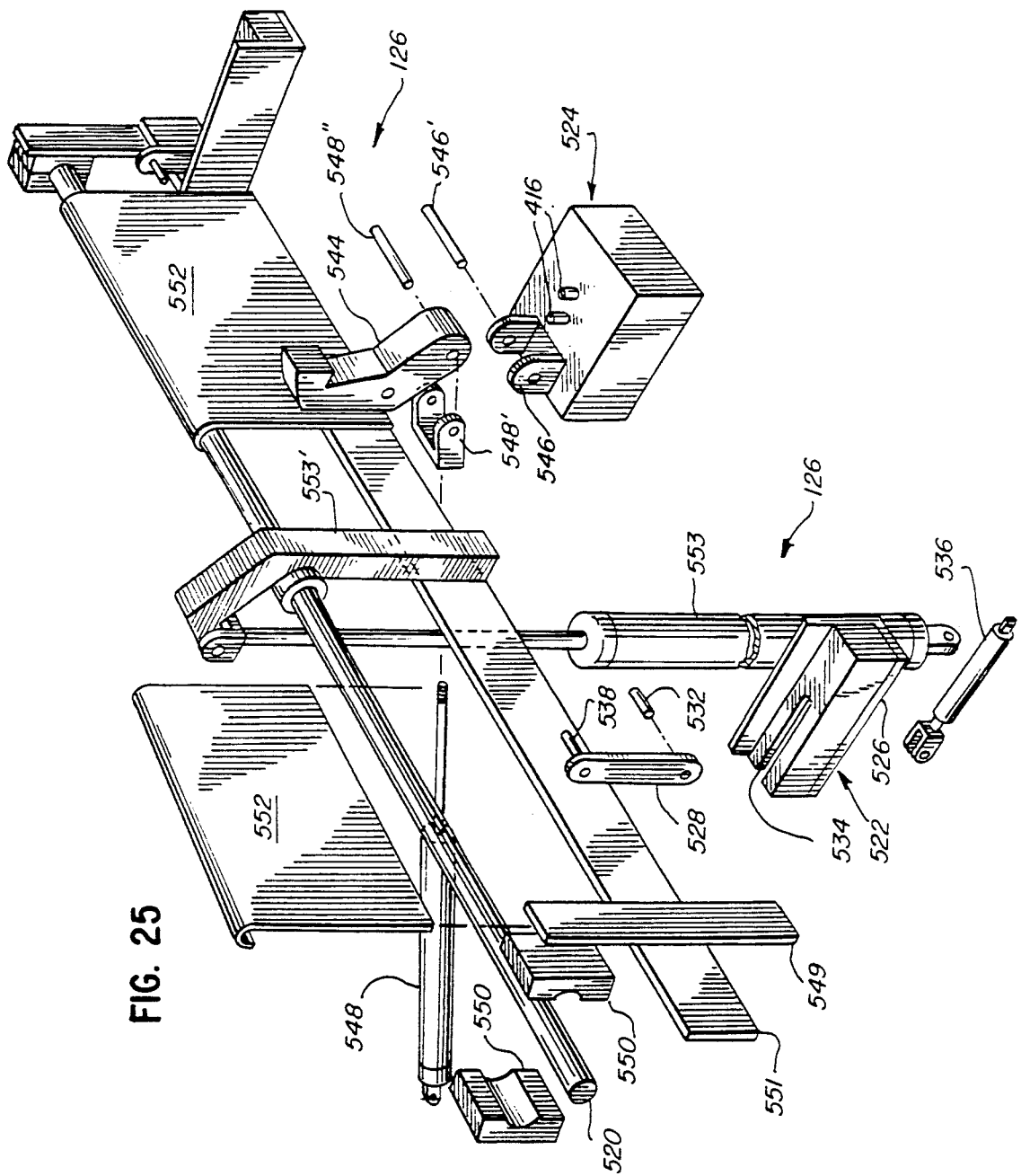
FIG. 25 is an exploded view of the dump mechanism of FIG. 24.
Figure 26A:
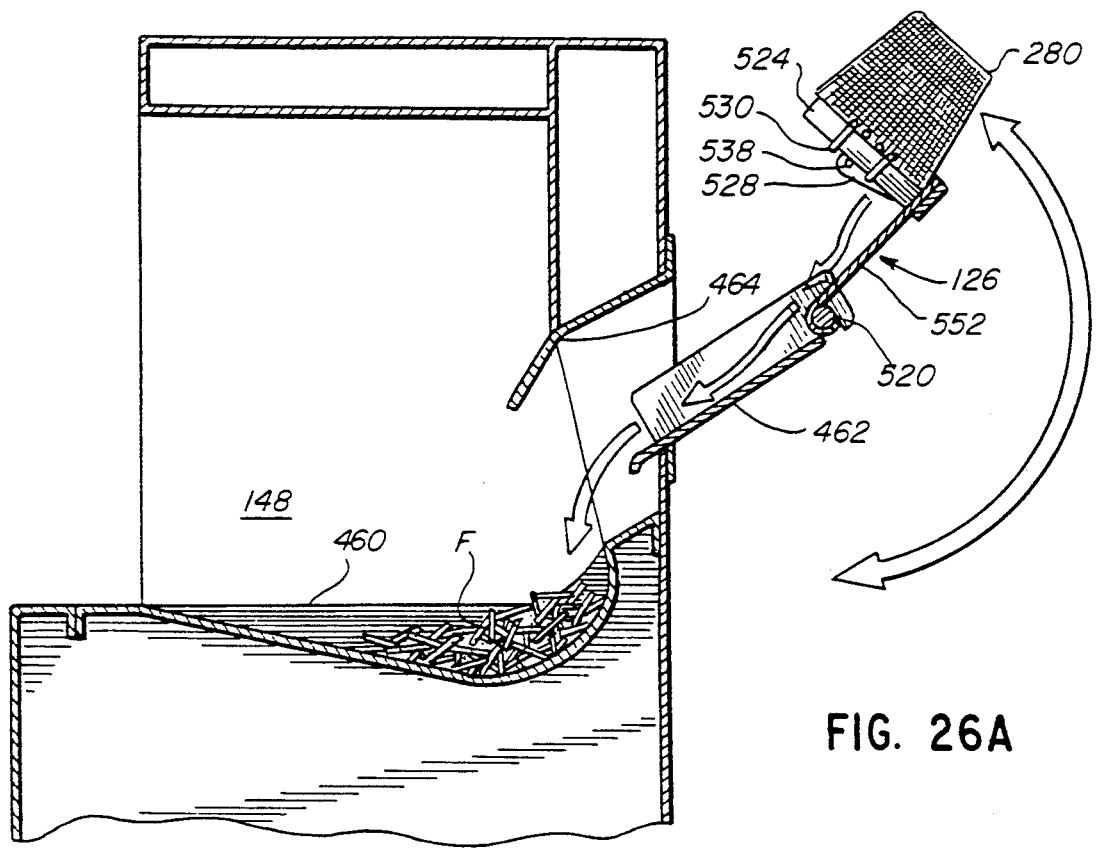
FIG. 26A is a side elevation view of the dump mechanism of FIG. 24.
Figure 26:
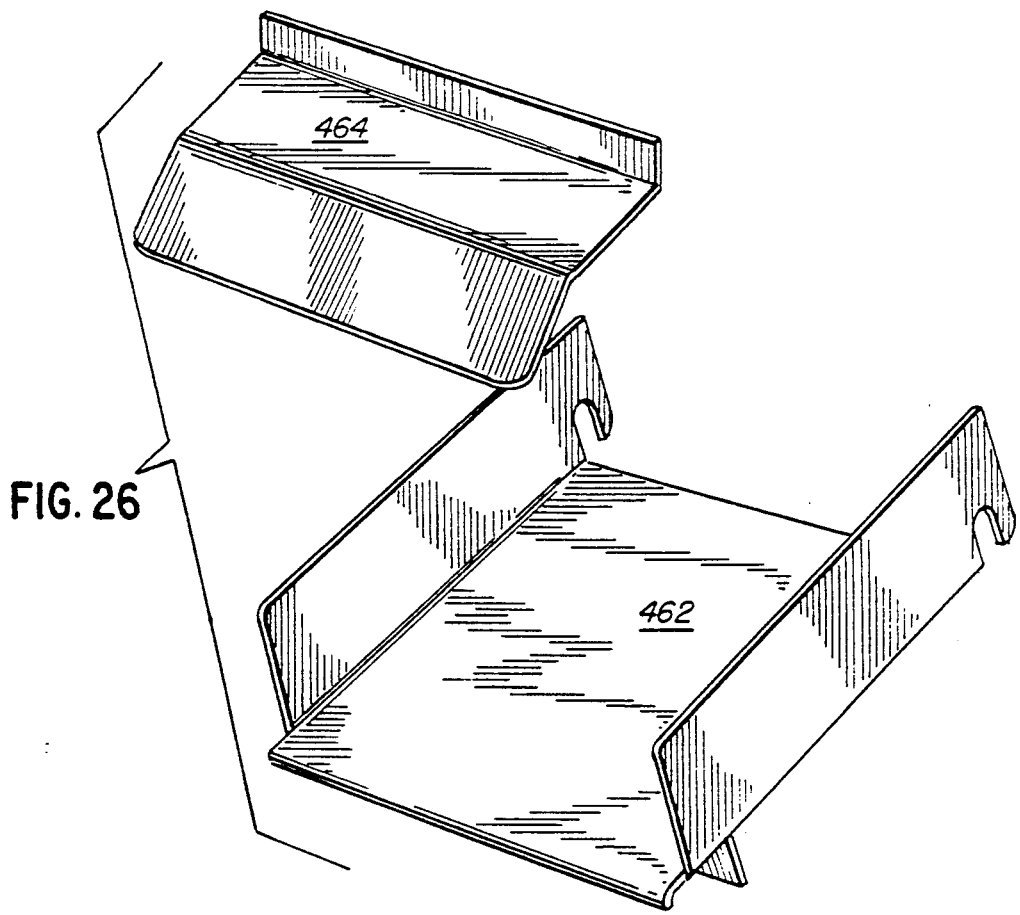
FIG. 26 is a perspective view of the french fry transfer slide utilized in the fry cell of FIG. 1.

Referring to FIGS. 24, 25 and 26A, there is illustrated various aspects of dump station 126 in accordance with the invention. Dump station 126 includes a substantially horizontally mounted shaft 520. Mounting of basket 280 to dump station 126 may be provided through various arrangements. As shown in the FIGS. 24–25, basket 280 can be temporarily coupled to shaft 520, while basket 280 is in an upright position and shaft 520 is in the load position. Basket 280 then rotates through the same angle as shaft 520, when shaft 520 is rotated to its dump position to empty the contents of basket 280. Basket 280 is located and supported in apparatus in a predetermined orientation when shaft 520 is in its load position as shown in FIG. 24. FIGS. 24 and 25 show one such structure for orientation, namely a first clamp 522 and a second clamp 524. Placement of first clamp 522 with respect to second clamp 524, as illustrated, is not required; the placement of first clamp 522 with respect to second clamp 524 may be reversed. First clamp 522 and second clamp 524 are used to support opposite ends of basket 280. First clamp 522 includes a bracket support 526 and first clamp arm 528. A bracket 530 on basket 280 is mounted onto bracket support 526. First clamp arm 528 pivots on pivot rod 532 and is capable of pivoting movement from an open position as illustrated in FIG. 24, and a second, closed position into groove 534. First clamp arm 528 may be pneumatically activated by cylinder 536 to its second position so that pin 538 closes against bracket 530 to hold basket 280 against bracket support 526.

Second clamp 524 is illustrated in FIGS. 24 and 25. Second clamp 524 may be used to support the opposite end of basket 280 that has been supported by first clamp 522, preferably supporting a handle 540 of basket 280. Second clamp 524 includes locator pins 416 which may be inserted through apertures 542 in gripper block 234 of handle 540. Locator pins 416 provide structure so that robot 112 is able to place basket 280 into dump station 126 at the desired location every time, and basket 280 will be properly aligned so that the first and second clamp means will be able to properly couple basket 280 to dump station 126.

Second clamp 524 also includes a second clamp arm 544 which is pivotally mounted by bracket 546 and bracket pin 546'. Second clamp arm 544 is capable of pivotal movement between a first, open position as illustrated in FIG. 24 and a second, closed position as indicated by arrow 547. Second clamp arm 544 may be pneumatically activated by cylinder 548 connected to second clamp are 544 by bracket 548' and bracket pin 548" in its second position to close against locator pins 416 and gripper block 234. In its second position, a protrusion of second clamp arm 544 presses against gripper block 234 of handle 540, thereby coupling basket 280. As illustrated in FIG. 24, locator pins 416 extend at a length slightly longer than the thickness of gripper block 234. Alternatively, the length of locator pins 416 may be approximately equal to or less than the thickness of gripper block 234. Thus, depending on the length of locator pins 416, second clamp arm 544 may come to rest directly on upper block 234 to secure basket 280 or arm 544 may contact locator pins 416.

First clamp 522 and second clamp 524 may be attached to shaft 520 by a series of supports. A vertical support 549 may be attached to shaft 520 by bracket 550. An elongated support 551 is rigidly mounted to vertical support 549. Support 551 may be mounted generally parallel to shaft 520. First clamp 522 and second clamp 524 are attached to second elongated support 551.

Dump station 126 may further comprise a pair of slides 552 which are mounted on and between shaft 520 and the top of basket 280, as shown in FIG. 24. Slides 552 assist in unloading basket 280 upon rotation in that food products N leaving basket 280 traverse the adjacent one of slides 552.

The operation of dump station 126 upon rotation is illustrated in FIG. 26A. Basket 280 loaded with food products, in this case french fries F, has been mounted to first clamp 522 and second clamp 524 when shaft 520 is in its load position (as shown in FIG. 24). Shaft 520 may then be rotated through a predetermined angle to its dump position. In FIG. 26A, this angle of rotation is slightly more than 90 degrees from the mounting of basket 280 in FIG. 24. Upon rotation, as illustrated by arrows 554 and 556 in FIG. 24, french fries F move by gravity out of basket 280 and into french fry slide 462.

Shaft 520 may be rotatably driven by any one of a number of ways. Preferably, shaft 520 is driven by a dual-action cylinder 553 as illustrated in FIG. 25, which is connected to shaft 520 and support 551 by lever arm 553' (not shown in FIG. 24). Cylinder 553 may be pneumatic or hydraulic. As illustrated in FIGS. 24 and 25, dump station 126 is equipped with two first clamps 522 and one second clamp 524 for emptying the contents of a basket with a handle in one of two predetermined locations. The two first clamps 522 may be located on opposite sides of second clamp 524, each at the same distance from second clamp 524. This way, one basket 280 may be mounted for unloading on one of the first clamps 522 and the second clamp 524 at one time and another basket 280 may be mounted for unloading on the other first clamp 522 and second clamp 524. This embodiment allows baskets 280 containing different food products to be unloaded in different locations by the same dump station 126. Alternatively, more than one pair of first clamp 522 and second clamp 524 may be mounted on shaft 520.

Reference is made to U.S. Pat. No. 4,979,864, which issued Dec. 25, 1990, filed concurrently herewith entitled "Basket Emptying Apparatus, Locating Device and Method" by inventors, Robert L. Cahlander, David W. Carroll and John O. Reinertsen, for a more detailed description of dump station mechanism 126, the disclosure of which is hereby incorporated by reference.

Transfer Station

Some of the food that may be processed and cooked by fry cell 110 can desirably include further processing and/or assembly into a sandwich at another location. Thus, it is advantageous to provide an apparatus for transferring a fry basket containing food cooked in fry cell 110 to a location removed from the fry cell. To accomplish this, a transfer station 122 can be provided.

Figure 36:
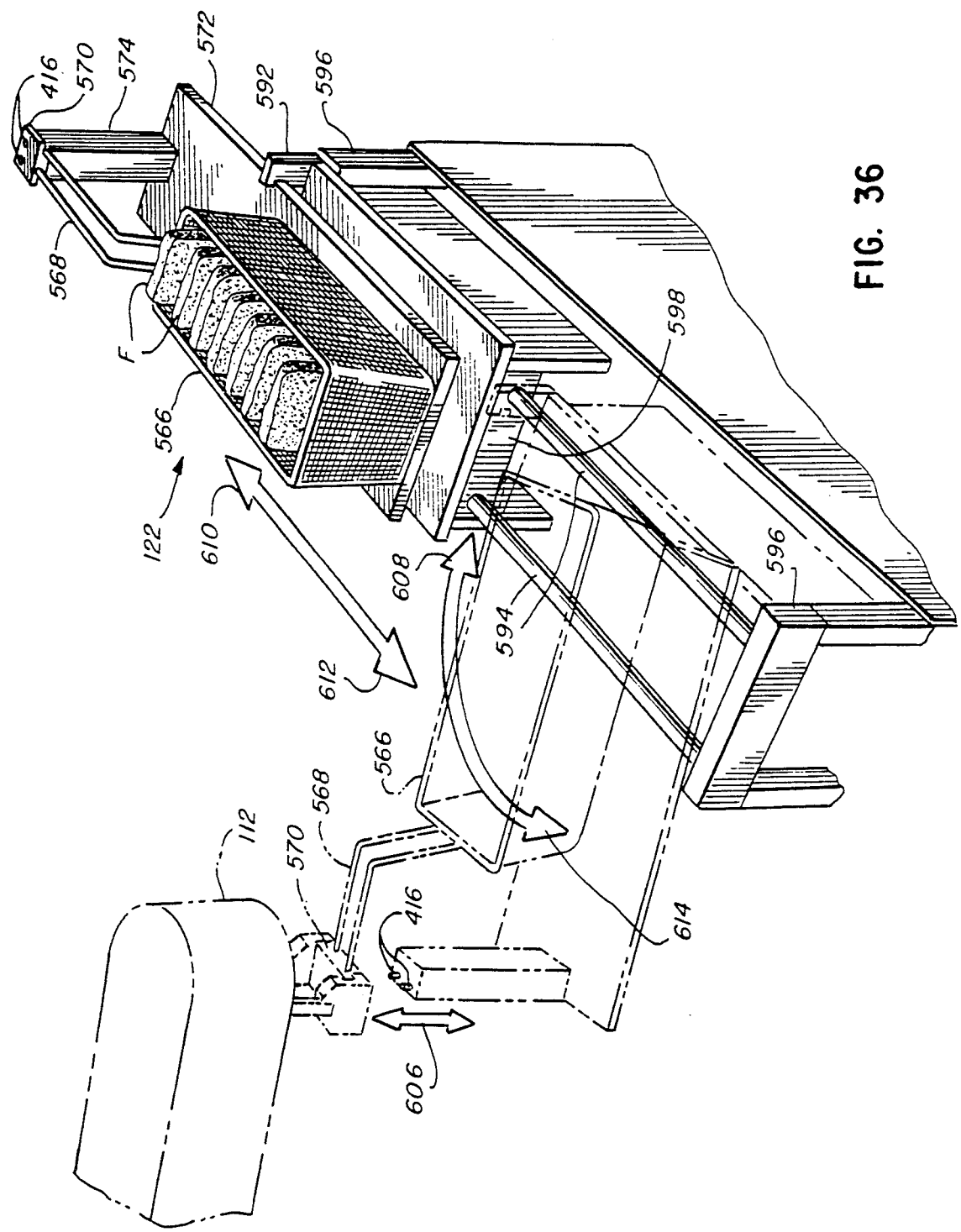
FIG. 36 is a perspective view of a transfer station mechanism in accordance with the invention.
Figure 37:
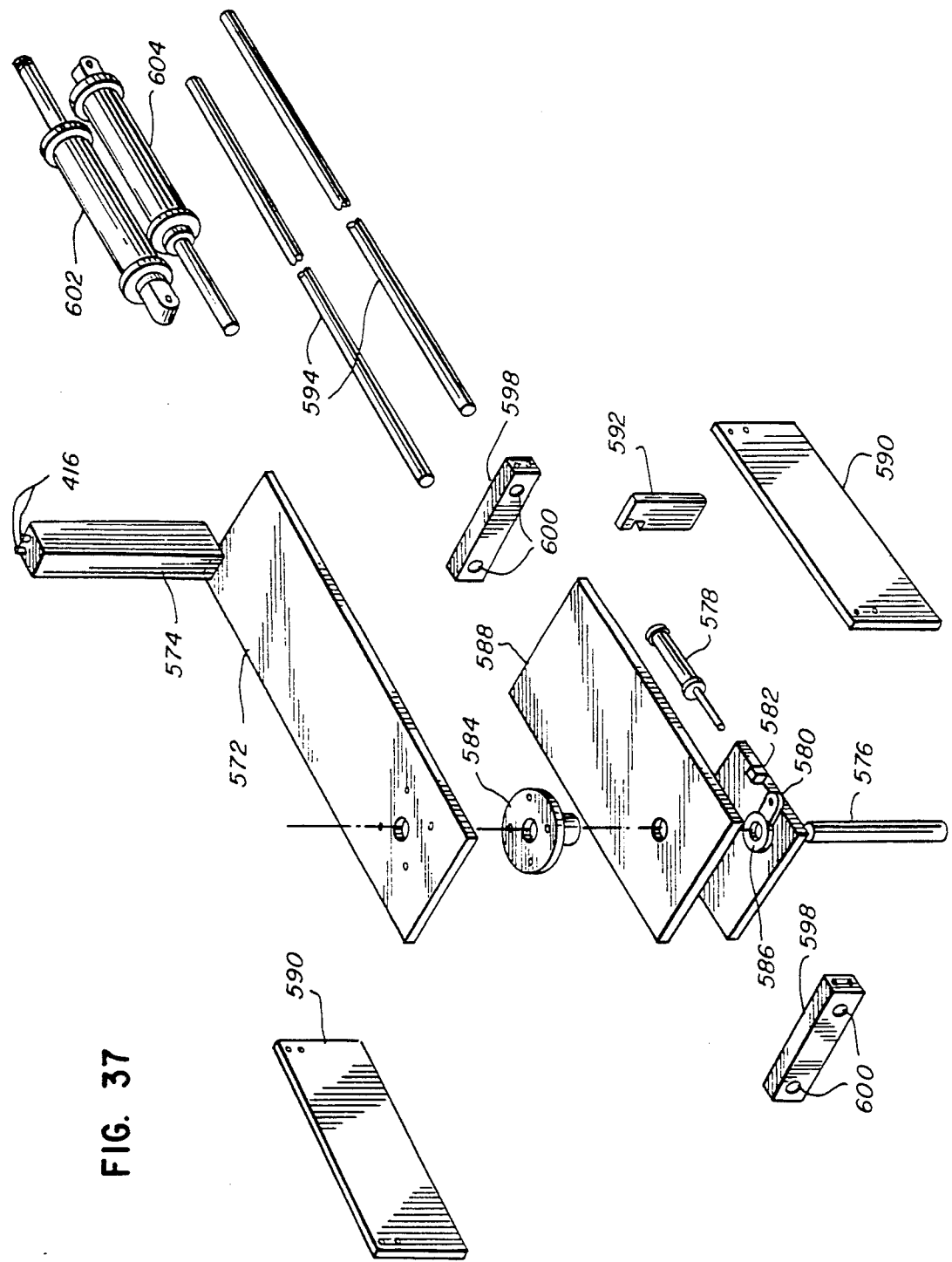
FIG. 37 is an exploded view of the transfer station mechanism of FIG. 36.

Transfer station 122 is illustrated in various views in FIGS. 36 and 37. As illustrated in FIG. 36, robot 112 can place a fry basket 566 on transfer slide 572 for delivery to another location. In this case, fry basket 566 contains a plurality of cooked fish filets F. Fry basket 566 is similar to fry basket 280, previously described, except that handle 568 of fry basket 566 is composed of two wire rods, and gripper block 570 of fry basket 566 has two corresponding holes for handle 568 instead of four holes as described with respect to gripper block 234.

After fry basket 566 has been deposited on transfer station 122 by robot 112 while transfer station 122 is in the position illustrated by the phantom line in FIG. 36, the portion of the transfer station that supports fry basket 566 rotates and slides away from fry cell 110 for further processing of fish filets F in another area.

The various components of transfer station 122 are illustrated in exploded view in FIG. 37. Transfer station 122 includes a basket supporting platform 572 upon which fry basket 566 is placed. A basket handle support 574 is mounted to platform 572 and includes a pair of locator pins 416. Gripper block 570 is positioned in mating relationship with locator pins 416 to secure basket 566 to platform 572, as illustrated in FIG. 36. Platform 572 is mounted for rotation or pivotal movement about shaft 576. Rotary movement or pivoting is accomplished by pneumatic cylinder 578 which is connected to and drives a rotary actuating arm 580 through connector 582. Rotary actuating arm 580 is connected to spindle 584 which in turn is rigidly mounted to platform 572 so that pneumatic cylinder 578 moves arm 580 thereby rotating collar 586 about shaft 576, and platform 572 correspondingly rotates. A dust cover 588 and sidewalls 590 may be provided to enclose arm 580, pneumatic cylinder 578 and other portions of transfer station 122. Dust cover 588 has a notched stop 592 to limit rotation of platform 572.

Platform 572, the rotating mechanism and associated parts, including dust cover 588 and sidewalls 590, are mounted for linear movement along rails 594. Rails 594 are rigidly mounted to a frame 596. Platform 572 and associated equipment is carried on rails 594 by carriage end walls 598. End walls 598 each have a pair of openings 600 allowing end walls 598 to traverse rails 594.

Linear movement of transfer station 122 along rails 594 can be accomplished by any suitable driving mechanism, such as by a pair of single acting pneumatic cylinders 602 and 604 and may be mounted to dust cover 588.

A typical operational cycle of transfer station 122 could begin with robot 112 lowering basket 566 in a downward direction as indicated by arrow 606 so that the locator apertures of gripper block 570 engage locator pins 416. Thereafter, platform 572 rotates clockwise as illustrated by arrow 608 until platform 572 contacts notched stop 592. Thereafter, or concurrently, one of pneumatic cylinders 602 or 604 is activated to move carriage end walls 598 and platform 572 along rails 594 away from fry cell 110 in a direction indicated by arrow 610. After fish filets F are dispensed from basket 566, basket 566 may be returned into fry cell 110 for subsequent pick up by robot 112 by linearly translating platform 572 toward fry cell 110 in the direction indicated by arrow 612 with rotation of platform 572 in a direction indicated by arrow 614. Then, empty basket 566 can be picked up by robot 112 to allow processing of additional food.

Computer Operating and Control Station

Computer operating and control station 128 can be configured to completely control the operation of fry cell 110. Preferably, as illustrated in FIG. 27, station 128 includes a fry cell master control computer 616, a sensing system consisting of various sensors and controllers as hereinafter described, a robot controller 620 for robot 112, a programmable logic controller (PLC) 622 and an operator input terminal 623 which includes a full function keyboard and a CRT display. Programmable logic controller 622 can be the General Electric Series One programmable controller (Series One PC). It uses micro-processor design and electronic circuitry to replace physical wiring, relays, push buttons, limit switches, etc. It is programmed to execute instructions that control machines and process operation by implementing specific functions such as control logic, sequencing, timing, counting and arithmetic for such operations. The Series One PC replaces 4–100 relays, and any combination of up to 64 timers, counters and sequencers. It is also expandable from 8 to 112 I/O points and offers up to 1700 words of memory. The Series One PC outputs commands controlling product dispenser cycling and monitors dispenser product levels for robotized food processing.

FIG. 27 illustrates a schematic view of the process control circuits of fry cell 110.

Various electrical connections are made between the sensing and control components of fry cell 110 Input/output (I/O) cables 624, 626, 628 and 630 run from PLC 622 to dispensers 136, 138, 142 and 144 respectively, to allow activation of those pieces of equipment. A communications cable 634 runs from PLC 622 to robot controller 620. Controller 620 also communicates with computer 616 via communications cable 636. PLC 622 and computer 616 communicate via a link 638.

I/O cables 640, 642, 644, 646 also provided between PLC 622 and dump station 126, transfer slide 124, cabinet 150 and transfer station 124, respectively. I/O cables 648 and 650 are also provided between fry vats 146(A-F) and PLC 622. A control cable 652 connects robot controller 620 to robot 112.

Point of sale (POS) cash registers 654 transmit customer order data to computer 616, where the data is stored and compared to the food production in progress and to the daily plan stored in computer 616.

The sensing and controlling system consists of suitable sensors and controls for operating the various pieces of equipment in fry cell 110. The various controllers and sensors associated with the equipment is designated in FIG. 27 by the equipment reference numeral'. For example, the sensor and controller for french fry dispenser 136 is designated as 136'. The various sensors and controllers sense the position and/or operation of the associated equipment so that the equipment can perform in concert with robot 112.

The sensors for dispensers 136, 138, 142 and 144, referred to in FIG. 27 by reference numerals 136', 138', 142' and 144' can be infrared fiberoptic sensors from Banner Engineering Corp. of Minneapolis, Minn. These sensors should preferably be mounted such that the end of the barrel is flush with the inside surface of the dispenser. Each sensor 136' and 144' consists of three separate sensors, 136'a, 136'b, 136'c and 144'a, 144'b and 144'c, respectively, as shown in FIGS. 1 6 and 18. Divider position sensors 136'a and 144'a are mounted to the chute end of the unit, between the loading chute and dispensing chute 300, 326 and 316, 337, respectively. Sensors 136'a and 144'b allow dividers 296 and 322 to be aligned with the opening of loading chutes 300 and 326, respectively to assure proper loading and dispensing from each compartment of the dispenser.

Product fill sensors 136'b and 144'b allow dispensers 136 and 144 to be loaded with no gaps in any of compartments 298, 324 and are mounted just in front of the loading chute in the center of the first compartment 298 and 324 "downstream" of loading chute 300, 326. To prepare for loading, conveyor 292, 318 moves backward until product is sensed by this sensor. This means that the last of the empty compartments is in the loading chute, and conveyors 292, 318 may be loaded with no gaps.

Low product sensors 136'c and 144'c are mounted in the lower half of their respective dispensers and are set a number of compartments upstream of the discharge chute. When the signal is lost there is only the set number of compartments 298, 324 left with product in them. For example, the sensors may be positioned such that low product will be sensed when the french fry dispenser has four compartments of product left, and the nugget dispenser has two compartments left.

Sensors 138' and 142' are low product sensors and are the only sensors in dispensers 138 and 142 as illustrated in FIGS. 20 and 27. Sensors 138' and 142' are each positioned on the front of the chute at a desired height which causes low product to be signaled when the fish filets or chicken patties remaining in the respective dispenser drop below the sensor height.

Sensor 112' is a "basket present sensor" located on end of arm tool 134. Sensor 112+ determines whether a basket is held by gripper fingers 212. If no basket is sensed at a time when the basket should be held by gripper fingers 212, a signal is sent to computer 616 and terminal 623 so that the operator can investigate.

A basket sensor 146'(1-12) is provided for each basket position in fry vats 146 cell 110 there are twelve separate basket position sensors. These sensors determine if a basket is present in fry vat 146. If a basket is not present but should be, a signal is sent to computer 616 and terminal 623.

Sensor 146' consists of two sensors. One sensor confirms that a fry basket is present and secured in position at dump station 126 while the second sensor confirms that the basket at dump station 126 has in fact dumped.

Sensor 124' determines whether a fry basket of cooked product is on transfer slide 124. If cooked product is present, sensor 124' can cause a video and audio signal to be generated that the product is ready for packaging. Another sensor may be provided on transfer slide 124 to signal that transfer slide 124 is in position for robot 112 to pick up or drop off a basket.

Sensors 146'(A-F) sense the cooking fluid temperature in each of fry vats 146. Computer 616 can automatically adjust the cooking time depending on the sensed temperature. If the cooking fluid temperature is not within a permissible range, that particular fry vat 146 is not used and an appropriate signal is sent to computer 616 and terminal 623.

Sensors 112', 146'(1-12), 126' and the other sensor for dump station 126, and the sensors for transfer slide 124 may be inductive proximity position transducer sensors. Sensor 146'(A-F) may be a thermistor or other type of temperature measuring sensor.

A temperature sensor may also be provided to sense the temperature in food dispensers 136, 138, 142 and 144 which can, for example, activate a refrigeration system or indicate when product must be disposed.

Computer software is provided for operating and controlling computer 616, robot controller 620 and the equipment and controllers that are incorporated into fry cell 110. The computer program or software for controlling robot 112 includes a collection of motion control routines. All scheduling, real time processing and timing, demand level, nesting schemes, cooking time adjustments, batch size, historical data gathering, production forecasting and other decision-making processes are handled by Computer 616. Computer 616 may be an IBM PC AT computer or other computer with similar capabilities. Communication between the Karel ® robot controller 620 and the cell controller can be achieved via ASCII commands transmitted over a serial RS-232 asynchronous communications line.

In accordance with a preferred embodiment of the software for controlling and operating the fry cell 110, software and data is provided for computer 616 that relates product demand for all products produced by fry cell 110 on the basis of a sales rate which can be in terms of dollars per hour or some other convenient units. The amount of each product is determined by the percent of sales each product contributes to the total dollar per hour sales rate at which fry cell 110 is operating. This data can be historical data and can be compiled for the particular store in which fry cell 110 operates. The historical data can be broken down in several ways, such as, for example, on a day-to-day basis, on a weekday/weekend basis or on some other basis. Preferably, the data also includes the sales rate on an hourly basis for the period during which the store is open.

Figure 41:
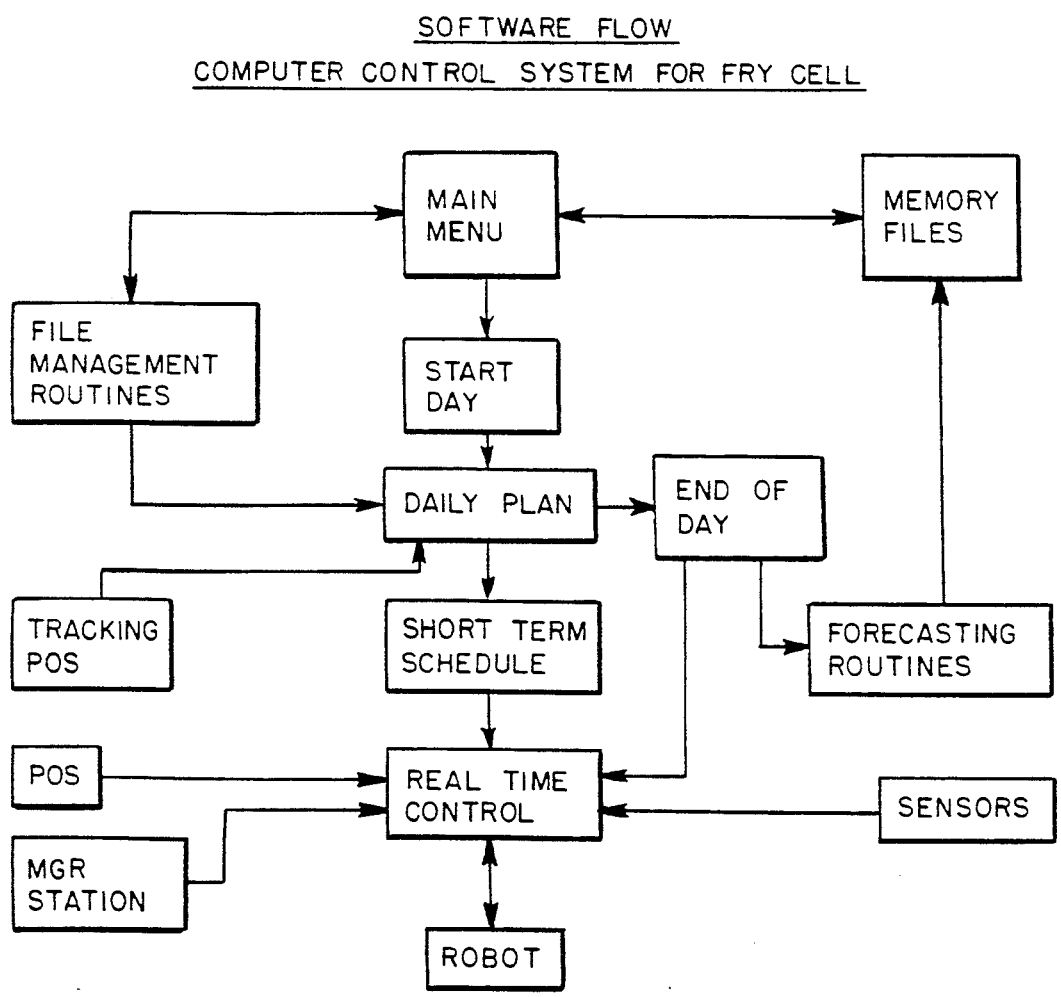
FIG. 41 is a flowchart illustrating the software flow and operation of the fry cell in accordance with the invention.

The software flow and architecture is better described with respect to FIG. 41, which is a block diagram illustrating software flow and operation.

FIG.41 is a schematic block diagram illustrating various aspects of the computer control system of fry cell 110. The "Main Menu" is a display of a list of choices for the store manager to run and may include: (1) start fry cell 110; (2) review, modify, or correct the parameters for fry cell 110; make changes in basic data used in projecting the daily plan such as the product prices and product mixes; and (3) entry of any detail that makes today a special day, such as community events that may impact the demand placed on the store.

"Start Day" initiates the scheduling of the daily plan and any start up routines required of the robot. The short term schedule is also developed and the collecting cf data from the POS Point of Sales registers for comparing to the short-term and daily plans is initiated, and at the end of the day turns control over to the "End of Day" routine which shuts down fry cell 110.

"Memory Files" are a set of the next several or more (for example, seven) days' files that are modified by the "Forecasting Routines" at the end of each day. These files are available for review and modification by the manager of the store.

The "Forecasting Routine" reviews the data of the past several or more days and what has happened this day and adjusts the future day file based on week-to-Week information, for example, and any trend that is taking place due to product promotions and special advertising or changing demand of customers due to seasonal impact to their lives. At the start of a promotion the manager can initiate the start of a promotion by modifying the product mix of that product being promoted.

"POS" or "Point of Sale" is an electronic register used in taking orders and collecting information regarding sales and product mix. It also provides information on a real time bases for comparing to the daily and short-term plan. "Tracking POS" is stored POS data.

The "Short-Term Schedule" is a schedule or plan which is the detail timing plan of commands to the robot, telling it what is to be done and when to do it. This scheduling is done automatically and prevents any double or conflicting requirements of the robot. This plan can be interrupted and modified on the fry and determines demand.

The "Sensors" monitor various parameters as previously described.

The "Real Time Control" tracks POS, gives commands to the robot cell controllers, tracks the sensors, obtains feedback from the cell controllers, responds to directions from the operator via terminal 623 and follows the short-term schedule.

In operation of fry cell 110, the data contained by computer 616 together with the fry cell software operates to produce food at a rate that is based on the projected rate for that time of day from the historical data contained in computer 616. A plan of operation for the overall day is projected from the store opening to closing based on the historical sales data. This data is utilized by the system to generate a more detailed plan covering a shorter period of time, which may be an hour or less, such as a fifteen-minute period to produce product at the anticipated sales rate. The sales rate is set automatically on the basis of the daily plan for that day and can be increased or decreased by a human operator, for the entire day or for just a certain period, such as the lunch hour. A typical daily plan sales rate on an hourly basis is set forth in Table II.

TABLE II

| Typical Hourly Daily Plan Sales Rate | |
|---|---|
| Time Period | Sales Rate ($ product/hr) |
| 10:00–11:00 a.m. | 350 |
| 11:00–12:00 Noon | 650 |
| 12:00–1:00 p.m. | 1100 |
| 1:00–2:00 p.m. | 750 |
| 2:00–3:00 p.m. | 500 |
| 3:00–4:00 p.m. | 575 |
| 4:00–5:00 p.m. | 750 |
| 5:00–6:00 p.m. | 900 |
| 6:00–7:00 p.m. | 800 |
| 7:00–8:00 p.m. | 700 |
| 8:00–9:00 p.m. | 600 |
| 9:00–10:00 p.m. | 500 |

A hypothetical product mix for the products which may be cocked by fry cell 110 on a percentage basis of dollar sales is set forth in Table III.

TABLE III

| HYPOTHETICAL PRODUCT MIX | |
|---|---|
| Product | % Mix of Total Fry Cell Sales |
| French Fries | 40% |
| Chicken Nuggets | 30% |
| Fish Filets | 15% |
| Chicken Patties | 15% |
| Total | 100% |

The amount of each of the products needed per hour or other period is determined by computer operating and control station 128, for example, multiplying the sales rate by the product percent and dividing by the cost per unit. From this information, station 128 can formulate a short term plan. The short term plan, for example, would require that a certain number of batches of product be made to meet the forecasted sale rate. Station 128 would also schedule the various fry cell operations, including the required robot operating times to make the required batches of product. The hourly sales rate can be and is preferably further divided into a number of periods to more accurately follow actual sales rates. For example, the period from 10:00 a.m. to 1:00 p.m. is divided into 15-minute periods based on historical store data as shown in Table IV.

TABLE IV

| Typical Quarter Hour Short-Term Plan | |
|---|---|
| Time Period | Sales Rate ($ product/hr) |
| 10:00–10:15 a.m. | 50 |
| 10:15–10:30 a.m. | 75 |
| 10:30–10:45 a.m. | 100 |
| 10:45–11:00 a.m. | 125 |
| 11:00–11:15 a.m. | 125 |
| 11:15–11:30 a.m. | 150 |
| 11:30–11:45 a.m. | 175 |
| 11:45–12:00 Noon | 200 |
| 12:00–12:15 p.m. | 250 |
| 12:15–12:30 p.m. | 300 |
| 12:30–12:45 p.m. | 300 |
| 12:45–1:00 p.m. | 250 |

On a real time basis, information from POS cash registers 654, when it differs sufficiently from short-term plan, either in terms of product mix or can cause an interrupt in the short-term plan in order to change the product priority of fry cell 110 to meet the demand. Typically, a sufficient difference will be a certain percentage variance from the current operating schedule, such as a 20% difference over a period of 15 minutes, for example. The interrupt may remain scheduled for completion and the schedule for the priority item is worked into the short-term plan as soon as possible. After an interrupt occurs, the system can be configured to automatically revert to production at a rate and product mix in accordance with the daily plan.

Figure 34:
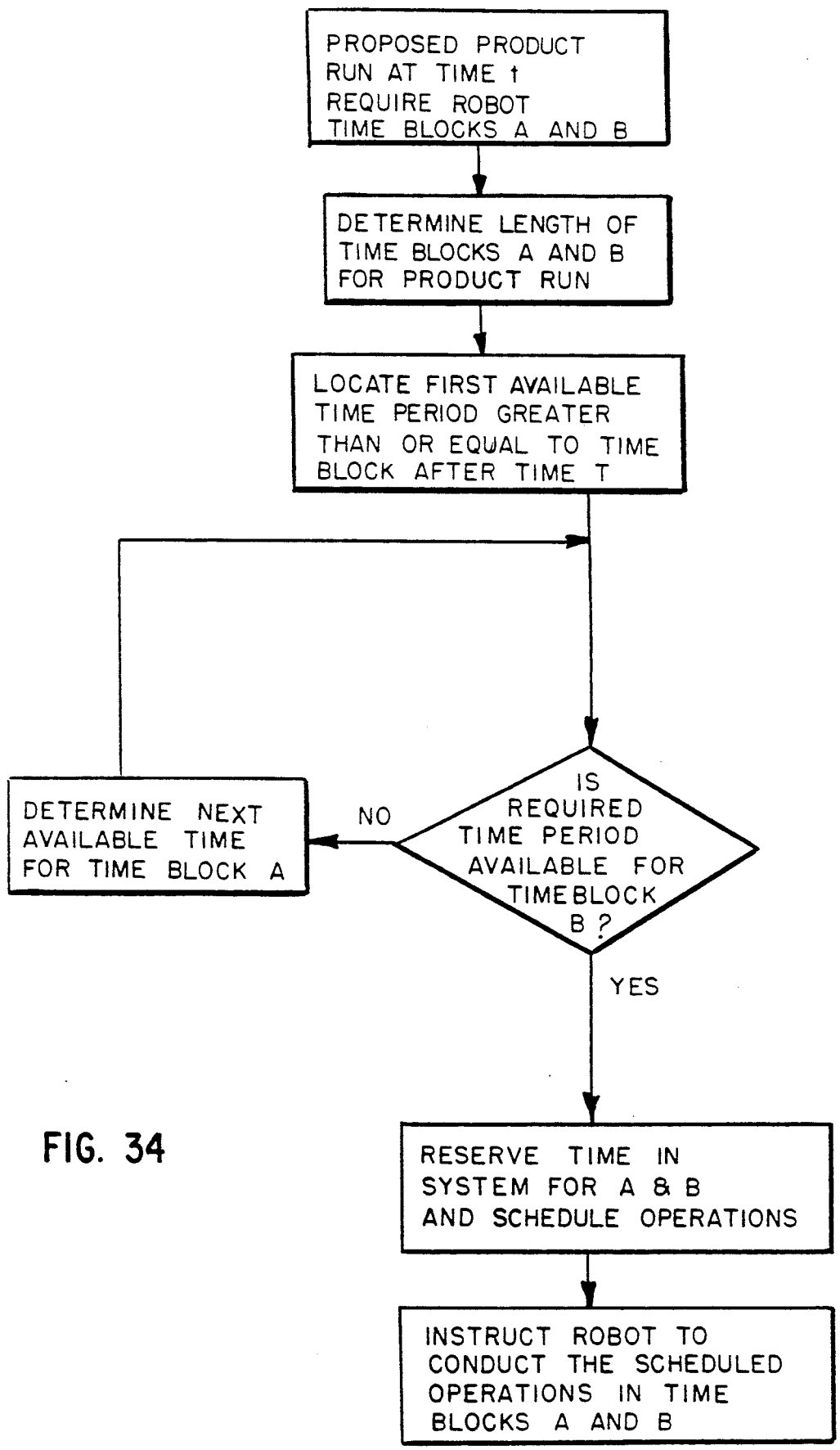
FIG. 34 is a flowchart illustrating how robot time is scheduled.

The control system of fry cell 110 schedules robot time by determining whether the required time block or blocks are available or reserved, and thus unavailable, as illustrated in FIG. 34. If a particular time period is unavailable, the next available time is located and reserved.

The time blocks required for cooking a food batch in fry cell 110 consist of a time block A and a time block B. Time block A or DROP time includes the time required for robot 112 to obtain an empty fry basket (fry baskets are assigned to a particular position in fry vats 146 and empty fry vats in fry cell 110 not in use remain in that fry vat position), dispense food into that basket at dispensing station 114 and deliver and deposit the fry basket with food in cooking position at fry vat 146. Time block B is separated in time from time block A by the cooking time for the batch of food initiated in time block A. Time block B or PULL time includes the time required for robot 112 to PULL the fry basket from vat 146 to dump station 126 or transfer station 122, the time required to dump the basket and the time required to pick the empty basket and return it to its vat position.

A command to robot 112 can consist of up to three parts: (1) a "cycle;" (2) a vat number; and (3) a number of portions (required only for certain products such as fish filets and chicken patties). The various cycles are set forth in Table V.

TABLE V

| Cycle | Robot Command Cycles Description |
|---|---|
| DROP | (1) robot 112 picks up an empty fry basket from one of fry vats 146 to which it is assigned; (2) the fry basket is conveyed to dispensing station 120 by robot 112; (3) the dispenser is operated to fill the fry basket with a desired amount of food; and (4) the fry basket is conveyed back to its vat and set into the cooking fluid. |
| PULL | (1) robot 112 lifts the fry basket from the cooking fluid and allows it to drain; (2) the fry basket is conveyed to dump station 126 or transfer station 122; (3) dump station 126 or transfer station 122 is operated; and (4) the empty fry basket is conveyed by robot 112 to its assigned location in one of fry vats 146. |
| FETCH | Food products such as fish filets and chicken patties are generally conveyed out of fry cell 110 via transfer station 122 for further processing and/or assembly. This cycle retrieves the empty fry baskets and places them back into fry cell 110 as follows: (1) the empty fry basket is conveyed back to fry cell 110 via transfer station 122; (2) robot 112 lifts the fry basket from transfer station 122; and (3) the fry basket is then conveyed back to its assigned fry vat 146. Computer 616 keeps track of which baskets have left fry cell 110 and the order in which they re-enter fry cell 110. |
| SKIM | (1) robot 112 picks up skimmer 442 and conveys it to one of fry vats 146; (2) robot 112 lowers skimmer 442 into fry vat 146 and draws it from back to front; (3) robot 112 lifts skimmer 442 and allows it to drain, then conveys it to waste container 448 for wiping on wiper 446; and (4) robot 112 conveys skimmer 442 to its holding bracket 444. |

TABLE V-continued

| Cycle | Robot Command Cycles Description |
|---|---|
| FILL | (1) robot 112 picks up fluid refill reservoir 432 and conveys it to a fry vat 146 to be filled; (2) robot 112 lowers reservoir 432 on activating mechanism 434; (3) after sufficient fluid is dispensed into fry vat 146, robot 112 lifts reservoir 432 from activating mechanism 434 and conveys reservoir 432 to its holding bracket. |
| ENDRUN | This cycle occurs only at the end of the day and initiates a shut-down procedure that consists of shutting down the equipment and emptying the dispensers. |

Each fry vat 146(A-F) is assigned to a specific food product and has a fry basket dedicated to it since fry cell 110 has six fry vats (fry vat 146A-F) and each fry vat 146 has space for two fry baskets. Thus, there are twelve fry vat locations. The fry vat locations can be numbered and assigned to a particular food product as follows, as illustrated in FIG. 27:

1-A: french fry vat no. 1
2-A: french fry vat no. 2
3-B: french fry vat no. 3
4-B: french fry vat no. 4
5-C: french fry vat no. 5
6-C: french fry vat no. 6
7-D: chicken nugget vat no. 1
8-D: chicken nugget vat no. 2
9-E: individually-sized pie vat
10-E: fish filet vat no. 1
11-F fish filet vat no. 2
12-F: chicken patty vat.

The number of portions is used only with the fish filet and chicken patty products and is an integer between 1 and 12. The robot program uses this number only when performing the drop cycle for fish filets or chicken patties.

Each time robot 112 finishes a cycle, it transmits the code "DONE" back to computer 616 to signal that robot 112 is ready to receive the next command sequence.

Description of Typical Fry Cell Operation

Various examples of fry cell 110 in operation will be described with respect to operation of the physical equipment of fry cell 110 and its computer operating and control station 128.

Start-Up

In order to start up fry cell 110, the equipment must be activated, uncooked food dispensing station 114 loaded and fry vats 146 should attain operating temperature.

French Fry, Chicken Nugget, Chicken Patty, Fish Filet, Hash Brown, and Pie and Other Product Production French Fry Production Robot controller 620 receives a french fry order from computer 616 which may be a normally scheduled run as part of the short-term plan or may be an interrupt run. In either case, the appropriate time blocks A and B are available so that the french fry run can be commenced at time t. At the beginning of time block A (time t), robot 112 then selects and grasps an empty fry basket 280 from fry vat 146. Robot 112 then positions empty fry basket 280 in dispensing position under french fry dispenser 136. Robot 112 signals dispenser 136 to begin loading fries to fry basket 280. Basket 280 is loaded with french fries and french fry dispenser 136 outputs a "basket full" signal to robot controller 620.

Robot 112 removes full fry basket 280 from dispenser 136 and robot 112 delivers and places full fry basket 280 in appropriate fry vat 146. After insertion of fry basket 280 into fry vat 146, robot controller 620 outputs a signal to computer 616 to indicate that cooking has been initiated, time block A has ended and robot 112 is free to do other tasks.

After proper cooking time, computer 616 outputs a "cooking completed" signal to robot controller 620 so that robot 112 can remove fry basket 280 from fry vat 146 upon completion of cooking which occurs in time block B, previously reserved for this operation. Robot 112 grasps and lifts fry basket 280 from fry vat 146. Robot 112 then holds fry basket 280 above fry vat 146 for a relatively short period of time, such as about five seconds to allow cooking fluid to drain from the french fries. Thereafter, robot 112 delivers and places fry basket 280 to dump station 126 at the french fry dump location. Dump station 126 is then activated by computer 616 and the cooked french fries are dumped or transferred into french fry bagging station 148. Dump station 126 then returns to its load position and robot 112 grasps empty fry basket 280 and returns it to i&:s assigned location in one of fry Vats 146. This completes the robot activities scheduled for this run and time block B.

Chicken Nugget Production

A similar procedure occurs for the production of chicken nuggets except that fry basket 280 is delivered to the chicken nugget dump side of dump station 126.

Fish Filet and Chicken Patty Production

Production of fish filets and chicken patties occurs in a manner similar to that described with respect to the french fry production with several differences. Usually, a fry basket specifically designed for fish filets or chicken patties will be utilized. After the cooked product is removed from the particular fry vat 146 used for such products, the product is delivered in the fry basket by robot 112 to transfer station 122 for delivery out of fry cell 110. The empty fry basket is returned to fry cell 110 by transfer station 122. Depending upon time required to empty the fry basket and return it to transfer station 122, such operation may or may not be included as part of time block B for production of fish filets and chicken patties.

Production of Hash Browns Pies and Other Products

Production of other products which are relatively low volume can be accomplished even though there is no specific equipment for loading that type of uncooked food into the fry basket. For example, individually-sized pies and hash browns can be cooked by fry cell 110 by manually loading those products into a pie fry basket or hash brown fry basket. The loaded fry basket is placed on pie basket pick up platform 140 in position to allow robot 112 to grasp the loaded fry basket. After cooking in one of fry vats 146 as previously described with respect to french fry production, the fry basket containing the pies or hash browns is removed from fry vat 146 by robot 112 and delivered to transfer slide 124 to allow cooling and thereafter packaging and delivery to customers as previously described.

Other dispensing equipment suitable for dispensing, automatically or manually, other types of foods into a container for subsequent cooking could also be used in accordance with the present invention.

Figure 39:
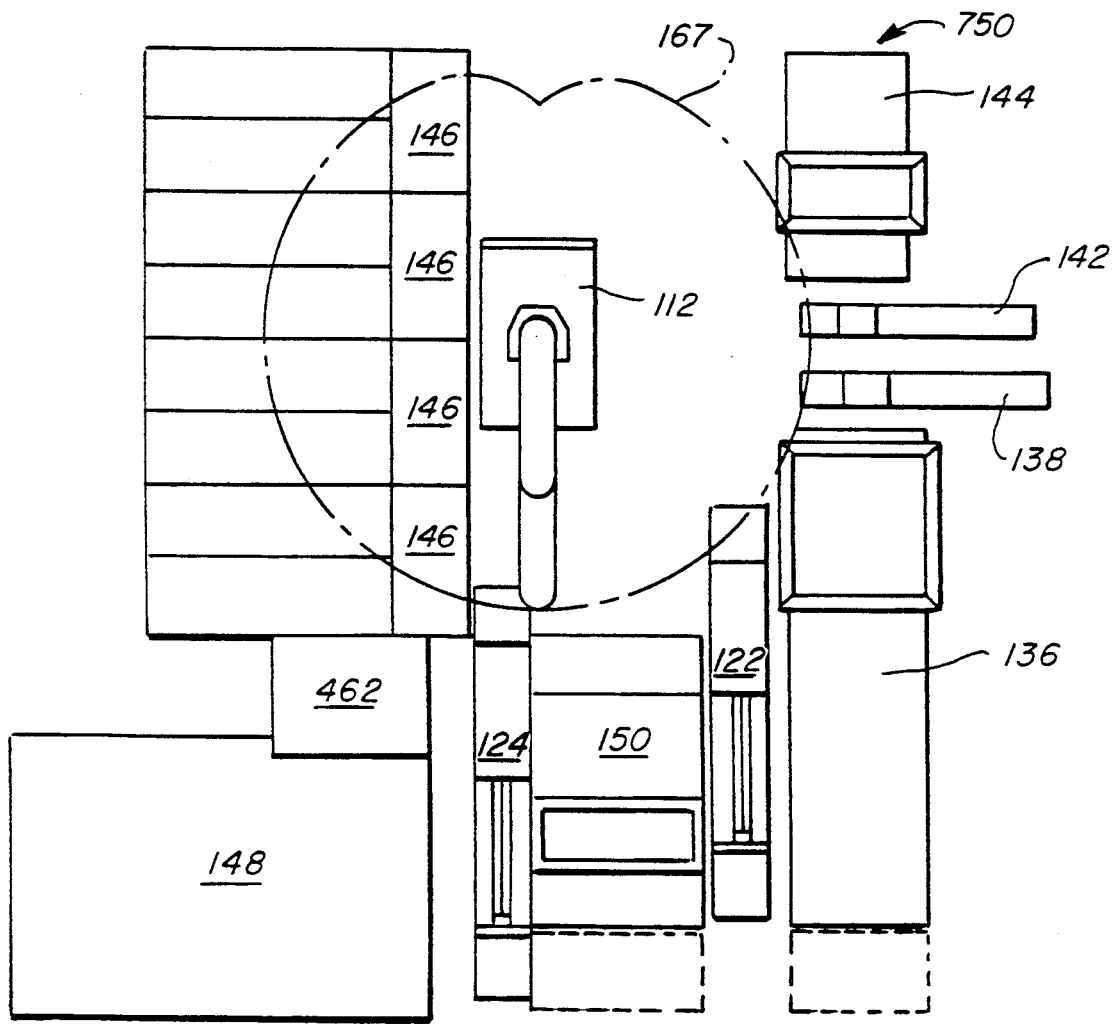
FIG. 39 is a plan view of another embodiment of a robotized fry cell in accordance with the invention.

Referring to FIG. 39 there is illustrated another embodiment of a fry cell 750 in accordance with the present invention. Fry cell 750 includes much equipment in common with fry cell 110 as illustrated by the common reference numerals. In fry cell 750, there are four fry vats 146 grouped together. Transfer slide 124 also functions as a location for pickup of pies by robot 112 and thus replaces pie basket pick up 140 of fry cell 110.

Fry cell 750 is slightly more compact than fry cell 110 and can fit in an area of about 8 feet by 8 feet.

FIG. 40(a) illustrates a typical extended drive through booth 752 having a first window 754 for placing orders and a second window 756 for picking up orders. FIG. 40(B) illustrates how booth 752 can be converted to accommodate fry cell 750.

While the invention has been described herein with respect to certain preferred embodiments, it is to be understood that the invention is capable of numerous changes, modifications and rearrangements without departing from the invention as defined in the claims.

We claim:

1. A robotized system for cooking food products comprising:
   (a) a robot capable of working in an area that determines a work area;
   (b) food dispensing means for dispensing uncooked food pieces into a moveable container located in said work area;
   (c) at least one cooking means in said work area cooking food products;
   (d) storage means adjacent said work area for receiving and storing cooked food delivered by said robot from said cooking means; and
   (e) an end of arm robot tool forming part of said robot, said robot capable of, in conjunction with said end of arm tool, selectively engaging, disengaging and moving said container to desired locations in said work area and for placing said food pieces in cooking position with respect to said cooking means, said desired locations including an uncooked food dispensing position for receiving food into said container from said food dispensing means, a cooking position at said cooking means for cooking said food pieces and an unloading location where cooked food is unloaded from said container into said storage means.

2. The robotized system of claim 1 wherein said cooking means comprises at least one fry vat for cooking food in a cooking fluid.

3. The system of claim 2 further comprising skimming means, operable by said robot for skimming surface impurities of said fry vat.

4. The system of claim 2 further comprising liquid level measuring means operable by said robot, for determining the level of cooking fluid in said fry vat.

5. The system of claim 4 wherein said measuring means comprises an ultrasonic liquid level detector.

6. The system of claim 2 further comprising filling means, operable by said robot, for adding cooking fluid to said fry vat.

7. The system of claim 6 wherein said filling means comprises a cooking fluid reservoir moveable by said robot.

8. The robotized system of claim 1 wherein said cooking means comprises first and second fry vats.

9. The robotized system of claim 1 wherein said container comprises at least one fry basket.

10. The robotized system of claim 9 wherein said container comprises a plurality of fry baskets.

11. The robotized system of claim 1 wherein said food dispensing means comprises a first food dispenser that is a french fry dispenser and a said second food dispenser that is a chicken nugget dispenser.

12. The robotized system of claim 11 further comprising a third food dispenser for dispensing fish filets.

13. The robotized system of claim 12 further comprising a fourth food dispenser for dispensing chicken patties.

14. The robotized system of claim 13 wherein said cooking means comprises at least four fry vats, at least one fry vat each for cooking chicken nuggets, french fries, chicken patties and chicken nuggets.

15. The robotized system of claim 12 further comprising storage means for storing cooked french fries and chicken nuggets.

16. The robotized system of claim 11 further comprising separate storage means for storing cooked french fries and chicken nuggets.

17. The robotized system of claim 11 further comprising storage means for storing french fries and chicken nuggets.

18. The robotized system of claim 1 wherein said food dispensing means can dispense at least one type of uncooked foods selected from the group consisting of french fries, chicken nuggets, fish filets and chicken patties.

19. The robotized system of claim 1 wherein said food dispensing means is capable of dispensing a preselected amount of food into said container.

20. The robotized system of claim 1 further comprising computer operating and control means for controlling and directing said robot to engage and transport said container in sequence to and from said food dispensing means and to and from said cooking means at a frequency based on an anticipated volume of customer orders.

21. The system of claim 20 wherein said anticipated volume of customers orders is based on stored data stored in said computer operating and control means.

22. The system of claim 21 wherein at least part of said stored data is based on data collected on a real time basis from customer orders for that day.

23. The system of claim 21 wherein at least a portion of said data is based on historical data.

24. The system of claim 21 wherein said stored data contains the anticipated volume of customer orders based on food type on an hourly basis.

25. The system of claim 20 wherein said computer operating and control means includes conflict determining means for determining whether a proposed system operation would conflict with any current or future system operation already set in motion by dispensing food for said current or future operation.

26. The system of claim 25 wherein said computer operating and control means includes means for determining when a proposed system operation can be started and completed without conflict with any current or future system operation already set in motion by dispensing food for said current or future operation.

* * * * *